US012655068B2

(12) United States Patent
Turner

(10) Patent No.: US 12,655,068 B2
(45) Date of Patent: Jun. 16, 2026

(54) METAL BORIDE CERAMIC COMPOSITES AND USES THEREOF

(71) Applicant: SuperMetalix, Inc., Sunny Isles Beach, FL (US)

(72) Inventor: Christopher L. Turner, Los Angeles, CA (US)

(73) Assignee: SuperMetalix, Inc., Sunny Isles Beach, FL (US)

( * ) Notice: Subject to any disclaimer, the term of this patent is extended or adjusted under 35 U.S.C. 154(b) by 482 days.

(21) Appl. No.: 17/926,973

(22) PCT Filed: Jun. 4, 2021

(86) PCT No.: PCT/US2021/035869
§ 371 (c)(1),
(2) Date: Nov. 21, 2022

(87) PCT Pub. No.: WO2021/247981
PCT Pub. Date: Dec. 9, 2021

(65) Prior Publication Data
US 2023/0202935 A1 Jun. 29, 2023

Related U.S. Application Data

(60) Provisional application No. 63/034,651, filed on Jun. 4, 2020.

(51) Int. Cl.
*C04B 35/626* (2006.01)
*C04B 35/495* (2006.01)
(Continued)

(52) U.S. Cl.
CPC ...... *C04B 35/62695* (2013.01); *C04B 35/495* (2013.01); *C04B 35/58064* (2013.01); *C04B 35/64* (2013.01); *C04B 2235/6562* (2013.01); *C04B 2235/76* (2013.01); *C04B 2235/77* (2013.01); *C04B 2235/96* (2013.01)

(58) Field of Classification Search
CPC ....... C22C 29/14; C22C 1/051; C22C 1/1084; C22C 29/08; C22C 32/0005; C22C 33/0292; B24D 18/0009
See application file for complete search history.

(56) References Cited

U.S. PATENT DOCUMENTS 3,507,632 A 4/1970 Swoboda et al.
3,525,610 A 8/1970 Meadows
(Continued)

FOREIGN PATENT DOCUMENTS

CN 1997475 A 7/2007
CN 105817619 A 8/2016
(Continued)

OTHER PUBLICATIONS

Akopov, Georgiy. "Extrinsic Hardening of Superhard Tungsten Tetraboride Alloys with Group 4 Transition Metals" (Apr. 26, 2016) JACS vol. 138 pp. 5714-5721 (Year: 2016).
(Continued)

*Primary Examiner* — Ricardo D Morales
(74) *Attorney, Agent, or Firm* — Polygon IP, LLP

(57) ABSTRACT

Disclosed herein are compounds, methods, and tools which comprise composite matrices of tungsten tetraborides and ceramics.

19 Claims, 5 Drawing Sheets

(51) Int. Cl.
  *C04B 35/58*     (2006.01)
  *C04B 35/64*     (2006.01)

(56)              References Cited

U.S. PATENT DOCUMENTS

| | | | |
|---|---|---|---|
| 3,535,110 A | 10/1970 | Todd | |
| 3,647,576 A | 3/1972 | Yamamura et al. | |
| 3,663,017 A | 5/1972 | Lopez | |
| 3,668,017 A | 6/1972 | Mandineau et al. | |
| 3,773,903 A | 11/1973 | Kuratomi | |
| 4,019,873 A | 4/1977 | Reiter | |
| 4,235,630 A | 11/1980 | Babu | |
| 4,268,582 A | 5/1981 | Hale et al. | |
| 4,365,997 A | 12/1982 | Jachowski et al. | |
| 4,671,822 A | 6/1987 | Hamashima et al. | |
| 4,923,512 A | 5/1990 | Timm et al. | |
| 4,961,781 A | 10/1990 | Morishita et al. | |
| 5,161,696 A | 11/1992 | Seider | |
| 5,178,647 A | 1/1993 | Komatsu et al. | |
| 5,238,481 A | 8/1993 | Takagi et al. | |
| 5,476,531 A | 12/1995 | Timm et al. | |
| 5,966,585 A | 10/1999 | Sue | |
| 6,106,957 A | 8/2000 | Fang | |
| 6,830,738 B1 | 12/2004 | Lupinetti et al. | |
| 8,535,604 B1 | 9/2013 | Baker et al. | |
| 10,125,412 B2 | 11/2018 | Kaner et al. | |
| 10,731,236 B2 | 8/2020 | Kaner et al. | |
| 11,033,998 B2 | 6/2021 | Kavanaugh et al. | |
| 11,174,538 B2 | 11/2021 | Kaner et al. | |
| 2002/0025906 A1 | 2/2002 | Hagiya et al. | |
| 2002/0054794 A1 | 5/2002 | Kato et al. | |
| 2002/0088508 A1 | 7/2002 | Holzl et al. | |
| 2003/0054940 A1 | 3/2003 | Abe et al. | |
| 2007/0224100 A1 | 9/2007 | Kaner et al. | |
| 2008/0104091 A1 | 5/2008 | Chin | |
| 2008/0125323 A1 | 5/2008 | Nepela | |
| 2009/0186211 A1 | 7/2009 | Chun et al. | |
| 2011/0262295 A1 * | 10/2011 | Voronov | C22C 1/051 |
| | | | 419/13 |
| 2012/0141293 A1 | 6/2012 | Sato et al. | |
| 2014/0041313 A1 * | 2/2014 | Kaner | C22C 27/04 |
| | | | 51/309 |
| 2015/0143953 A1 | 5/2015 | Chen | |
| 2017/0209983 A1 | 7/2017 | Kavanaugh et al. | |
| 2017/0260102 A1 | 9/2017 | Conway et al. | |
| 2019/0135646 A1 | 5/2019 | Turner et al. | |
| 2020/0048101 A1 | 2/2020 | Adachi et al. | |

FOREIGN PATENT DOCUMENTS

| | | | | |
|---|---|---|---|---|
| CN | 106116593 A | 11/2016 | | |
| EP | 2699703 B1 | 10/2017 | | |
| EP | 3408422 A1 | 12/2018 | | |
| GB | 1486964 A | 9/1977 | | |
| GB | 2263704 A | 8/1993 | | |
| JP | S4942763 A | 4/1974 | | |
| JP | H055152 A | 1/1993 | | |
| JP | H09132460 A | 5/1997 | | |
| JP | 2003268479 A | 9/2003 | | |
| JP | 2003306384 A | 10/2003 | | |
| JP | 2008201080 A | 9/2008 | | |
| JP | 2010247212 A | 11/2010 | | |
| JP | 2011252195 A | 12/2011 | | |
| JP | 5632379 B2 | 11/2014 | | |
| KR | 101215656 B1 | 1/2013 | | |
| WO | WO-2006001791 A1 * | 1/2006 | | B22F 1/02 |
| WO | WO-2013022503 A2 | 2/2013 | | |
| WO | WO-2017061477 A1 | 4/2017 | | |
| WO | WO-2017132286 A1 | 8/2017 | | |
| WO | WO-2019094506 A1 | 5/2019 | | |
| WO | WO-2021247981 A1 | 12/2021 | | |
| WO | WO-2023091193 A2 | 5/2023 | | |

OTHER PUBLICATIONS

Ariel et al.: Tungsten-Titanium-Boron Metastable PhaSe Diagram at Room Temperature. Journal of the Less-Common Metals. 20(3):199-206 (1970).

European Application No. 21816951.4 Search Report dated Nov. 24, 2023.

Examination Report issued in EP Application No. 17744852.9 on Apr. 11, 2023.

Extended European Search Report dated Sep. 3, 2020 in corresponding European Application No. 18748255.9.

Goto et al.: Preparation of W-B-C System Composites by Arc Melting and their Thermoelectric Properties. Journal of the Japan Society of Powder. pp. 1406-1410 (1995).

International Search Report and Written Opinion issued in International Application No. PCT/US2018/059680, on Apr. 11, 2019.

International Search Report in International Patent Application No. PCT/US18/16911, dated Apr. 24, 2018.

Internal Search Report and Written Opinion of PCT/US2012/034685, mailed Mar. 20, 2013.

International Search Report and Written Opinion in International Application No. PCT/US17/14987, dated Apr. 18, 2017.

Itoh et al., "Formation process of tungsten borides by solid state reaction between tungsten and amorphous boron", Journal of Material Science, (Aug. 1, 1987), vol. 22, No. 1, pp. 2811-2815.

Kopeliovich, "Graphite molds for continuous casting," Subs Tech, p. 1 (Jun. 2013).

L. G. Bodrova et al., "Theory, Production Technology, and Properties of Powders and Fibers", Soviet Powder Metallurgy and Metal Ceramics, vol. 13, Jan. 1, 1974, pp. 1-3, XP055138580.

Ma et al., "Formation of metastable tungsten tetraboride by reactive hot-pressing", Ceramics Interantional, (Mar. 14, 2017), vol. 43, No. 12, pp. 8551-8555.

Mohammadi et al. "Enhancing the Hardness of Superhard Transition-Metal Borides: Molybdenum-Doped Tungsten Tetraboride", Chemistry of Materials, Dec. 21, 2015, vol. 28, No. 2, pp. 632-637, XP055607500.

Mohammadi et al., Toward inexpensive superhard materials: tungsten tetraboride-based solid solutions. J Am Chem Soc. 134(51):20660-20668 (2012).

Mohammadi et al., "Tungsten tetraboride, an inexpensive superhad material," PNAS, 108(27): pp. 10958-10962 (2011). [Cited in International Search Report in International Patent Application No. PCT/US18/16911, dated Apr. 24, 2018].

PCT/US2021/035869 International Search Report and Written Opinion dated Sep. 27, 2021.

PCT/US2022/035152 International Search Report and Written Opinion dated Aug. 15, 2023.

Q. Gu et al., "Transition Metal Borides: Superhard versus Ultra-incompressible", Advanced Materials, vol. 20, No. 19, Oct. 2, 2008, pp. 3620-3626, XP055138946.

Kaner et al., "Ambient-pressure synthesis and characterization of superhard intermetallic and solid-solution borides", Abstracts of Papers of the American Chemical Society. vol. 241. 1155 16th St, NW, Washington, DC 20036 USA: Amer Chemical Soc, 2011.

Standard Test Methods for Vickers Hardness and Knoop Hardness of Metallic Materials. ASTM E92-17, p. 4 (2017).

Supplementary Partial European Search Report issued in European Application No. 18 87 5443 on Nov. 11, 2021.

U.S. Appl. No. 14/112,903 Notice of Allowance dated Jun. 27, 2018.

U.S. Appl. No. 14/112,903 Office Action dated Apr. 12, 2017.

U.S. Appl. No. 14/112,903 Office Action dated Feb. 14, 2018.

U.S. Appl. No. 14/112,903 Office Action dated Oct. 2, 2017.

U.S. Appl. No. 14/112,903 Restriction Requirement dated Aug. 2, 2016.

U.S. Appl. No. 14/112,903 Restriction Requirement dated Jan. 9, 2017.

U.S. Appl. No. 15/415,553 Corrected Notice of Allowability dated Apr. 26, 2021.

U.S. Appl. No. 15/415,553 Notice of Allowance dated Feb. 3, 2021.

U.S. Appl. No. 15/415,553 Office Action dated Jun. 24, 2020.

U.S. Appl. No. 15/415,553 Office Action dated Mar. 16, 2020.

(56) References Cited

OTHER PUBLICATIONS

U.S. Appl. No. 15/415,553 Restriction Requirement dated Dec. 2, 2019.

U.S. Appl. No. 15/415,553 Restriction Requirement dated Jul. 18, 2019.

U.S. Appl. No. 15/888,826 Corrected Notice of Allowability dated Jul. 27, 2021.

U.S. Appl. No. 15/888,826 Notice of Allowance dated Jul. 13, 2021.

U.S. Appl. No. 15/888,826 Office Action dated Dec. 22, 2020.

U.S. Appl. No. 15/888,826 Restriction Requirement dated Jun. 15, 2020.

U.S. Appl. No. 16/142,607 Notice of Allowance dated Mar. 25, 2020.

U.S. Appl. No. 16/183,346 Notice of Allowance dated Feb. 7, 2023.

U.S. Appl. No. 16/183,346 Notice of Allowance dated Mar. 16, 2022.

U.S. Appl. No. 16/183,346 Office Action dated Jul. 6, 2022.

U.S. Appl. No. 16/183,346 Office Action dated Jun. 24, 2021.

U.S. Appl. No. 16/183,346 Office Action dated Sep. 21, 2020.

U.S. Appl. No. 16/912,396 Notice of Allowance dated Aug. 30, 2023.

U.S. Appl. No. 16/912,396 Restriction Requirement dated Mar. 13, 2023.

U.S. Appl. No. 16/912,396 Restriction Requirement dated Oct. 13, 2022.

U.S. Appl. No. 17/307,600 Corrected Notice of Allowability dated Jun. 29, 2023.

U.S. Appl. No. 17/307,600 Notice of Allowance dated May 1, 2023.

U.S. Appl. No. 17/526,726 Office Action dated Sep. 15, 2022.

U.S. Appl. No. 18/082,378 Corrected Notice of Allowability dated Sep. 14, 2023.

U.S. Appl. No. 18/082,378 Notice of Allowance dated Sep. 5, 2023.

U.S. Appl. No. 18/082,378 Office Action dated Apr. 10, 2023.

U.S. Appl. No. 18/532,796 Office Action dated Aug. 8, 2024.

Yang et al., "Effects of Sn addition on as-cast microstructure, mechanical properties and casting fluidity of ZA84 magnesium alloy," Materials and Design, vol. 31, pp. 68-75 (Jul. 2009).

* cited by examiner

METAL BORIDE CERAMIC COMPOSITES AND USES THEREOF

CROSS-REFERENCE

This application claims the benefit of U.S. Provisional Application No. 63/034,651, filed Jun. 4, 2020, which application is incorporated herein by reference in its entirety.

BACKGROUND OF THE INVENTION

In many manufacturing processes, materials must be cut, formed, or drilled and their surfaces protected with wear-resistant coatings. Diamond has traditionally been the material of choice for these applications, due to its superior mechanical properties, e.g. hardness >70 GPa and toughness of 7-10 MPa $m^{1/2}$. However, diamond is rare in nature and difficult to synthesize artificially due to the need for a combination of high temperature and high pressure conditions. Industrial applications of diamond are thus generally limited by cost. Moreover, diamond is not a good option for high-speed cutting of ferrous alloys due to its graphitization on the material's surface and formation of brittle carbides, which leads to poor cutting performance. Metal borides, for example $WB_4$ (43 GPa), may be an attractive alternative to diamond due to greater synthetic accessibility. U.S. Pat. No. 1,0125,412 is incorporated herein and discloses compounds of $WB_4$ in which transition metals atoms are substituted for tungsten atoms in the $WB_4$ crystalline lattice to form super hard compounds of >50 GPa. There is a need to further modulate the properties of such compounds for commercial and industrial use.

SUMMARY OF THE INVENTION

Described herein is a composite matrix of the formula $(W_{1-x}M_xB_4)_z(Q)_n$, wherein:

M is one or more of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), ruthenium (Ru), hafnium (Hf), tantalum (Ta), rhenium (Re), osmium (Os), iridium (Ir), lithium (Li), yttrium (Y) and aluminum (Al);

x is from 0.001 to 0.999;

Q is one or more ceramics, wherein each of the one or more ceramics comprises at least two elements, and at least one of the two elements is B (boron), C (carbon), Si (silicon), N (nitrogen), or O (oxygen);

z is a volume percent from 0.1% to 99.9%;

n is a volume percent from 0.1% to 99.9%;

the sum of n and z is 100%; and wherein Q is not WC.

Described herein is a composite matrix of the formula $(WB_4)_z(Q)_n$, wherein:

Q is one or more ceramics, wherein each of the one or more ceramics comprises at least two elements, and at least one of the two elements is B (boron), C (carbon), Si (silicon), N (nitrogen), or O (oxygen);

z is a volume percent from 0.1% to 99.9%;

n is a volume percent from 0.1% to 99.9%;

the sum of n and z is 100%; and wherein Q is not WC.

Described herein is a method of preparing a composite matrix of the formula $(W_{1-x}M_xB_4)_z(Q)_n$, the method comprising:

a) blending together crystalline $W_{1-x}M_xB_4$ with solid Q to form a mixture; wherein:

M is one or more of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), ruthenium (Ru), hafnium (Hf), tantalum (Ta), rhenium (Re), osmium (Os), iridium (Ir), lithium (Li), yttrium (Y) and aluminum (Al);

x is from 0.001 to 0.999;

Q is one or more ceramics, wherein each of the one or more ceramics comprises at least two elements, and at least one of the two elements is B (boron), C (carbon), Si (silicon), N (nitrogen), or O (oxygen);

z is a volume percent from 0.1% to 99.9%;

n is a volume percent from 0.1% to 99.9%;

the sum of n and z is 100%; and wherein Q is not WC.

b) pressing the mixture to generate a pellet; and c) heating the pellet to produce the composite matrix $(W_{1-x}M_xB_4)_z(Q)_n$.

Described herein is a method of preparing a composite matrix of the formula $(WB_4)_z(Q)_n$, the method comprising:

a) blending together crystalline $WB_4$ with solid Q to form a mixture; wherein:

Q is one or more ceramics, wherein each of the one or more ceramics comprises at least two elements, and at least one of the two elements is B (boron), C (carbon), Si (silicon), N (nitrogen), or O (oxygen);

z is a volume percent from 0.1% to 99.9%;

n is a volume percent from 0.1% to 99.9%;

the sum of n and z is 100%; and wherein Q is not WC.

b) pressing the mixture to generate a pellet; and c) heating the pellet in a vessel to produce the composite matrix $(WB_4)_z(Q)_n$.

Described herein is a tool comprising a surface or body for cutting or abrading, wherein the surface or body comprises a composite matrix described herein.

Described herein is a method of applying a composite matrix described herein to a tool, wherein the method comprises affixing the composite matrix to the tool by laser welding or arc welding.

Described herein is a method of manufacturing a tool comprising a composite matrix disclosed herein, wherein the tool is manufactured by turning, milling, grinding, drilling, Electrical Discharge Manufacturing (EDM), Electrochemical Machining (ECM), water jet cutting, plasma cutting, or laser machining.

Described herein is a nozzle for extruding semisolids, solutions, suspensions, or liquids, wherein the nozzle is lined with a composite matrix described herein.

Described herein is a tool, nozzle, or machine part comprising a composite matrix disclosed herein, wherein a lubricating layer of $B_2O_3$ forms on the surface of the composite matrix in the presence of moisture.

Described herein is a method of using a nozzle comprising the composite matrix disclosed herein, comprising: a) exposing the nozzle comprising the composite matrix to moisture, thereby forming a lubricating layer of $B_2O_3$ on the surface of the composite matrix; and b)extruding a semisolid, solution, suspension, or liquid through the nozzle.

BRIEF DESCRIPTION OF THE DRAWINGS

Various aspects of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
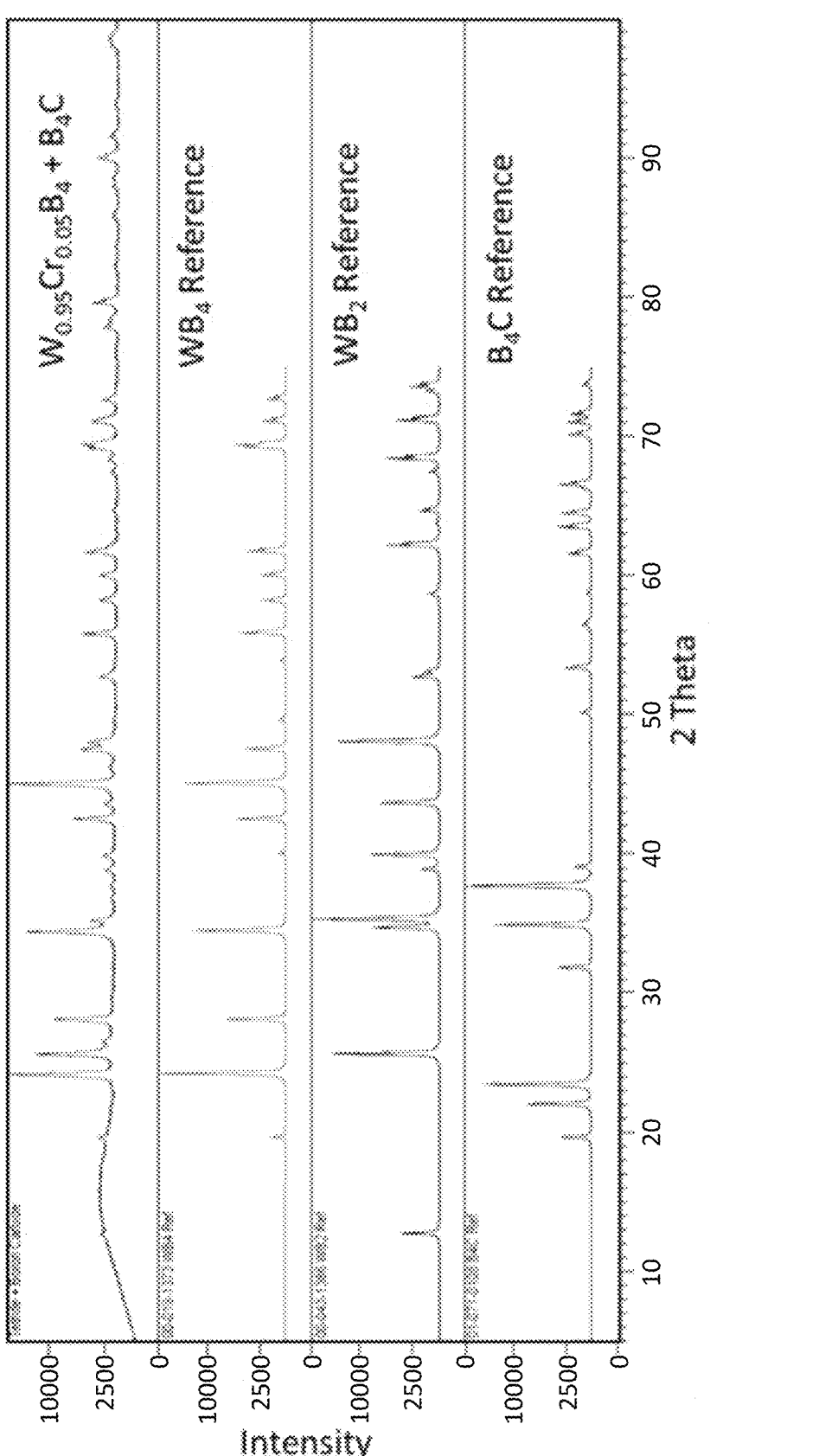
FIG. 1 shows X-ray powder diffractograms of a composite of $W_{0.95}Cr_{0.05}B_4$ and $B_4C$, wherein the $B_4C$ is 10% by volume.

Tungsten tetraboride ($WB_4$) is a crystalline compound that is useful as a superhard coating for tools used to cut or abrade. The hardness of $WB_4$ is due in part to the arrangement of the tungsten and boron atoms in the $WB_4$ crystalline lattice. Substituting transition metal elements for tungsten can increase the hardness of the tungsten alloy tetraboride composition ($W_{1-x}M_xB_4$). For example, Vickers hardness measurements have been observed at 0.49 N as high as 53.0, 55.8 and 57.3 GPa for $W_{0.90}Cr_{0.10}B_4$, $W_{0.94}Ta_{0.02}Mn_{0.04}B_4$ and $W_{0.93}Ta_{0.02}Cr_{0.05}B_4$ respectively. However, such compounds can exhibit limited fracture toughness. For example, the Vicker's hardness measurements must be performed at low loads (e.g. at <9.8 N), as higher loads tend to fracture the sample. While superhard compounds with low fracture toughness are extremely useful, increasing the fracture toughness allows for new applications. For example, a machinist may require a cutting tool made with superhard $W_{0.93}Ta_{0.02}Cr_{0.05}B_4$ to machine a particular, hardened ceramic material. The tool is sufficiently hard to properly work the ceramic. When machining an un-hardened ceramic, or when machining metals, the machinist can use a cutting tool with a composite matrix of $(W_{0.93}Ta_{0.02}Cr_{0.05}B_4)_{90\%}B_4C)_{10}\%$, as disclosed herein. The advantage of the composite matrix is that the tooling remains hard enough to machine the ceramics and metals, but will degrade more slowly due to the increased toughness of the ceramic composite. Both the materials are useful in a particular instance.

It is not obvious to combine tungsten alloy tetraborides ($W_{1-x}M_xB_4$) or tungsten tetraboride ($WB_4$) with a ceramic materials due, in part, to the difficulties associated with the synthesis of such composites. Ceramics often react with $W_{1-x}M_xB_4$ or $WB_4$ to form lower borides, e.g. $WB$, and $WB_2$, effectively destroying the beneficial properties of both components. Applicants have found that specialized conditions are needed to access the composites described herein. For example, when elemental carbon or silicon is heated with $WB_4$, the tetraboride degrades to mixtures of tungsten monoboride, tungsten diboride, and tungsten carbide or silicon carbide respectively. Similarly, when composite matrices of $W_{0.95}Cr_{0.05}B_4$ and $TiB_2$ (described in Example 2) were underheated during synthesis, the composite matrix was not effectively formed. Overheating resulted in an inferior material due to significant reaction between the components.

Factors such as heating time, ramp rate, pressure, the metal (M) used in $W_{1-x}M_xB_4$, the molar ratio of M, and the volume ratio of $W_{1-x}M_xB_4$ to ceramic were each important factors to consider when synthesizing the composite matrices described herein. Due to the myriad of synthetic difficulties involved, an inventive step was required to access the composite matrices described herein. As no synthetic route was previously available, the composite matrices would not have been obvious to one skilled in the art.

The composites disclosed herein are heterogenous in nature, with crystalline $W_{1-x}M_xB_4$ or $WB_4$ being combined with one or more ceramics to form the composite $(W_{1-x}M_xB_4)_z(Q)_n$ or $(WB_4)_z(Q)_n$. During the formation of the composite, grain boundaries form between the crystalline $W_{1-x}M_xB_4$ or $WB_4$ and the one or more ceramics. The grain boundaries are typically a mixture of $W_{1-x}M_xB_4$ or $WB_4$, ceramic, and the by-products of any reaction between the tetraborides and the ceramic. The grain boundary aids in the formation of the composite by forming a layer between the ceramic and $W_{1-x}M_xB_4$ or $WB_4$ that slows the rate of reaction between the two components. The grain boundaries also aid in binding the components into a single composite.

Reaction conditions such as temperature, pressure, ramp rate and heating technique can be important variables to consider. If the reaction vessel is heated for too long or too high, the grain boundaries may become permeable and fail to effectively insulate the components. In such cases, a large fraction of both the $W_{1-x}M_xB_4$ or $WB_4$ and the ceramic is destroyed. On the other hand, if the temperature is deficient, the grain boundaries may not sufficiently form to produce the composite. The development of the novel and inventive synthetic techniques described herein were required to access the composite matrices of $(W_{1-x}M_xB_4)_z(Q)_n$ and $(WB_4)_z(Q)_n$.

In some embodiments, the compositions herein exhibit unexpected properties. The compositions described herein form a thin layer of an oxide such as $B_2O_3$ on the surface of the composite over time when exposed to high humidity or droplets of water. $B_2O_3$ is a dry powder useful as an industrial lubricant. Therefore, machined parts and tools comprising the composite matrices described herein have the ability to self-lubricate. The rate of formation and thickness of the $B_2O_3$ layer can be varied by modulating the surface area of the composite, e.g. by polishing the surface of the composite, the method of sintering the composite, or the method and force of compaction of the composite. Therefore, the lubricity of the composite matrices can be increased or decreased according to the application.

Described herein are composite matrices of $(W_{1-x}M_xB_4)_z(Q)_n$ and $(WB_4)_z(Q)_n$, methods to manufacturing composite matrices of $(W_{1-x}M_xB_4)_z(Q)_n$ and $(WB_4)_z(Q)_n$, and applications of composite matrices of $(W_{1-x}M_xB_4)_z(Q)_n$ and $(WB_4)_z(Q)_n$.

Compositions of Matter

Described herein are composite matrices of $(W_{1-x}M_xB_4)_z(Q)_n$. Metal substitutions into the $WB_4$ crystal lattice enhances the beneficial properties (e.g. hardness) of $WB_4$. In the $W_{1-x}M_xB_4$ component, M is substituted into the crystalline lattice of $WB_4$ to form $W_{1-x}M_xB_4$. As the concentration of M increases, the $WB_4$ crystalline lattice is increasingly disrupted, and the beneficial properties may be lost. Therefore, the crystalline lattice of $W_{1-x}M_xB_4$ shares many crystalline features of the $WB_4$ lattice, but is not necessarily identical to $WB_4$. X-ray diffraction can be used to identify $W_{1-x}M_xB_4$ in the composite. In some embodiments, $W_{1-x}M_xB_4$ is a crystalline solid characterized by at least one X-ray diffraction pattern reflection at a 2 theta of about 24.2±0.3. In some embodiments, the crystalline solid is further characterized by at least one X-ray diffraction pattern reflection at a 2 theta of about 34.5 or about 34.5±0.3 or 45.1±0.3. In some embodiments, the crystalline solid is further characterized by at least one X-ray diffraction pattern reflection at a 2 theta of about 47.5±0.3, 61.8±0.3, 69.2±0.3, 69.4±0.3, 79.7±0.3, 89.9±0.3, or 110.2±0.3. In some embodiments, the crystalline solid is characterized by at least two X-ray diffraction pattern reflections at 2 theta=24.2±0.3, 28.1±0.3, 34.5±0.3 , 42.5±0.3, 45.1±0.3, 47.5±0.3, 55.9±0.3, 61.8±0.3, 69.2±0.3, 69.4±0.3, 79.7±0.3, 89.9±0.3, or 110.2±0.3. In some embodiments, the crystalline solid is characterized by at least three X-ray diffraction pattern reflections at 2 theta=24.2±0.3, 28.1±0.3, 34.5±0.3 , 42.5±0.3, 45.1±0.3, 47.5±0.3, 55.9±0.3, 61.8±0.3, 69.2±0.3, 69.4±0.3, 79.7±0.3, 89.9±0.3, or 110.2±0.3. In some embodiments, the crystalline solid is characterized by at least four X-ray diffraction pattern reflections at 2 theta=24.2±0.3, 28.1±0.3, 34.5±0.3 , 42.5±0.3, 45.1±0.3, 47.5±0.3, 55.9±0.3, 61.8±0.3, 69.2±0.3, 69.4±0.3, 79.7±0.3, 89.9±0.3, or 110.2±0.3. In some embodiments, the crystalline solid is characterized by at least five X-ray diffraction pattern reflections at 2 theta=24.2±0.3, 28.1±0.3, 34.5±0.3 , 42.5±0.3, 45.1±0.3, 47.5±0.3, 55.9±0.3, 61.8±0.3, 69.2±0.3, 69.4±0.3, 79.7±0.3, 89.9±0.3, or 110.2±0.3. In some embodiments, the crystalline solid is characterized by at least six X-ray diffraction pattern reflections at 2 theta=24.2±0.3, 28.1±0.3, 34.5±0.3 , 42.5±0.3, 45.1±0.3, 47.5±0.3, 55.9±0.3, 61.8±0.3, 69.2±0.3, 69.4±0.3, 79.7±0.3, 89.9±0.3, or 110.2±0.3. In some embodiments, the crystalline solid is characterized by at least seven X-ray diffraction pattern reflections at 2 theta=24.2±0.3, 28.1±0.3, 34.5±0.3 , 42.5±0.3, 45.1±0.3, 47.5±0.3, 55.9±0.3, 61.8±0.3, 69.2±0.3, 69.4±0.3, 79.7±0.3, 89.9±0.3, or 110.2±0.3.

In some embodiments, the hardness of $W_{1-x}M_xB_4$ is measured by a Vickers hardness test measured under a load of 0.49 Newton (N). In some embodiments, the hardness of $W_{1-x}M_xB_4$ is about 10 to about 70 GPa. In some embodiments, the hardness of $W_{1-x}M_xB_4$ is about 10 to about 60 GPa, about 10 to about 50 GPa, about 10 to about 40 GPa, about 10 to about 30GPa, about 20 to about 70 GPa, about 20 to about 60 GPa, about 20 to about 50 GPa, about 20 to about 40 GPa, about 20 to about 30 GPa, about 30 to about 70 GPa, about 30 to about 60 GPa, about 30 to about 50 GPa, about 30 to about 45 GPa, about 30 to about 40 GPa, about 30 to about 35 GPa, about 35 to about 70 GPa, about 35 to about 60 GPa, about 35 to about 50 GPa, about 35 to about 40 GPa, about 40 to about 70 GPa, about 40 to about 60 GPa, about 40 to about 50 GPa, about 45 to about 60 GPa, about 45 to about 50 GPa, about 45 GPa to about 70 GPa, about 50 GPa to about 70 GPa, about 55 GPa to about 65 GPa, or about 50 to 60 GPa. In some embodiments, the hardness of $W_{1-x}M_xB_4$ is about 30 to about 50 GPa, about 30 to about 45 GPa, about 30 to about 40 GPa, about 30 to about 35 GPa, about 35 to about 50 GPa, about 35 to about 40 GPa, about 40 to about 50 GPa, or about 45 to about 50 GPa. In some embodiments, $W_{1-x}M_xB_4$ has a hardness of about 10 GPa, about 15 GPa, about 20 GPa, about 25 GPa, about 30 GPa, about 31 GPa, about 32 GPa, about 33 GPa, about 34 GPa, about 35 GPa, about 36 GPa, about 37 GPa, about 38 GPa, about 39 GPa, about 40 GPa, about 41 GPa, about 42 GPa, about 43 GPa, about 44 GPa, about 45 GPa, about 46 GPa, about 47 GPa, about 48 GPa, about 49 GPa, about 50 GPa, about 51 GPa, about 52 GPa, about 53 GPa, about 54 GPa, about 55 GPa, about 56 GPa, about 57 GPa, about 58 GPa, about 59 GPa, about 60 GPa or higher. In some embodiments, $W_{1-x}M_xB_4$ has a hardness of at least about 10 GPa, about 15 GPa, about 20 GPa, about 25 GPa, about 30 GPa, about 31 GPa, about 32 GPa, about 33 GPa, about 34 GPa, about 35 GPa, about 36 GPa, about 37 GPa, about 38 GPa, about 39 GPa, about 40 GPa, about 41 GPa, about 42 GPa, about 43 GPa, about 44 GPa, about 45 GPa, about 46 GPa, about 47 GPa, about 48 GPa, about 49 GPa, about 50 GPa, about 51 GPa, about 52 GPa, about 53 GPa, about 54 GPa, about 55 GPa, about 56 GPa, about 57 GPa, about 58 GPa, about 59 GPa, about 60 GPa. In some embodiments, $W_{1-x}M_xB_4$ has a hardness of no greater than about 10 GPa, about 15 GPa, about 20 GPa, about 25 GPa, about 30 GPa, about 31 GPa, about 32 GPa, about 33 GPa, about 34 GPa, about 35 GPa, about 36 GPa, about 37 GPa, about 38 GPa, about 39 GPa, about 40 GPa, about 41 GPa, about 42 GPa, about 43 GPa, about 44 GPa, about 45 GPa, about 46 GPa, about 47 GPa, about 48 GPa, about 49 GPa, about 50 GPa, about 51 GPa, about 52 GPa, about 53 GPa, about 54 GPa, about 55 GPa, about 56 GPa, about 57 GPa, about 58 GPa, about 59 GPa, about 60 GPa.

In some embodiments, the hardness of $W_{1-x}M_xB_4$ is measured by a Vickers hardness test measured under a load of 0.49 Newton (N). In some embodiments, the hardness of $W_{1-x}M_xB_4$ is about 44 to about 57 GPa. In some embodiments, the hardness is about 50 to about 57 GPa. In some embodiments, the hardness is about 50 to about 60 GPa. In some embodiments, the hardness is about 50 to about 65 GPa. In some embodiments, the hardness is about 45 to about 65 GPa. In some embodiments, the hardness is about 50 GPa to about 60 GPa. In some embodiments, the hardness is about 50 GPa to about 51 GPa, about 50 GPa to about 52 GPa, about 50 GPa to about 53 GPa, about 50 GPa to about 54 GPa, about 50 GPa to about 55 GPa, about 50 GPa to about 56 GPa, about 50 GPa to about 57 GPa, about 50 GPa to about 58 GPa, about 50 GPa to about 59 GPa, about 50 GPa to about 60 GPa, about 51 GPa to about 52 GPa, about 51 GPa to about 53 GPa, about 51 GPa to about 54 GPa, about 51 GPa to about 55 GPa, about 51 GPa to about 56 GPa, about 51 GPa to about 57 GPa, about 51 GPa to about 58 GPa, about 51 GPa to about 59 GPa, about 51 GPa to about 60 GPa, about 52 GPa to about 53 GPa, about 52 GPa to about 54 GPa, about 52 GPa to about 55 GPa, about 52 GPa to about 56 GPa, about 52 GPa to about 57 GPa, about 52 GPa to about 58 GPa, about 52 GPa to about 59 GPa, about 52 GPa to about 60 GPa, about 53 GPa to about 54 GPa, about 53 GPa to about 55 GPa, about 53 GPa to about 56 GPa, about 53 GPa to about 57 GPa, about 53 GPa to about 58 GPa, about 53 GPa to about 59 GPa, about 53 GPa to about 60 GPa, about 54 GPa to about 55 GPa, about 54 GPa to about 56 GPa, about 54 GPa to about 57 GPa, about 54 GPa to about 58 GPa, about 54 GPa to about 59 GPa, about 54 GPa to about 60 GPa, about 55 GPa to about 56 GPa, about 55 GPa to about 57 GPa, about 55 GPa to about 58 GPa, about 55 GPa to about 59 GPa, about 55 GPa to about 60 GPa, about 56 GPa to about 57 GPa, about 56 GPa to about 58 GPa, about 56 GPa to about 59 GPa, about 56 GPa to about 60 GPa, about 57 GPa to about 58 GPa, about 57 GPa to about 59 GPa, about 57 GPa to about 60 GPa, about 58 GPa to about 59 GPa, about 58 GPa to about 60 GPa, or about 59 GPa to about 60 GPa. In some embodiments, the hardness is about 50 GPa, about 51 GPa, about 52 GPa, about 53 GPa, about 54 GPa, about 55 GPa, about 56 GPa, about 57 GPa, about 58 GPa, about 59 GPa, or about 60 GPa. In some embodiments, the hardness is at least about 50 GPa, about 51 GPa, about 52 GPa, about 53 GPa, about 54 GPa, about 55 GPa, about 56 GPa, about 57 GPa, about 58 GPa, or about 59 GPa. In some embodiments, the hardness is at most about 51 GPa, about 52 GPa, about 53 GPa, about 54 GPa, about 55 GPa, about 56 GPa, about 57 GPa, about 58 GPa, about 59 GPa, or about 60 GPa.

In some embodiments of a composite matrix described herein, or prepared by the methods herein, x has a value within the range 0.001 to 0.999, inclusively.

In some embodiments, x has a value within the range of about 0.001 to about 0.055. In some embodiments, x has a value within the range of about 0.001 to about 0.005, about 0.001 to about 0.01, about 0.001 to about 0.015, about 0.001 to about 0.02, about 0.001 to about 0.025, about 0.001 to about 0.03, about 0.001 to about 0.035, about 0.001 to about 0.04, about 0.001 to about 0.045, about 0.001 to about 0.05, about 0.001 to about 0.055, about 0.005 to about 0.01, about 0.005 to about 0.015, about 0.005 to about 0.02, about 0.005 to about 0.025, about 0.005 to about 0.03, about 0.005 to about 0.035, about 0.005 to about 0.04, about 0.005 to about 0.045, about 0.005 to about 0.05, about 0.005 to about 0.055, about 0.01 to about 0.015, about 0.01 to about 0.02, about 0.01 to about 0.025, about 0.01 to about 0.03, about 0.01 to about 0.035, about 0.01 to about 0.04, about 0.01 to about 0.045, about 0.01 to about 0.05, about 0.01 to about 0.055, about 0.015 to about 0.02, about 0.015 to about 0.025, about 0.015 to about 0.03, about 0.015 to about 0.035, about 0.015 to about 0.04, about 0.015 to about 0.045, about 0.015 to about 0.05, about 0.015 to about 0.055, about 0.02 to about 0.025, about 0.02 to about 0.03, about 0.02 to about 0.035, about 0.02 to about 0.04, about 0.02 to about 0.045, about 0.02 to about 0.05, about 0.02 to about 0.055, about 0.025 to about 0.03, about 0.025 to about 0.035, about 0.025 to about 0.04, about 0.025 to about 0.045, about 0.025 to about 0.05, about 0.025 to about 0.055, about 0.03 to about 0.035, about 0.03 to about 0.04, about 0.03 to about 0.045, about 0.03 to about 0.05, about 0.03 to about 0.055, about 0.035 to about 0.04, about 0.035 to about 0.045, about 0.035 to about 0.05, about 0.035 to about 0.055, about 0.04 to about 0.045, about 0.04 to about 0.05, about 0.04 to about 0.055, about 0.045 to about 0.05, about 0.045 to about 0.055, about 0.05 to about 0.055, about 0.01 to about 0.06, about 0.01 to about 0.065, about 0.01 to about 0.07, about 0.01 to about 0.075, about 0.01 to about 0.08, about 0.01 to about 0.085, about 0.01 to about 0.09, about 0.02 to about 0.03, about 0.02 to about 0.04, about 0.02 to about 0.05, about 0.02 to about 0.06, about 0.02 to about 0.065, about 0.02 to about 0.07, about 0.02 to about 0.075, about 0.02 to about 0.08, about 0.02 to about 0.085, about 0.02 to about 0.09, about 0.03 to about 0.04, about 0.03 to about 0.05, about 0.03 to about 0.06, about 0.03 to about 0.065, about 0.03 to about 0.07, about 0.03 to about 0.075, about 0.03 to about 0.08, about 0.03 to about 0.085, about 0.03 to about 0.09, about 0.04 to about 0.05, about 0.04 to about 0.06, about 0.04 to about 0.065, about 0.04 to about 0.07, about 0.04 to about 0.075, about 0.04 to about 0.08, about 0.04 to about 0.085, about 0.04 to about 0.09, about 0.05 to about 0.06, about 0.05 to about 0.065, about 0.05 to about 0.07, about 0.05 to about 0.075, about 0.05 to about 0.08, about 0.05 to about 0.085, about 0.05 to about 0.09, about 0.06 to about 0.065, about 0.06 to about 0.07, about 0.06 to about 0.075, about 0.06 to about 0.08, about 0.06 to about 0.085, about 0.06 to about 0.09, about 0.065 to about 0.07, about 0.065 to about 0.075, about 0.065 to about 0.08, about 0.065 to about 0.085, about 0.065 to about 0.09, about 0.07 to about 0.075, about 0.07 to about 0.08, about 0.07 to about 0.085, about 0.07 to about 0.09, about 0.075 to about 0.08, about 0.075 to about 0.085, about 0.075 to about 0.09, about 0.08 to about 0.085, about 0.08 to about 0.09, about 0.085 to about 0.09, about 0.01 to about 0.1, about 0.01 to about 0.13, about 0.01 to about 0.15, about 0.01 to about 0.17, about 0.01 to about 0.2, about 0.01 to about 0.23, about 0.01 to about 0.25, about 0.01 to about 0.27, about 0.01 to about 0.3, about 0.01 to about 0.35, about 0.01 to about 0.4, about 0.1 to about 0.13, about 0.1 to about 0.15, about 0.1 to about 0.17, about 0.1 to about 0.2, about 0.1 to about 0.23, about 0.1 to about 0.25, about 0.1 to about 0.27, about 0.1 to about 0.3, about 0.1 to about 0.35, about 0.1 to about 0.4, about 0.13 to about 0.15, about 0.13 to about 0.17, about 0.13 to about 0.2, about 0.13 to about 0.23, about 0.13 to about 0.25, about 0.13 to about 0.27, about 0.13 to about 0.3, about 0.13 to about 0.35, about 0.13 to about 0.4, about 0.15 to about 0.17, about 0.15 to about 0.2, about 0.15 to about 0.23, about 0.15 to about 0.25, about 0.15 to about 0.27, about 0.15 to about 0.3, about 0.15 to about 0.35, about 0.15 to about 0.4, about 0.17 to about 0.2, about 0.17 to about 0.23, about 0.17 to about 0.25, about 0.17 to about 0.27, about 0.17 to about 0.3, about 0.17 to about 0.35, about 0.17 to about 0.4, about 0.2 to about 0.23, about 0.2 to about 0.25, about 0.2 to about 0.27, about 0.2 to about 0.3, about 0.2 to about 0.35, about 0.2 to about 0.4, about 0.23 to about 0.25, about 0.23 to about 0.27, about 0.23 to about 0.3, about 0.23 to about 0.35, about 0.23 to about 0.4, about 0.25 to about 0.27, about 0.25 to about 0.3, about 0.25 to about 0.35, about 0.25 to about 0.4, about 0.27 to about 0.3, about 0.27 to about 0.35, about 0.27 to about 0.4, about 0.3 to about 0.35, about 0.3 to about 0.4, or about 0.35 to about 0.4.

In some embodiments of a composite matrix described herein, or prepared by the methods herein, x has a value of about 0.001, 0.005, 0.01, 0.05, 0.02, 0.015, 0.025, 0.03, 0.035, 0.04, 0.045, 0.05, 0.055, 0.06, 0.065, 0.070, 0.075, 0.080, 0.085, 0.090, 0.095, 0.1, 0.15, 0.2, 0.25, 0.3, 0.35, 0.4, 0.41, 0.42, 0.43, 0.44, 0.45, 0.46, 0.47, 0.48, 0.49, 0.5, 0.51, 0.52, 0.53, 0.54, 0.55, 0.56, 0.57, 0.58, 0.59, 0.6, 0.65, 0.7, 0.8, 0.9, 0.95, 0.99, or about 0.999. In some embodiments of a composite matrix described herein, or prepared by the methods herein, x has a value of at least about 0.001, 0.005, 0.01, 0.05, 0.02, 0.015, 0.025, 0.03, 0.035, 0.04, 0.045, 0.05, 0.055, 0.06, 0.065, 0.070, 0.075, 0.080, 0.085, 0.090, 0.095, 0.1, 0.15, 0.2, 0.25, 0.3, 0.35, 0.4, 0.41, 0.42, 0.43, 0.44, 0.45, 0.46, 0.47, 0.48, 0.49, 0.5, 0.51, 0.52, 0.53, 0.54, 0.55, 0.56, 0.57, 0.58, 0.59, 0.6, 0.65, 0.7, 0.8, 0.9, 0.95, 0.99, or about 0.999. In some embodiments of a composite matrix described herein, or prepared by the methods herein, x has a value of no greater than about 0.001, 0.005, 0.01, 0.05, 0.02, 0.015, 0.025, 0.03, 0.035, 0.04, 0.045, 0.05, 0.055, 0.06, 0.065, 0.070, 0.075, 0.080, 0.085, 0.090, 0.095, 0.1, 0.15, 0.2, 0.25, 0.3, 0.35, 0.4, 0.41, 0.42, 0.43, 0.44, 0.45, 0.46, 0.47, 0.48, 0.49, 0.5, 0.51, 0.52, 0.53, 0.54, 0.55, 0.56, 0.57, 0.58, 0.59, 0.6, 0.65, 0.7, 0.8, 0.9, 0.95, 0.99, or about 0.999.

In some embodiments, a composite matrix described herein, or prepared by the methods herein, is comprised of a metal side product is less than 20%, 15%, 12%, 10%, 9%, 8%, 7%, 6%, 5%, 4%, 3%, 2%, 1%, 0.5%, 0.1%, 0.05%, or 0.01% relative to the percentage of the composite matrix. In some embodiments, the metal side product is tungsten diboride ($WB_2$) or tungsten monoboride (WB). In some embodiments, the metal side product is a non-tungsten metal boride. In some embodiments, the non-tungsten metal boride is $TiB_2$, $ZrB_2$, $HfB_2$, VB, $VB_2$, $NbB_2$, $NbB_2$, CrB, $CrB_2$, $Cr_2B$, $Cr_3B_4$, $Cr_4B$, $Cr_5B_3$, MoB, $MoB_2$, $Mo_2B_4$, $Mo_2B_5$, MnB, $MnB_2$, $MNB_4$, $Mn_2B$, $Mn_4B$, $Mn_3B_4$, $ReB_2$, $Re_3B$, $Re_7B_2$, FeB, $Fe_2B$, $RuB_2$, $Ru_2B_3$, OsB, $Os_2B_3$, $OsB_2$, CoB, $Co_2B$, IrB, $Ir_2B$, NiB, $Ni_2B$, $Ni_3B$, CuB, or ZnB.

In some embodiments, at least one allotrope of elemental boron is present in the composite matrix. Allotropes of boron include the following states of boron: alpha rhombohedral, alpha tetragonal, beta rhombohedral, beta tetragonal, ortho-rhombic (gamma), borophen, borospherene and amorphous boron.

In some embodiments, in a composite matrix described herein, or prepared by the methods herein, the percentage of $W_{1-x}M_xB_4$ to excess boron leftover from the synthesis of $W_{1-x}M_xB_4$ is at least 80%, 85%, 88%, 90%, 91%, 92%, 93%, 94%, 95%, 96%, 97%, 98%, 99%, 99.5%, 99.9%, 99.95%, or 99.99%.

Described herein are composite matrices of $(W_{1-x}M_xB_4)_z(Q)_n$. In some embodiments, is M is one or more of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), ruthenium (Ru), hafnium (Hf), tantalum (Ta), rhenium (Re), osmium (Os), iridium (Ir), lithium (Li), yttrium (Y) and aluminum (Al). In some embodiments, M is one or more of Ti, V, Cr, Mn, Fe, Co, Ni, Cu, Zn, Zr, Nb, Mo, Ru, Hf, Ta, Re, Os, Ir, and Y. In some embodiments, M is one or more of Ti, V, Cr, Mn, Fe, Co, Ni, Cu, Zn, Zr, Nb, Mo, Ru, Hf, Ta, and Re. In some embodiments, M is one or more of Ti, V, Cr, Mn, Fe, Co, Zr, Nb, Mo, Ru, Hf, Ta, and Re. In some embodiments, M is one or more of Ti, V, Cr, Mn, Zr, Nb, Mo, Hf, Ta, and Re. In some embodiments, M is one or more of Ti, V, Zr, Nb, Hf, and Ta. In some embodiments, M is one or more of Cr, Mn, Mo, and Re. In some embodiments, M is one or more of Cr, Ta, Mo, or Mn. In some embodiments, M is one or more of Cr, Ta, Mo, or Mn. In some embodiments, M is Cr; Mn; Mo; Ta and Cr; or Ta and Mo. In some embodiments, M is Cr, and x is at least 0.001 and less than 0.4. In some embodiments, M is Mo, and x is at least 0.001 and less than 0.4. In some embodiments, M is Mn, and x is at least 0.001 and less than 0.4. In some embodiments, M is Cr and Ta, and x is at least 0.001 and less than 0.4. In some embodiments, M is Ta and Mo, and x is at least 0.01 and less than 0.4.

Described herein are composite matrices of $(W_{1-x}M_xB_4)_z(Q)_n$. In some embodiments, M is one metal. In some embodiments, M is Cr. In some embodiments, the composite matrix is $W_{0.99}Cr_{0.01}B_4$, $W_{0.98}Cr_{0.02}B_4$, $W_{0.97}Cr_{0.03}B_4$, $W_{0.96}Cr_{0.04}B_4$, $W_{0.95}Cr_{0.05}B_4$, $W_{0.94}Cr_{0.06}B_4$, $W_{0.93}Cr_{0.07}B_4$, $W_{0.92}Cr_{0.08}B_4$, $W_{0.91}Cr_{0.09}B_4$, $W_{0.90}Cr_{0.10}B_4$, $W_{0.89}Cr_{0.11}B_4$, $W_{0.88}Cr_{0.12}B_4$, $W_{0.87}Cr_{0.13}B_4$, $W_{0.86}Cr_{0.14}B_4$, $W_{0.85}Cr_{0.15}B_4$, $W_{0.84}Cr_{0.16}B_4$, $W_{0.83}Cr_{0.17}B_4$, $W_{0.82}Cr_{0.18}B_4$, $W_{0.81}Cr_{0.19}B_4$, $W_{0.80}Cr_{0.20}B_4$, $W_{0.75}Cr_{0.25}B_4$, $W_{0.70}Cr_{0.30}B_4$, $W_{0.65}Cr_{0.35}B_4$, $W_{0.60}Cr_{0.40}B_4$, $W_{0.55}Cr_{0.45}B_4$, or $W_{0.50}Cr_{0.50}B_4$. In some embodiments, M is Mo. In some embodiments, the composite matrix is $W_{0.99}Mo_{0.01}B_4$, $W_{0.98}Mo_{0.02}B_4$, $W_{0.97}Mo_{0.03}B_4$, $W_{0.96}Mo_{0.04}B_4$, $W_{0.95}Mo_{0.05}B_4$, $W_{0.94}Mo_{0.06}B_4$, $W_{0.93}Mo_{0.07}B_4$, $W_{0.92}Mo_{0.08}B_4$, $W_{0.91}Mo_{0.09}B_4$, $W_{0.90}Mo_{0.10}B_4$, $W_{0.89}Mo_{0.01}B_4$, $W_{0.88}Mo_{0.12}B_4$, $W_{0.87}Mo_{0.13}B_4$, $W_{0.86}Mo_{0.014}B_4$, $W_{0.85}Mo_{0.15}B_4$, $W_{0.84}Mo_{0.16}B_4$, $W_{0.83}Mo_{0.17}B_4$, $W_{0.82}Mo_{0.018}B_4$, $W_{0.81}Mo_{0.19}B_4$, $W_{0.80}Mo_{0.20}B_4$, $W_{0.75}Mo_{0.25}B_4$, $W_{0.70}Mo_{0.30}B_4$, $W_{0.65}Mo_{0.35}B_4$, $W_{0.60}Mo_{0.40}B_4$, $W_{0.55}Mo_{0.45}B_4$, or $W_{0.50}Mo_{0.50}B_4$. In some embodiments, M is Mn. In some embodiments, the composite matrix is $W_{0.99}Mn_{0.01}B_4$, $W_{0.98}Mn_{0.02}B_4$, $W_{0.97}Mn_{0.03}B_4$, $W_{0.96}Mn_{0.04}B_4$, $W_{0.95}Mn_{0.05}B_4$, $W_{0.94}Mn_{0.06}B_4$, $W_{0.93}Mn_{0.07}B_4$, $W_{0.92}Mn_{0.08}B_4$, $W_{0.91}Mn_{0.09}B_4$, $W_{0.90}Mn_{0.010}B_4$, $W_{0.89}Mn_{0.1194}$, $W_{0.88}Mn_{0.12}B_4$, $W_{0.87}Mn_{0.13}B_4$, $W_{0.86}Mn_{0.14}B_4$, $W_{0.85}Mn_{0.15}B_4$, $W_{0.84}Mn_{0.16}B_4$, $W_{0.83}Mn_{0.17}B_4$, $W_{0.82}Mn_{0.18}B_4$, $W_{0.81}Mn_{0.19}B_4$, $W_{0.80}Mn_{0.20}B_4$, $W_{0.75}Mn_{0.25}B_4$, $W_{0.70}Mn_{0.30}B_4$, $W_{0.65}Mn_{0.35}B_4$, $W_{0.60}Mn_{0.40}B_4$, $W_{0.55}Mn_{0.45}B_4$, or $W_{0.50}Mn_{0.50}B_4$. In some embodiments, M is Ta. In some embodiments, the composite matrix is $W_{0.99}Ta_{0.01}B_4$, $W_{0.98}Ta_{0.02}B_4$, $W_{0.97}Ta_{0.03}B_4$, $W_{0.96}Ta_{0.04}B_4$, $W_{0.95}Ta_{0.05}B_4$, $W_{0.94}Ta_{0.06}B_4$, $W_{0.93}Ta_{0.07}B_4$, $W_{0.92}Ta_{0.08}B_4$, $W_{0.91}Ta_{0.09}B_4$, $W_{0.90}Ta_{0.10}B_4$, $W_{0.89}Ta_{0.11}B_4$, $W_{0.88}Ta_{0.12}B_4$, $W_{0.87}Ta_{0.13}B_4$, $W_{0.86}Ta_{0.14}B_4$, $W_{0.85}Ta_{0.15}B_4$, $W_{0.84}Ta_{0.16}B_4$, $W_{0.83}Ta_{0.17}B_4$, $W_{0.82}Ta_{0.18}B_4$, $W_{0.81}Ta_{0.19}B_4$, $W_{0.80}Ta_{0.20}B_4$, $W_{0.75}Ta_{0.25}B_4$, $W_{0.70}Ta_{0.30}B_4$, $W_{0.65}Ta_{0.35}B_4$, $W_{0.60}Ta_{0.40}B_4$, $W_{0.55}Ta_{0.45}B_4$, or $W_{0.50}Ta_{0.50}B_4$. In some embodiments, M is Re. In some embodiments, the composite matrix is $W_{0.99}Re_{0.01134}$, $W_{0.98}Re_{0.02}B_4$, $W_{0.97}Re_{0.03}B_4$, $W_{0.96}Re_{0.04}B_4$, $W_{0.95}Re_{0.05}B_4$, $W_{0.94}Re_{0.06}B_4$, $W_{0.93}Re_{0.07}B_4$, $W_{0.92}Re_{0.08}B_4$, $W_{0.91}Re_{0.09}B_4$, $W_{0.90}Re_{0.10}B_4$, $W_{0.89}Re_{0.11}B_4$, $W_{0.88}Re_{0.12}B_4$, $W_{0.87}Re_{0.13}B_4$, $W_{0.86}Re_{0.14}B_4$, $W_{0.85}Re_{0.15}B_4$, $W_{0.84}Re_{0.16}B_4$, $W_{0.83}Re_{0.17}B_4$, $W_{0.82}Re_{0.18}B_4$, $W_{0.81}Re_{0.19}B_4$, $W_{0.80}Re_{0.20}B_4$, $W_{0.75}Re_{0.25}B_4$, $W_{0.70}Re_{0.30}B_4$, $W_{0.65}Re_{0.35}B_4$, $W_{0.60}Re_{0.40}B_4$, $W_{0.55}Re_{0.45}B_4$, or $W_{0.50}Re_{0.50}B_4$. In some embodiments, M is V. In some embodiments, the composite matrix is $W_{0.99}V_{0.01}B_4$, $W_{0.98}V_{0.02}B_4$, $W_{0.97}V_{0.03}B_4$, $W_{0.96}V_{0.04}B_4$, $W_{0.95}V_{0.05}B_4$, $W_{0.94}V_{0.06}B_4$, $W_{0.93}V_{0.07}B_4$, $W_{0.92}V_{0.08}B_4$, $W_{0.91}V_{0.09}B_4$, $W_{0.90}V_{0.10}B_4$, $W_{0.89}V_{0.11}B_4$, $W_{0.88}V_{0.12}B_4$, $W_{0.87}V_{0.13}B_4$, $W_{0.86}V_0i4B_4$, $W_{0.85}V_{0.15}B_4$, $W_{0.84}V_{0.16}B_4$, $W_{0.83}V_{0.17}B_4$, $W_{0.82}V_{0.18}B_4$, $W_{0.81}V_{0.19}B_4$, $W_{0.80}V_{0.20}B_4$, $W_{0.75}V_{0.25}B_4$, $W_{0.70}V_{0.30}B_4$, $W_{0.65}V_{0.35}B_4$, $W_{0.60}V_{0.40}B_4$, $W_{0.55}V_{0.45}B_4$, or $W_{0.50}V_{0.50}B_4$. In some embodiments, M is Nb. In some embodiments, the composite matrix is $W_{0.99}Nb_{0.01}B_4$, $W_{0.98}Nb_{0.02}B_4$, $W_{0.97}Nb_{0.03}B_4$, $W_{0.96}Nb_{0.04}B_4$, $W_{0.95}Nb_{0.05}B_4$, $W_{0.94}Nb_{0.06}B_4$, $W_{0.93}Nb_{0.07}B_4$, $W_{0.92}Nb_{0.08}B_4$, $W_{0.91}Nb_{0.09}B_4$, $W_{0.90}Nb_{0.10}B_4$, $W_{0.89}Nb_{0.11}B_4$, $W_{0.88}Nb_{0.12}B_4$, $W_{0.87}Nb_{0.13}B_4$, $W_{0.86}Nb_{0.14}B_4$, $W_{0.85}Nb_{0.15}B_4$, $W_{0.84}Nb_{0.16}B_4$, $W_{0.83}Nb_{0.17}B_4$, $W_{0.82}Nb_{0.18}B_4$, $W_{0.81}Nb_{0.19}B_4$, $W_{0.80}Nb_{0.20}B_4$, $W_{0.75}Nb_{0.25}B_4$, $W_{0.70}Nb_{0.30}B_4$, $W_{0.65}Nb_{0.35}B_4$, $W_{0.60}Nb_{0.40}B_4$, $W_{0.55}Nb_{0.45}B_4$, or $W_{0.50}Nb_{0.50}B_4$.

Described herein are composite matrices of $(W_{1-x}M_xB_4)_z(Q)_n$. In some embodiments, M is two or more metals. In such embodiments, the sum of the molar ratios of the two or more metals equal x. In some embodiments, at least one metal is Cr, Ta, Mo, or Mn. In some embodiments, M is Ta and Cr, and the sum of the molar ratios of Ta and Cr equal x. In some embodiments, the composite matrix is $W_{0.98}Ta_{0.01}Cr_{0.01}B_4$, $W_{0.97}Ta_{0.01}Cr_{0.02}B_4$, $W_{0.96}Ta_{0.03}Cr_{0.01}B_4$, $W_{0.95}Ta_{0.01}Cr_{0.04}B_4$, $W_{0.94}Ta_{0.01}Cr_{0.05}B_4$, $W_{0.93}Ta_{0.01}Cr_{0.06}B_4$, $W_{0.92}Ta_{0.01}Cr_{0.07}B_4$, $W_{0.91}Ta_{0.01}Cr_{0.08}B_4$, $W_{0.90}Ta_{0.01}Cr_{0.09}B_4$, $W_{0.89}Ta_{0.01}Cr_{0.1}B_4$, $W_{0.88}Ta_{0.01}Cr_{0.11}B_4$, $W_{0.87}Ta_{0.01}Cr_{0.12}B_4$, $W_{0.86}Ta_{0.01}Cr_{0.13}B_4$, $W_{0.85}Ta_{0.01}Cr_{0.14}B_4$, $W_{0.98}Ta_{0.02}Cr_{0.01}B_4$, $W_{0.96}Ta_{0.02}Cr_{0.02}B_4$, $W_{0.95}Ta_{0.02}Cr_{0.03}B_4$, $W_{0.94}Ta_{0.02}Cr_{0.04}B_4$, $W_{0.93}Ta_{0.02}Cr_{0.05}B_4$, $W_{0.92}Ta_{0.02}Cr_{0.06}B_4$, $W_{0.91}Ta_{0.02}Cr_{0.07}B_4$, $W_{0.90}Ta_{0.02}Cr_{0.08}B_4$, $W_{0.89}Ta_{0.02}Cr_{0.09}B_4$, $W_{0.88}Ta_{0.02}Cr_{0.1}B_4$, $W_{0.87}Ta_{0.02}Cr_{0.11}B_4$, $W_{0.86}Ta_{0.02}Cr_{0.12}B_4$, $W_{0.85}Ta_{0.02}Cr_{0.13}B_4$, $W_{0.84}Ta_{0.02}Cr_{0.14}B_4$, $W_{0.96}Ta_{0.03}Cr_{0.01}B_4$, $W_{0.95}Ta_{0.03}Cr_{0.02}B_4$, $W_{0.94}Ta_{0.03}Cr_{0.03}B_4$, $W_{0.93}Ta_{0.03}Cr_{0.04}B_4$, $W_{0.92}Ta_{0.03}Cr_{0.05}B_4$, $W_{0.91}Ta_{0.03}Cr_{0.06}B_4$, $W_{0.90}Ta_{0.03}Cr_{0.07}B_4$, $W_{0.89}Ta_{0.03}Cr_{0.08}B_4$, $W_{0.88}Ta_{0.03}Cr_{0.09}B_4$, $W_{0.87}Ta_{0.03}Cr_{0.1}B_4$, $W_{0.86}Ta_{0.03}Cr_{0.11}B_4$, $W_{0.85}Ta_{0.03}Cr_{0.12}B_4$, $W_{0.84}Ta_{0.03}Cr_{0.13}B_4$, $W_{0.83}Ta_{0.03}Cr_{0.14}B_4$, $W_{0.95}Ta_{0.04}Cr_{0.01}B_4$, $W_{0.94}Ta_{0.04}Cr_{0.02}B_4$, $W_{0.93}Ta_{0.04}Cr_{0.03}B_4$, $W_{0.92}Ta_{0.04}Cr_{0.04}B_4$, $W_{0.91}Ta_{0.04}Cr_{0.05}B_4$, $W_{0.90}Ta_{0.04}Cr_{0.06}B_4$, $W_{0.89}Ta_{0.04}Cr_{0.07}B_4$, $W_{0.88}Ta_{0.04}Cr_{0.08}B_4$, $W_{0.87}Ta_{0.04}Cr_{0.09}B_4$, $W_{0.86}Ta_{0.04}Cr_{0.1}B_4$, $W_{0.85}Ta_{0.04}Cr_{0.11}B_4$, $W_{0.84}Ta_{0.04}Cr_{0.12}B_4$, $W_{0.83}Ta_{0.04}Cr_{0.13}B_4$, $W_{0.82}Ta_{0.04}Cr_{0.14}B_4$, $W_{0.94}Ta_{0.05}Cr_{0.01}B_4$, $W_{0.93}Ta_{0.05}Cr_{0.02}B_4$, $W_{0.92}Ta_{0.05}Cr_{0.03}B_4$, $W_{0.91}Ta_{0.05}Cr_{0.04}B_4$, $W_{0.90}Ta_{0.05}Cr_{0.05}B_4$, $W_{0.89}Ta_{0.05}Cr_{0.06}B_4$, $W_{0.88}Ta_{0.05}Cr_{0.07}B_4$, $W_{0.87}Ta_{0.05}Cr_{0.08}B_4$, $W_{0.86}Ta_{0.05}Cr_{0.09}B_4$, $W_{0.85}Ta_{0.05}Cr_{0.1}B_4$, $W_{0.84}Ta_{0.05}Cr_{0.11}B_4$, $W_{0.83}Ta_{0.05}Cr_{0.12}B_4$, $W_{0.82}Ta_{0.05}Cr_{0.13}B_4$, or $W_{0.81}Ta_{0.05}Cr_{0.14}B_4$. In some embodiments, M is Ta and Mo, and the sum of the molar ratios of Ta and Mo equal x. In some embodiments, the composite matrix is $W_{0.98}Ta_{0.01}Mo_{0.01}B_4$, $W_{0.97}Ta_{0.01}Mo_{0.02}B_4$, $W_{0.96}Ta_{0.03}Mo_{0.01}B_4$, $W_{0.95}Ta_{0.01}Mo_{0.04}B_4$, $W_{0.94}Ta_{0.01}Mo_{0.05}B_4$, $W_{0.93}Ta_{0.01}Mo_{0.06}B_4$, $W_{0.92}Ta_{0.01}Mo_{0.07}B_4$, $W_{0.91}Ta_{0.01}Mo_{0.08}B_4$, $W_{0.90}Ta_{0.01}Mo_{0.09}B_4$, $W_{0.89}Ta_{0.01}Mo_{0.01}B_4$, $W_{0.88}Ta_{0.01}Mo_{0.11}B_4$, $W_{0.87}Ta_{0.01}Mo_{0.12}B_4$, $W_{0.86}Ta_{0.01}Mo_{0.13}B_4$, $W_{0.85}Ta_{0.01}Mo_{0.14}B_4$, $W_{0.98}Ta_{0.02}Mo_{0.01}B_4$, $W_{0.96}Ta_{0.02}Mo_{0.02}B_4$, $W_{0.95}Ta_{0.02}Mo_{0.03}B_4$, $W_{0.94}Ta_{0.02}Mo_{0.04}B_4$, $W_{0.93}Ta_{0.02}Mo_{0.05}B_4$, $W_{0.92}Ta_{0.02}Mo_{0.06}B_4$, $W_{0.91}Ta_{0.02}Mo_{0.07}B_4$, $W_{0.90}Ta_{0.02}Mo_{0.08}B_4$, $W_{0.89}Ta_{0.02}Mo_{0.09}B_4$, $W_{0.88}Ta_{0.02}Mo_{0.01}B_4$, $W_{0.87}Ta_{0.02}Mo_{0.11}B_4$, $W_{0.86}Ta_{0.02}Mo_{0.12}B_4$, $W_{0.85}Ta_{0.02}Mo_{0.13}B_4$, $W_{0.84}Ta_{0.02}Mo_{0.14}B_4$, $W_{0.96}Ta_{0.03}Mo_{0.01}B_4$, $W_{0.95}Ta_{0.03}Mo_{0.02}B_4$, $W_{0.94}Ta_{0.03}Mo_{0.03}B_4$, $W_{0.93}Ta_{0.03}Mo_{0.04}B_4$, $W_{0.92}Ta_{0.03}Mo_{0.05}B_4$, $W_{0.91}Ta_{0.03}Mo_{0.06}B_4$, $W_{0.90}Ta_{0.03}Mo_{0.07}B_4$, $W_{0.89}Ta_{0.03}Mo_{0.08}B_4$, $W_{0.88}Ta_{0.03}Mo_{0.09}B_4$, $W_{0.87}Ta_{0.03}Mo_{0.1}B_4$, $W_{0.86}Ta_{0.03}Mo_{0.11}B_4$, $W_{0.85}Ta_{0.03}Mo_{0.12}B_4$, $W_{0.84}Ta_{0.03}Mo_{0.13}B_4$, $W_{0.83}Ta_{0.03}Mo_{0.14}B_4$, $W_{0.95}Ta_{0.04}Mo_{0.01}B_4$, $W_{0.94}Ta_{0.04}Mo_{0.02}B_4$, $W_{0.93}Ta_{0.04}Mo_{0.03}B_4$, $W_{0.92}Ta_{0.04}Mo_{0.04}B_4$, $W_{0.91}Ta_{0.04}Mo_{0.05}B_4$, $W_{0.90}Ta_{0.04}Mo_{0.06}B_4$, $W_{0.89}Ta_{0.04}Mo_{0.07}B_4$, $W_{0.88}Ta_{0.04}Mo_{0.08}B_4$, $W_{0.87}Ta_{0.04}Mo_{0.09}B_4$, $W_{0.86}Ta_{0.04}Mo_{0.1}B_4$, $W_{0.85}Ta_{0.04}Mo_{0.11}B_4$, $W_{0.84}Ta_{0.04}Mo_{0.12}B_4$, $W_{0.83}Ta_{0.04}Mo_{0.13}B_4$, $W_{0.82}Ta_{0.04}Mo_{0.14}B_4$, $W_{0.94}Ta_{0.05}Mo_{0.01}B_4$, $W_{0.93}Ta_{0.05}Mo_{0.02}B_4$, $W_{0.92}Ta_{0.05}Mo_{0.03}B_4$, $W_{0.91}Ta_{0.05}Mo_{0.04}B_4$, $W_{0.90}Ta_{0.05}Mo_{0.05}B_4$, $W_{0.89}Ta_{0.05}Mo_{0.06}B_4$, $W_{0.88}Ta_{0.05}Mo_{0.07}B_4$, $W_{0.87}Ta_{0.05}Mo_{0.08}B_4$, $W_{0.86}Ta_{0.05}Mo_{0.09}B_4$, $W_{0.85}Ta_{0.05}Mo_{0.1}B_4$, $W_{0.84}Ta_{0.05}Mo_{0.11}B_4$, $W_{0.83}Ta_{0.05}Mo_{0.12}B_4$, $W_{0.82}Ta_{0.05}Mo_{0.13}B_4$, or $W_{0.81}Ta_{0.05}Mo_{0.14}B_4$.

Described herein are composite matrices of $(W_{1-x}M_xB_4)_z(Q)_n$. In some embodiments, Q is one or more ceramics. The chemical properties of the ceramic affect the reactivity of the ceramic with $W_{1-x}M_xB_4$ or $WB_4$ under the synthetic conditions described herein. For example, ceramics with lower melting points may have higher mobility under the required synthetic conditions and react with a higher proportion of the $W_{1-x}M_xB_4$ or $WB_4$. In another example, denser ceramics may have a lower reactivity and mobility at the elevated temperatures required to form the composite matrices. Melting points and densities of some of the ceramics in the disclosure are listed below in Table 1.

TABLE 1

| Ceramic | Melting point (° C.) | Density (g/cm³) |
|---|---|---|
| TiB₂ | 3,230 | 4.52 |
| HfB₂ | 3,250 | 10.5 |
| ReB₂ | 2,400 | 12.7 |
| B₄C | 2,763 | 2.52 |
| cubic-BN | 2,973 | 3.45 |
| B₆O | 2,000 | 2.56 |
| TiC | 3,160 | 4.93 |
| ZrC | 3,532-3,540 | 6.73 |
| VC | 2,810 | 5.77 |
| NbC | 3,608 | 7.820 |
| TaC | 4,780-5,470 | 14.3-14.65 |
| Cr₃C₂ | 1,895 | 6.68 |
| MoC | 2,687 | 8.90 |
| SiC | 2,830 | 3.16 |
| TiN | 2,947 | 5.21 |
| ZrN | 2,952 | 7.09 |
| TiSi2 | 1,470 | 4.02 |
| Si₃N₄ | 1,900 | 3.17 |
| TiO₂ | 1,843 | 4.23 (rutile), 3.78 (anatase) |
| ZrO₂ | 2,715 | 5.68 |
| Al₂O₃ | 2,072 | 3.987 |
| SiO₂ | 1,713 | 2.648 (α-quartz), 2.196 (amorphous) |

In some embodiments, Q is one or more ceramics with a melting point above 1500° C., 1600° C., 1700° C., 1800° C., 1900° C., 2000° C., 2100° C., 2200° C., 2300° C., 2400° C., 2500° C., 2600° C., 2700° C., 2800° C., 2900° C., 3000° C., 3100° C., 3200° C., 3300° C., 3400° C., 3500° C., 3600° C., 3700° C., 3800° C., 3900° C., 4000° C., or 4500° C. In some embodiments, Q is one or more ceramics with a melting point below 1500° C., 1600° C., 1700° C., 1800° C., 1900° C., 2000° C., 2100° C., 2200° C., 2300° C., 2400° C., 2500° C., 2600° C., 2700° C., 2800° C., 2900° C., 3000° C., 3100° C., 3200° C., 3300° C., 3400° C., 3500° C., 3600° C., 3700° C., 3800° C., 3900° C., 4000° C., or 4500° C. In some embodiments, Q is one or more ceramics with a melting point of about 1,500° C. to about 5,500° C. In some embodiments, Q is one or more ceramics with a melting point of about 1,500° C. to about 2,000° C., about 1,500° C. to about 2,300° C., about 1,500° C. to about 2,500° C., about 1,500° C. to about 2,700° C., about 1,500° C. to about 3,000° C., about 1,500° C. to about 3,200° C., about 1,500° C. to about 3,400° C., about 1,500° C. to about 3,700° C., about 1,500° C. to about 4,000° C., about 1,500° C. to about 4,500° C., about 1,500° C. to about 5,500° C., about 2,000° C. to about 2,300° C., about 2,000° C. to about 2,500° C., about 2,000° C. to about 2,700° C., about 2,000° C. to about 3,000° C., about 2,000° C. to about 3,200° C., about 2,000° C. to about 3,400° C., about 2,000° C. to about 3,700° C., about 2,000° C. to about 4,000° C., about 2,000° C. to about 4,500° C., about 2,000° C. to about 5,500° C., about 2,300° C. to about 2,500° C., about 2,300° C. to about 2,700° C., about 2,300° C. to about 3,000° C., about 2,300° C. to about 3,200° C., about 2,300° C. to about 3,400° C., about 2,300° C. to about 3,700° C., about 2,300° C. to about 4,000° C., about 2,300° C. to about 4,500° C., about 2,300° C. to about 5,500° C., about 2,500° C. to about 2,700° C., about 2,500° C. to about 3,000° C., about 2,500° C. to about 3,200° C., about 2,500° C. to about 3,400° C., about 2,500° C. to about 3,700° C., about 2,500° C. to about 4,000° C., about 2,500° C. to about 4,500° C., about 2,500° C. to about 5,500° C., about 2,700° C. to about 3,000° C., about 2,700° C. to about 3,200° C., about 2,700° C. to about 3,400° C., about 2,700° C. to about 3,700° C., about 2,700° C. to about 4,000° C., about 2,700° C. to about 4,500° C., about 2,700° C. to about 5,500° C., about 3,000° C. to about 3,200° C., about 3,000° C. to about 3,400° C., about 3,000° C. to about 3,700° C., about 3,000° C. to about 4,000° C., about 3,000° C. to about 4,500° C., about 3,000° C. to about 5,500° C., about 3,200° C. to about 3,400° C., about 3,200° C. to about 3,700° C., about 3,200° C. to about 4,000° C., about 3,200° C. to about 4,500° C., about 3,200° C. to about 5,500° C., about 3,400° C. to about 3,700° C., about 3,400° C. to about 4,000° C., about 3,400° C. to about 4,500° C., about 3,400° C. to about 5,500° C., about 3,700° C. to about 4,000° C., about 3,700° C. to about 4,500° C., about 3,700° C. to about 5,500° C., about 4,000° C. to about 4,500° C., about 4,000° C. to about 5,500° C., or about 4,500° C. to about 5,500° C. In some embodiments, Q is one or more ceramics with a melting point of about 1,500° C., about 2,000° C., about 2,300° C., about 2,500° C., about 2,700° C., about 3,000° C., about 3,200° C., about 3,400° C., about 3,700° C., about 4,000° C., about 4,500° C., or about 5,500° C. In some embodiments, Q is one or more ceramics with a melting point of at least about 1,500° C., about 2,000° C., about 2,300° C., about 2,500° C., about 2,700° C., about 3,000° C., about 3,200° C., about 3,400° C., about 3,700° C., about 4,000° C., or about 4,500° C. In some embodiments, Q is one or more ceramics with a melting point of at most about 2,000° C., about 2,300° C., about 2,500° C., about 2,700° C., about 3,000° C., about 3,200° C., about 3,400° C., about 3,700° C., about 4,000° C., about 4,500° C., or about 5,500° C.

In some embodiments, Q is one or more ceramics with a density of about 2 g/cm³ to about 15 g/cm³. In some embodiments, Q is one or more ceramics with a density of about 2 g/cm³ to about 3 g/cm³, about 2 g/cm³ to about 4 g/cm³, about 2 g/cm³ to about 5 g/cm³, about 2 g/cm³ to about 6 g/cm³, about 2 g/cm³ to about 7 g/cm³, about 2 g/cm³ to about 8 g/cm³, about 2 g/cm³ to about 9 g/cm³, about 2 g/cm³ to about 10 g/cm³, about 2 g/cm³ to about 12 g/cm³, about 2 g/cm³ to about 15 g/cm³, about ³ g/cm³ to about 4 g/cm³, about ³ g/cm³ to about 5 g/cm³, about ³ g/cm³ to about 6 g/cm³, about ³ g/cm³ to about 7 g/cm³, about ³ g/cm³ to about 8 g/cm³, about ³ g/cm³ to about 9 g/cm³, about ³ g/cm³ to about 10 g/cm³, about ³ g/cm³ to about 12 g/cm³, about ³ g/cm³ to about 15 g/cm³, about 4 g/cm³ to about 5 g/cm³, about 4 g/cm³ to about 6 g/cm³, about 4 g/cm³ to about 7 g/cm³, about 4 g/cm³ to about 8 g/cm³, about 4 g/cm³ to about 9 g/cm³, about 4 g/cm³ to about 10 g/cm³, about 4 g/cm³ to about 11 g/cm³, about 4 g/cm³ to about 12 g/cm³, about 4 g/cm³ to about 15 g/cm³, about 5 g/cm³ to about 6 g/cm³, about 5 g/cm³ to about 7 g/cm³, about 5 g/cm³ to about 8 g/cm³, about 5 g/cm³ to about 9 g/cm³, about 5 g/cm³ to about 10 g/cm³, about 5 g/cm³ to about 11 g/cm³, about 5 g/cm³ to about 12 g/cm³, about 5 g/cm³ to about 15 g/cm³, about 6 g/cm³ to about 7 g/cm³, about 6 g/cm³ to about 8 g/cm³, about 6 g/cm³ to about 9 g/cm³, about 6 g/cm³ to about 10 g/cm³, about 6 g/cm³ to about 11 g/cm³, about 6 g/cm³ to about 12 g/cm³, about 6 g/cm³ to about 15 g/cm³, about 7 g/cm³ to about 8 g/cm³, about 7 g/cm³ to about 9 g/cm³, about 7 g/cm³ to about 10 g/cm³, about 7 g/cm³ to about 11 g/cm³, about 7 g/cm³ to about 12 g/cm³, about 7 g/cm³ to about 15 g/cm³, about 8 g/cm³ to about 9 g/cm³, about 8 g/cm³ to about 10 g/cm³, about 8 g/cm³ to about 12 g/cm³, about 8 g/cm³ to about 15 g/cm³, about 9 g/cm³ to about 10 g/cm³, about 9 g/cm³ to about 12 g/cm³, about 9 g/cm³ to about 15 g/cm³, about 10 g/cm³ to about 12 g/cm³, about 10 g/cm³ to about 15 g/cm³, or about 12 g/cm³ to about 15 g/cm³. In some embodiments, Q is one or more ceramics with a density of about 2 g/cm³, about ³ g/cm³, about 4 g/cm³, about 5 g/cm³, about 6 g/cm³, about 7 g/cm³, about 8 g/cm³, about 9 g/cm³, about 10 g/cm³, about 12 g/cm³, or about 15 g/cm³. In some embodiments, Q is one or more ceramics with a density of at least

14 about 2 g/cm³, about ³ g/cm³, about 4 g/cm³, about 5 g/cm³, about 6 g/cm³, about 7 g/cm³, about 8 g/cm³, about 9 g/cm³, about 10 g/cm³, or about 12 g/cm³. In some embodiments, Q is one or more ceramics with a density of at most about ³ g/cm³, about 4 g/cm³, about 5 g/cm³, about 6 g/cm³, about 7 g/cm³, about 8 g/cm³, about 9 g/cm³, about 10 g/cm³, about 12 g/cm³, or about 15 g/cm³. In some embodiments, Q is one or more ceramics with a density of at most about 2 g/cm³, about ³ g/cm³, about 4 g/cm³, about 5 g/cm³, about 6 g/cm³, about 7 g/cm³, about 8 g/cm³, about 9 g/cm³, about 10 g/cm³, or about 12 g/cm³. In some embodiments, Q is one or more ceramics with a density of at most about ³ g/cm³, about 4 g/cm³, about 5 g/cm³, about 6 g/cm³, about 7 g/cm³, about 8 g/cm³, about 9 g/cm³, about 10 g/cm³, about 12 g/cm³, or about 15 g/cm³.

Described herein are composite matrices of $(W_{1-x}M_xB_4)_z(Q)_n$. In some embodiments, Q is one or more ceramics, wherein each of the one or more ceramics comprises at least two elements, and at least one of the two elements is B (boron), C (carbon), Si (silicon), N (nitrogen), or O (oxygen). In some embodiments, the one or more ceramics comprises at least B, C, Si, or N. In some embodiments, the one or more ceramics comprises at least B, C, or Si. In some embodiments, the one or more ceramics comprises at least O. In some embodiments, the one or more ceramics comprises at least B. In some embodiments, the one or more ceramics comprises at least C. In some embodiments, the one or more ceramics comprises at least N. In some embodiments, the one or more ceramics comprises at least Si. In some embodiments, the one or more ceramics comprises one or more metal selected from Ti, Zr, Hf, V, Nb, Ta, Cr, Mo, W, Mn, Re, Fe, and Ru. In some embodiments, the one or more ceramics comprises one or more metal selected from Ti, V, Nb, Ta, Cr, Mo, W, Mn, Re, Fe, and Ru. In some embodiments, the one or more ceramics comprises one or more metal selected from Cr, Mo, W, Mn, Re, Fe, and Ru. In some embodiments, the one or more ceramics comprises one or more metal selected from Ti, Zr, Hf, V, Nb, and Ta. In some embodiments, the one or more ceramics does not comprise a ceramic containing Hf, Zr, or Y.

In some embodiments, Q is one or more ceramics selected from $TiB_2$, $HfB_2$, $TaB_2$, $FeB_4$, $RuB_2$, $Ru_2B_3$, $ReB_2$, $B_4C$, $B_4Si$, cubic-BN, BCN, $BC_2N$, $B_2O_3$, $B_6O$, TiC, ZrC, VC, NbC, $NbC_2$, TaC, $Cr_3C_2$, MoC, $MoC_2$, SiC, TiN, ZrN, TiSi, $TiSi_2$, $Ti_5Si_3$, SiAlON, $Si_3N_4$, $TiO_2$, $ZrO_2$, $Al_2O_3$, and $SiO_2$. In some embodiments, Q is one or more ceramics selected from $TiB_2$, $TaB_2$, $FeB_4$, $RuB_2$, $Ru_2B_3$, $ReB_2$, $B_4C$, $B_4Si$, cubic-BN, BCN, $BC_2B$, $B_2O_3$, $B_6O$, TiC, ZrC, VC, NbC, $NbC_2$, TaC, $Cr_3C_2$, MoC, $MoC_2$, SiC, TiN, ZrN, TiSi, $TiSi_2$, $Ti_5Si_3$, SiAlON, $Si_3N_4$, $TiO_2$, $ZrO_2$, $Al_2O_3$, and $SiO_2$. In some embodiments, Q is one or more ceramics selected from $TiB_2$, $HfB_2$, $TaB_2$, $FeB_4$, $RuB_2$, $Ru_2B_3$, $ReB_2$, $B_4C$, $B_4Si$, cubic-BN, BCN, $BC_2B$, $B_2O_3$, and $B_6O$. In some embodiments, Q is one or more ceramics selected from $TiB_2$, $TaB_2$, $FeB_4$, $RuB_2$, $Ru_2B_3$, $ReB_2$, $B_4C$, $B_4Si$, cubic-BN, BCN, $BC_2B$, $B_2O_3$, and $B_6O$. In some embodiments, Q is one or more ceramics selected from $B_4C$, BCN, $BC_2B$, TiC, ZrC, VC, NbC, $NbC_2$, TaC, MoC, $MoC_2$, and SiC. In some embodiments, Q is one or more ceramics selected from cubic-BN, BCN, $BC_2B$, TiN, ZrN, SiAlON, and $Si_3N_4$. In some embodiments, Q is one or more ceramics selected from $B_2O_3$, $B_6O$, $TiO_2$, $ZrO_2$, $Al_2O_3$, and $SiO_2$. In some embodiments, Q is one or more ceramics selected from SiC, TiSi, $TiSi_2$, $Ti_5Si_3$, SiAlON, $Si_3N_4$, and $SiO_2$. In some embodiments, Q is one or more ceramics selected from $TiB_2$, SiC, or $B_4C$. In some embodiments, Q is not WC.

Described herein are composite matrices of $(W_{1-x}M_xB_4)_z(Q)_n$, wherein:

M is one or more of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), ruthenium (Ru), hafnium (Hf), tantalum (Ta), rhenium (Re), osmium (Os), iridium (Ir), lithium (Li), yttrium (Y) and aluminum (Al);

x is from 0.001 to 0.999;

Q is one or more ceramics, wherein each of the one or more ceramics comprises at least two elements, and at least one of the two elements is B (boron), C (carbon), Si (silicon), N (nitrogen), or O (oxygen);

z is a volume percent from 0.1% to 99.9%;

n is a volume percent from 0.1% to 99.9%; and the sum of n and z is 100%.

Described herein are composite matrices of $(W_{1-x}M_xB_4)_z(Q)_n$, wherein:

M is one or more of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), ruthenium (Ru), hafnium (Hf), tantalum (Ta), rhenium (Re), osmium (Os), iridium (Ir), lithium (Li), yttrium (Y) and aluminum (Al);

x is from 0.001 to 0.4;

Q is one or more ceramics, wherein each of the one or more ceramics comprises at least two elements, and at least one of the two elements is B (boron), C (carbon), Si (silicon), N (nitrogen), or O (oxygen);

z is a volume percent from 0.1% to 70%;

n is a volume percent from 30% to 99.9%; and the sum of n and z is 100%.

Described herein are composite matrices of $(W_{1-x}M_xB_4)_z(Q)_n$, wherein:

M is one or more of titanium (Ti), vanadium (V), chromium (Cr), manganese (Mn), zirconium (Zr), niobium (Nb), molybdenum (Mo), hafnium (Hf), tantalum (Ta), and rhenium (Re);

x is from 0.001 to 0.999;

Q is one or more ceramics, wherein each of the one or more ceramics comprises at least two elements, and at least one of the two elements is B (boron), C (carbon), Si (silicon), N (nitrogen), or O (oxygen);

z is a volume percent from 0.1% to 99.9%;

n is a volume percent from 0.1% to 99.9%; and the sum of n and z is 100%.

Described herein are composite matrices of $(W_{1-x}M_xB_4)_z(Q)_n$, wherein:

M is one or more of titanium (Ti), vanadium (V), chromium (Cr), manganese (Mn), zirconium (Zr), niobium (Nb), molybdenum (Mo), hafnium (Hf), tantalum (Ta), and rhenium (Re);

x is from 0.001 to 0.4;

Q is one or more ceramics, wherein each of the one or more ceramics comprises at least two elements, and at least one of the two elements is B (boron), C (carbon), Si (silicon), N (nitrogen), or O (oxygen);

z is a volume percent from 0.1% to 70%;

n is a volume percent from 30% to 99.9%; and the sum of n and z is 100%.

Described herein are composite matrices of the formula $(WB_4)_z(Q)_n$, wherein:

Q is one or more ceramics, wherein each of the one or more ceramics comprises at least two elements, and at least one of the two elements is B (boron), C (carbon), Si (silicon), N (nitrogen), or O (oxygen);

z is a volume percent from 0.1% to 99.9%;

n is a volume percent from 0.1% to 99.9%; and the sum of n and z is 100%.

Described herein are composite matrices of the formula $(WB_4)_z(Q)_n$, wherein:

Q is one or more ceramics, wherein each of the one or more ceramics comprises at least two elements, and at least one of the two elements is B (boron), C (carbon), Si (silicon), N (nitrogen), or O (oxygen);

z is a volume percent from 0.1% to 70%;

n is a volume percent from 30% to 99.9%; and the sum of n and z is 100%.

In some embodiments, z has a value within the range of 0.1% to 99.9% by volume, n has a value within the range of about 0.1% to 99.9% by volume, and the sum of z and n are 100%.

In some embodiments, z is about 0.1% to about 40%. In some embodiments, z is about 0.1% to about 1%, about 0.1% to about 5%, about 0.1% to about 7%, about 0.1% to about 10% , about 0.1% to about 13%, about 0.1% to about 15%, about 0.1% to about 20%, about 0.1% to about 25%, about 0.1% to about 30%, about 0.1% to about 35%, about 0.1% to about 40%, about 1% to about 5%, about 1% to about 7%, about 1% to about 10%, about 1% to about 13% , about 1% to about 15%, about 1% to about 20%, about 1% to about 25%, about 1% to about 30%, about 1% to about 35%, about 1% to about 40%, about 5% to about 7%, about 5% to about 10%, about 5% to about 13%, about 5% to about 15%, about 5% to about 20%, about 5% to about 25%, about 5% to about 30%, about 5% to about 35%, about 5% to about 40%, about 7% to about 10%, about 7% to about 13%, about 7% to about 15%, about 7% to about 20% , about 7% to about 25%, about 7% to about 30%, about 7% to about 35%, about 7% to about 40%, about 10% to about 13%, about 10% to about 15%, about 10% to about 20%, about 10% to about 25%, about 10% to about 30%, about 10% to about 35%, about 10% to about 40% , about 13% to about 15%, about 13% to about 20%, about 13% to about 25%, about 13% to about 30%, about 13% to about 35%, about 13% to about 40%, about 15% to about 20%, about 15% to about 25%, about 15% to about 30%, about 15% to about 35%, about 15% to about 40% , about 20% to about 25%, about 20% to about 30%, about 20% to about 35%, about 20% to about 40%, about 25% to about 30%, about 25% to about 35%, about 25% to about 40%, about 30% to about 35%, about 30% to about 40%, or about 35% to about 40%. In some embodiments, z is about 0.1%, about 1%, about 5%, about 7%, about 10%, about 13%, about 15%, about 20%, about 25%, about 30%, about 35%, or about 40%. In some embodiments, z is at least about 0.1%, about 1%, about 5%, about 7%, about 10%, about 13%, about 15%, about 20%, about 25%, about 30%, or about 35%. In some embodiments, z is at most about 1%, about 5%, about 7%, about 10%, about 13%, about 15%, about 20%, about 25%, about 30%, about 35%, or about 40%.

In some embodiments, z is about 60% to about 95%. In some embodiments, z is about 60% to about 65%, about 60% to about 70%, about 60% to about 75%, about 60% to about 77% , about 60% to about 80%, about 60% to about 82%, about 60% to about 75%, about 60% to about 88%, about 60% to about 90%, about 60% to about 92%, about 60% to about 95%, about 65% to about 70%, about 65% to about 75%, about 65% to about 77%, about 65% to about 80% , about 65% to about 82%, about 65% to about 75%, about 65% to about 88%, about 65% to about 90%, about 65% to about 92%, about 65% to about 95%, about 70% to about 75%, about 70% to about 77%, about 70% to about 80%, about 70% to about 82%, about 70% to about 75% , about 70% to about 88%, about 70% to about 90%, about 70% to about 92%, about 70% to about 95%, about 75% to about 77%, about 75% to about 80%, about 75% to about 82%, about 75% to about 75%, about 75% to about 88%, about 75% to about 90%, about 75% to about 92% , about 75% to about 95%, about 77% to about 80%, about 77% to about 82%, about 77% to about 75%, about 77% to about 88%, about 77% to about 90%, about 77% to about 92%, about 77% to about 95%, about 80% to about 82%, about 80% to about 75%, about 80% to about 88% , about 80% to about 90%, about 80% to about 92%, about 80% to about 95%, about 82% to about 75%, about 82% to about 88%, about 82% to about 90%, about 82% to about 92%, about 82% to about 95%, about 75% to about 88%, about 75% to about 90%, about 75% to about 92% , about 75% to about 95%, about 88% to about 90%, about 88% to about 92%, about 88% to about 95%, about 90% to about 92%, about 90% to about 95%, or about 92% to about 95%. In some embodiments, z is about 60%, about 65%, about 70%, about 75%, about 77%, about 80%, about 82%, about 75%, about 88%, about 90%, about 92%, or about 95%. In some embodiments, z is at least about 60%, about 65%, about 70%, about 75%, about 77%, about 80% , about 82%, about 75%, about 88%, about 90%, or about 92%. In some embodiments, z is at most about 65%, about 70%, about 75%, about 77%, about 80%, about 82%, about 75%, about 88%, about 90%, about 92%, or about 95%.

In some embodiments, a composite matrix described herein has a Vickers hardness (measured at 1kg or 9.8 N) of about 15 GPa to about 35 GPa. In some embodiments, a composite matrix described herein has a Vickers hardness of about 15 GPa to about 19 GPa, about 15 GPa to about 20 GPa, about 15 GPa to about 21 GPa, about 15 GPa to about 22 GPa, about 15 GPa to about 23 GPa, about 15 GPa to about 25 GPa, about 15 GPa to about 27 GPa, about 15 GPa to about 29 GPa, about 15 GPa to about 31 GPa, about 15 GPa to about 33 GPa, about 15 GPa to about 35 GPa, about 19 GPa to about 20 GPa, about 19 GPa to about 21 GPa, about 19 GPa to about 22 GPa, about 19 GPa to about 23 GPa, about 19 GPa to about 25 GPa, about 19 GPa to about 27 GPa, about 19 GPa to about 29 GPa, about 19 GPa to about 31 GPa, about 19 GPa to about 33 GPa, about 19 GPa to about 35 GPa, about 20 GPa to about 21 GPa, about 20 GPa to about 22 GPa, about 20 GPa to about 23 GPa, about 20 GPa to about 25 GPa, about 20 GPa to about 27 GPa, about 20 GPa to about 29 GPa, about 20 GPa to about 31 GPa, about 20 GPa to about 33 GPa, about 20 GPa to about 35 GPa, about 21 GPa to about 22 GPa, about 21 GPa to about 23 GPa, about 21 GPa to about 25 GPa, about 21 GPa to about 27 GPa, about 21 GPa to about 29 GPa, about 21 GPa to about 31 GPa, about 21 GPa to about 33 GPa, about 21 GPa to about 35 GPa, about 22 GPa to about 23 GPa, about 22 GPa to about 25 GPa, about 22 GPa to about 27 GPa, about 22 GPa to about 29 GPa, about 22 GPa to about 31 GPa, about 22 GPa to about 33 GPa, about 22 GPa to about 35 GPa, about 23 GPa to about 25 GPa, about 23 GPa to about 27 GPa, about 23 GPa to about 29 GPa, about 23 GPa to about 31 GPa, about 23 GPa to about 33 GPa, about 23 GPa to about 35 GPa, about 25 GPa to about 27 GPa, about 25 GPa to about 29 GPa, about 25 GPa to about 31 GPa, about 25 GPa to about 33 GPa, about 25 GPa to about 35 GPa, about 27 GPa to about 29 GPa, about 27 GPa to about 31 GPa, about 27 GPa to about 33 GPa, about 27 GPa to about 35 GPa, about 29 GPa to about 31 GPa, about 29

GPa to about 33 GPa, about 29 GPa to about 35 GPa, about 31 GPa to about 33 GPa, about 31 GPa to about 35 GPa, or about 33 GPa to about 35 GPa. [0001] In some embodiments, a composite matrix described herein has a Vickers hardness of about 15 GPa, about 19 GPa, about 20 GPa, about 21 GPa, about 22 GPa, about 23 GPa, about 25 GPa, about 27 GPa, about 29 GPa, about 31 GPa, about 33 GPa, or about 35 GPa. In some embodiments, a composite matrix described herein has a Vickers hardness of at least about 15 GPa, about 19 GPa, about 20 GPa, about 21 GPa, about 22 GPa, about 23 GPa, about 25 GPa, about 27 GPa, about 29 GPa, about 31 GPa, or about 33 GPa.

In some embodiments, a composite matrix described herein has a Vickers hardness of at most about 19 GPa, about 20 GPa, about 21 GPa, about 22 GPa, about 23 GPa, about 25 GPa, about 27 GPa, about 29 GPa, about 31 GPa, about 33 GPa, or about 35 GPa.

In some embodiments, a composite matrix described herein has a Palmquist toughness of about 1 MPa m$^{1/2}$ to about 12 MPa m$^{1/2}$. In some embodiments, a composite matrix described herein has a Palmquist toughness of about 1 MPa m$^{1/2}$ to about 2 MPa m$^{1/2}$, about 1 MPa m$^{1/2}$ to about 3 MPa m$^{1/2}$, about 1 MPa m$^{1/2}$ to about 4MPa m$^{1/2}$, about 1 MPa m$^{1/2}$ to about 5 MPa m$^{1/2}$, about 1 MPa m$^{1/2}$ to about 6 MPa m$^{1/2}$, about 1MPa m$^{1/2}$ to about 7 MPa m$^{1/2}$, about 1 MPa m$^{1/2}$ to about 8 MPa m$^{1/2}$, about 1 MPa m$^{1/2}$ to about 9MPa m$^{1/2}$, about 1 MPa m$^{1/2}$ to about 10 MPa m$^{1/2}$, about 1 MPa m$^{1/2}$ to about 11 MPa m$^{1/2}$, about 1MPa m$^{1/2}$ to about 12 MPa m$^{1/2}$, about 2 MPa m$^{1/2}$ to about 3 MPa m$^{1/2}$, about 2 MPa m$^{1/2}$ to about 4MPa m$^{1/2}$, about 2 MPa m$^{1/2}$ to about 5 MPa m$^{1/2}$, about 2 MPa m$^{1/2}$ to about 6 MPa m$^{1/2}$, about 2MPa m$^{1/2}$ to about 7 MPa m$^{1/2}$, about 2 MPa m$^{1/2}$ to about 8 MPa m$^{1/2}$, about 2 MPa m$^{1/2}$ to about 9MPa m$^{1/2}$, about 2 MPa m$^{1/2}$ to about 10 MPa m$^{1/2}$, about 2 MPa m$^{1/2}$ to about 11 MPa m$^{1/2}$, about 2MPa m$^{1/2}$ to about 12 MPa m$^{1/2}$, about 3 MPa m$^{1/2}$ to about 4 MPa m$^{1/2}$, about 3 MPa m$^{1/2}$ to about 5MPa m$^{1/2}$, about 3 MPa m$^{1/2}$ to about 6 MPa m$^{1/2}$, about 3 MPa m$^{1/2}$ to about 7 MPa m$^{1/2}$, about 3 MPa m$^{1/2}$ to about 8 MPa m$^{1/2}$, about 3 MPa m$^{1/2}$ to about 9 MPa m$^{1/2}$, about 3 MPa m$^{1/2}$ to about 10 MPa m$^{1/2}$, about 3 MPa m$^{1/2}$ to about 11 MPa m$^{1/2}$, about 3 MPa m$^{1/2}$ to about 12 MPa m$^{1/2}$, about 4MPa m$^{1/2}$ to about 5 MPa m$^{1/2}$, about 4 MPa m$^{1/2}$ to about 6 MPa m$^{1/2}$, about 4 MPa m$^{1/2}$ to about 7MPa m$^{1/2}$, about 4 MPa m$^{1/2}$ to about 8 MPa m$^{1/2}$, about 4 MPa m$^{1/2}$ to about 9 MPa m$^{1/2}$, about 4MPa m$^{1/2}$ to about 10 MPa m$^{1/2}$, about 4 MPa m$^{1/2}$ to about 11 MPa m$^{1/2}$, about 4 MPa m$^{1/2}$ to about 12 MPa m$^{1/2}$, about 5 MPa m$^{1/2}$ to about 6 MPa M$^{112}$, about 5 MPa m$^{1/2}$ to about 7 MPa m$^{1/2}$, about 5 MPa m$^{1/2}$ to about 8MPa m$^{1/2}$, about 5 MPa M$^{112}$ to about 9 MPa m$^{1/2}$, about 5 MPa m$^{1/2}$ to about 10 MPa m$^{1/2}$, about 5MPa m$^{1/2}$ to about 11 MPa m$^{1/2}$, about 5 MPa m$^{1/2}$ to about 12 MPa m$^{1/2}$, about 6 MPa M$^{112}$ to about 7 MPa m$^{1/2}$, about 6 MPa M$^{112}$ to about 8 MPa m$^{1/2}$, about 6 MPa m$^{1/2}$ to about 9 MPa m$^{1/2}$, about 6 MPa m$^{112}$ to about 10 MPa m$^{1/2}$, about 6 MPa m$^{1/2}$ to about 11 MPa m$^{1/2}$, about 6 MPa m$^{1/2}$ to about 12 MPa m$^{1/2}$, about 7 MPa m$^{1/2}$ to about 8 MPa m$^{1/2}$, about 7MPa m$^{1/2}$ to about 9 MPa m$^{1/2}$, about 7 MPa m$^{1/2}$ to about 10 MPa m$^{1/2}$, about 7 MPa m$^{1/2}$ to about 11 MPa m$^{1/2}$, about 7 MPa m$^{1/2}$ to about 12 MPa M$^{112}$, about 8 MPa m$^{1/2}$ to about 9 MPa m$^{1/2}$, about 8 MPa m$^{1/2}$ to about 10 MPa m$^{1/2}$, about 8 MPa M$^{112}$ to about 11 MPa m$^{1/2}$, about 8 MPa m$^{1/2}$ to about 12 MPa m$^{1/2}$, about 9 MPa m$^{1/2}$ to about 10 MPa m$^{1/2}$, about 9 MPa m$^{1/2}$ to about 11 MPa m$^{1/2}$, about 9 MPa M$^{112}$ to about 12 MPa m$^{1/2}$, about 10 MPa m$^{1/2}$ to about 11 MPa m$^{1/2}$, about 10 MPa m$^{1/2}$ to about 12 MPa m$^{1/2}$, or about 11 MPa m$^{1/2}$ to about 12 MPa m$^{1/2}$. In some embodiments, a composite matrix described herein has a Palmquist toughness of about 1 MPa $m^{1/2}$, about 2 MPa $m^{1/2}$, about 3 MPa $m^{1/2}$, about 4 MPa $m^{1/2}$, about 5 MPa $M^{112}$, about 6 MPa $M^{112}$, about 7 MPa $M^{112}$, about 8 MPa $M^{112}$, about 9MPa $M^{112}$, about 10 MPa $M^{112}$, about 11 MPa $m^{1/2}$, or about 12 MPa $m^{1/2}$. In some embodiments, a composite matrix described herein has a Palmquist toughness of at least about 1 MPa $m^{1/2}$, about 2 MPa $m^{1/2}$, about 3 MPa $M^{1/2}$, about 4 MPa $M^{1/2}$, about 5 MPa $M^{1/2}$ about 6 MPa $M^{1/2}$ about 7MPa $M^{1/2}$ about 8 MPa $M^{1/2}$, about 9 MPa $m^{1/2}$, about 10 MPa $m^{1/2}$, or about 11 MPa $m^{1/2}$. In some embodiments, a composite matrix described herein has a Palmquist toughness of at most about 2 MPa $M^{1/2}$, about 3 MPa $M^{1/2}$ about 4 MPa $m^{1/2}$ about 5 MPa $m^{1/2}$ about 6 MPa $M^{1/2}$ about 7MPa $M^{1/2}$ about 8 MPa $M^{1/2}$ about 9 MPa $m^{1/2}$ about 10 MPa $m^{1/2}$ about 11 MPa $m^{1/2}$ or about 12 MPa $m^{1/2}$.

In some embodiments, a composite matrix described herein has a density of about 1 $g/cm^3$ to about 10 $g/cm^3$. In some embodiments, a composite matrix described herein has a density of about 1 $g/cm^3$ to about 3 $g/cm^3$, about 1 $g/cm^3$ to about 5 $g/cm^3$, about 1 $g/cm^3$ to about 5.5 $g/cm^3$, about 1 $g/cm^3$ to about 6 $g/cm^3$, about 1 $g/cm^3$ to about 6.5 $g/cm^3$, about 1 $g/cm^3$ to about 7 $g/cm^3$, about 1 $g/cm^3$ to about 7.5 $g/cm^3$, about 1 $g/cm^3$ to about 8 $g/cm^3$, about 1 $g/cm^3$ to about 8.5 $g/cm^3$, about 1 $g/cm^3$ to about 9 $g/cm^3$, about 1 $g/cm^3$ to about 10 $g/cm^3$, about 3 $g/cm^3$ to about 5 $g/cm^3$, about 3 $g/cm^3$ to about 5.5 $g/cm^3$, about 3 $g/cm^3$ to about 6 $g/cm^3$, about 3 $g/cm^3$ to about 6.5 $g/cm^3$, about 3 $g/cm^3$ to about 7 $g/cm^3$, about 3 $g/cm^3$ to about 7.5 $g/cm^3$, about 3 $g/cm^3$ to about 8 $g/cm^3$, about 3 $g/cm^3$ to about 8.5 $g/cm^3$, about 3 $g/cm^3$ to about 9 $g/cm^3$, about 3 $g/cm^3$ to about 10 $g/cm^3$, about 5 $g/cm^3$ to about 5.5 $g/cm^3$, about 5 $g/cm^3$ to about 6 $g/cm^3$, about 5 $g/cm^3$ to about 6.5 $g/cm^3$, about 5 $g/cm^3$ to about 7 $g/cm^3$, about 5 $g/cm^3$ to about 7.5 $g/cm^3$, about 5 $g/cm^3$ to about 8 $g/cm^3$, about 5 $g/cm^3$ to about 8.5 $g/cm^3$, about 5 $g/cm^3$ to about 9 $g/cm^3$, about 5 $g/cm^3$ to about 10 $g/cm^3$, about 5.5 $g/cm^3$ to about 6 $g/cm^3$, about 5.5 $g/cm^3$ to about 6.5 $g/cm^3$, about 5.5 $g/cm^3$ to about 7 $g/cm^3$, about 5.5 $g/cm^3$ to about 7.5 $g/cm^3$, about 5.5 $g/cm^3$ to about 8 $g/cm^3$, about 5.5 $g/cm^3$ to about 8.5 $g/cm^3$, about 5.5 $g/cm^3$ to about 9 $g/cm^3$, about 5.5 $g/cm^3$ to about 10 $g/cm^3$, about 6 $g/cm^3$ to about 6.5 $g/cm^3$, about 6 $g/cm^3$ to about 7 $g/cm^3$, about 6 $g/cm^3$ to about 7.5 $g/cm^3$, about 6 $g/cm^3$ to about 8 $g/cm^3$, about 6 $g/cm^3$ to about 8.5 $g/cm^3$, about 6 $g/cm^3$ to about 9 $g/cm^3$, about 6 $g/cm^3$ to about 10 $g/cm^3$, about 6.5 $g/cm^3$ to about 7 $g/cm^3$, about 6.5 $g/cm^3$ to about 7.5 $g/cm^3$, about 6.5 $g/cm^3$ to about 8 $g/cm^3$, about 6.5 $g/cm^3$ to about 8.5 $g/cm^3$, about 6.5 $g/cm^3$ to about 9 $g/cm^3$, about 6.5 $g/cm^3$ to about 10 $g/cm^3$, about 7 $g/cm^3$ to about 7.5 $g/cm^3$, about 7 $g/cm^3$ to about 8 $g/cm^3$, about 7 $g/cm^3$ to about 8.5 $g/cm^3$, about 7 $g/cm^3$ to about 9 $g/cm^3$, about 7 $g/cm^3$ to about 10 $g/cm^3$, about 7.5 $g/cm^3$ to about 8 $g/cm^3$, about 7.5 $g/cm^3$ to about 8.5 $g/cm^3$, about 7.5 $g/cm^3$ to about 9 $g/cm^3$, about 7.5 $g/cm^3$ to about 10 $g/cm^3$, about 8 $g/cm^3$ to about 8.5 $g/cm^3$, about 8 $g/cm^3$ to about 9 $g/cm^3$, about 8 $g/cm^3$ to about 10 $g/cm^3$, about 8.5 $g/cm^3$ to about 9 $g/cm^3$, about 8.5 $g/cm^3$ to about 10 $g/cm^3$, or about 9 $g/cm^3$ to about 10 $g/cm^3$. In some embodiments, a composite matrix described herein has a density of about 1 $g/cm^3$, about 3 $g/cm^3$, about 5 $g/cm^3$, about 5.5 $g/cm^3$, about 6 $g/cm^3$, about 6.5 $g/cm^3$, about 7 $g/cm^3$, about 7.5 $g/cm^3$, about 8 $g/cm^3$, about 8.5 $g/cm^3$, about 9 $g/cm^3$, or about 10 $g/cm^3$. In some embodiments, a composite matrix described herein has a density of at least about 1 $g/cm^3$, about 3 $g/cm^3$, about 5 $g/cm^3$, about 5.5 $g/cm^3$, about 6 $g/cm^3$, about 6.5 $g/cm^3$, about 7 $g/cm^3$, about 7.5 $g/cm^3$, about 8 $g/cm^3$, about 8.5 $g/cm^3$, or about 9 $g/cm^3$. In some embodiments, a composite matrix described herein has a density of at most about 3 $g/cm^3$, about 5 $g/cm^3$, about 5.5 $g/cm^3$, about 6 $g/cm^3$, about 6.5 $g/cm^3$, about 7 $g/cm^3$, about 7.5 $g/cm^3$, about 8 $g/cm^3$, about 8.5 $g/cm^3$, about 9 $g/cm^3$, or about 10 $g/cm^3$.

In some embodiments, the composite matrix described herein, or prepared by the methods herein, is resistant to oxidation. In some embodiments, the composite matrix is resistant to oxidation below 400° C. In some embodiments, the composite matrix is resistant to oxidation below 410° C. In some embodiments, the composite matrix is resistant to oxidation below 420° C. In some embodiments, the composite matrix is resistant to oxidation below 440° C. In some embodiments, the composite matrix is resistant to oxidation below 450° C. In some embodiments, the composite matrix is resistant to oxidation below 460° C. In some embodiments, the composite matrix is resistant to oxidation below 465° C. In some embodiments, the composite matrix is resistant to oxidation below 475° C. In some embodiments, the composite matrix is resistant to oxidation below 490° C. In some embodiments, the composite matrix is resistant to oxidation below 500° C. In some embodiments, the composite matrix is resistant to oxidation below 550° C. In some embodiments, the composite matrix is resistant to oxidation below 600° C. In some embodiments, the composite matrix is resistant to oxidation below 650° C. In some embodiments, the composite matrix is resistant to oxidation below 700° C. In some embodiments, the composite matrix is resistant to oxidation below 800° C. In some embodiments, the composite matrix is resistant to oxidation below 900° C.

In some embodiments, a composite material described herein is resistant to oxidation. In some embodiments, a composite material described herein has anti-oxidation property. For example, when the composite material is coated on the surface of a tool, the composite material reduces the rate of oxidation of the tool in comparison to a tool not coated with the composite material. In an alternative example, when the composite material is coated on the surface of a tool, the composite material prevents oxidation of the tool in comparison to a tool not coated with the composite material. In some embodiments, the composite material inhibits the formation of oxidation or reduces the rate of oxidation. In some embodiments, a coating of the composite matrix reduced the rate of oxidation of the tool as compared to the uncoated tool. In some embodiments, the composite matrix reduces the rate of oxidation by at least 1%, at least 2%, at least 3%, least 4%, at least 5%, at least 6%, at least 7%, at least 8%, at least 9%, at least 10%, at least 15%, at least 20%, at least 25%, at least 30%, at least 35 at least 40%, at least 45%, at least 50%, at least 55%, at least 60%, at least 65%, at least 70%, at least 75%, at least 80%, or at least 90%.

In some embodiments, $W_{1-x}MB_4$ or $WB_4$ and Q react to form the grain boundaries described herein. In some embodiments, reaction product is a metal boride. In some embodiments, the metal boride is WB, $WB_2$, $TiB_2$, $ZrB_2$, $HfB_2$, VB, $VB_2$, $NbB_2$, $NbB_2$, CrB, $CrB_2$, $Cr_2B$, $Cr_3B_4$, $Cr_4B$, $Cr_5B_3$, MoB, $MoB_2$, $Mo_2B_4$, $Mo_2B_5$, MnB, $MnB_2$, $MNB_4$, $Mn_2B$, $Mn_4B$, $Mn_3B_4$, $ReB_2$, $Re_3B$, $Re_7B_2$, FeB, $Fe_2B$, $RuB_2$, $Ru_2B_3$, OsB, $Os_2B_3$, $OsB_2$, CoB, $Co_2B$, IrB, $Ir_2B$, NiB, $Ni_2B$, $Ni_3B$, CuB, or ZnB. In some embodiments, more than 50%, 60%, 70%, 80%, 85%, 90%, 95%, 96%, 97%, 98%, or 99% of the $W_{1-x}M_xB_4$ or $WB_4$ in the composite matrix is unreacted. In some embodiments, more than 30%, 40%, 50%, 60%, 70%, 80%, 85%, 90%, 95%, 96%, 97%, 98%, or 99% of Q in the composite matrix is unreacted.

In some embodiments, the components of the composite matrices described herein are evenly mixed during synthesis. In some embodiments, Q is not a coating on $W_{1-x}M_xB_4$ or $WB_4$. In some embodiments, component Q adheres particles of crystalline $W_{1-x}M_xB_4$ or $WB_4$ together. In some embodiments, component Q adheres particles of crystalline $W_{1-x}M_xB_4$ or $WB_4$ together and increases the Palmquist toughness of the overall composite matrix.

Methods of Manufacturing Composite Matrices

Described herein is a method of preparing a composite matrix of the formula $(W_{1-x}M_xB_4)_z(Q)_n$, the method comprising:

a) blending together crystalline $W_{1-x}M_xB_4$ with solid Q to form a mixture; wherein:

M is one or more of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), ruthenium (Ru), hafnium (Hf), tantalum (Ta), rhenium (Re), osmium (Os), iridium (Ir), lithium (Li), yttrium (Y) and aluminum (Al);

x is from 0.001 to 0.999;

Q is one or more ceramics, wherein each of the one or more ceramics comprises at least two elements, and at least one of the two elements is B (boron), C (carbon), Si (silicon), N (nitrogen), or O (oxygen);

z is a volume percent from 0.1% to 99.9%;

n is a volume percent from 0.1% to 99.9%; and the sum of n and z is 100%;

b) pressing the mixture to generate a pellet; and c) heating the pellet to produce the composite matrix $(W_{1-x}M_xB_4)_z(Q)_n$.

Described herein is a method of preparing a composite matrix of the formula $(W_{1-x}M_xB_4)_z(0)n$, the method comprising:

a) blending together crystalline $W_{1-x}M_xB_4$ with solid Q to form a mixture; wherein:

M is one or more of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), ruthenium (Ru), hafnium (Hf), tantalum (Ta), rhenium (Re), osmium (Os), iridium (Ir), lithium (Li), yttrium (Y) and aluminum (Al);

x is from 0.001 to 0.999;

Q is one or more ceramics, wherein each of the one or more ceramics comprises at least two elements, and at least one of the two elements is B (boron), C (carbon), Si (silicon), N (nitrogen), or O (oxygen);

z is a volume percent from 0.1% to 99.9%;

n is a volume percent from 0.1% to 99.9%; and the sum of n and z is 100%;

b) pressing the mixture to between 25 MPa to 200 MPa to generate a pellet; and c) heating the pellet to produce the composite matrix $(W_{1-x}M_xB_4)_z(0)n$, wherein heating the pellet comprises ramping the temperature from about 23° C. to a temperature less than 2000° C. over the course of less than 30 mins.

Described herein is a method of preparing a composite matrix of the formula $(W_{1-x}M_xBLI)_z(Q)_n$, the method comprising:

a) blending together crystalline $W_{1-x}M_xB_4$ with solid Q to form a mixture; wherein:

M is one or more of titanium (Ti), vanadium (V), chromium (Cr), manganese (Mn), zirconium (Zr), niobium (Nb), molybdenum (Mo), hafnium (Hf), tantalum (Ta), and rhenium (Re);

x is from 0.001 to 0.3;

Q is one or more ceramics, wherein each of the one or more ceramics comprises at least two elements, and at least one of the two elements is B (boron), C (carbon), Si (silicon), N (nitrogen), or O (oxygen);

z is a volume percent from 70% to 99.9%;

n is a volume percent from 0.1% to 30%; and the sum of n and z is 100%;

b) pressing the mixture to between 25 MPa to 200 MPa to generate a pellet; and c) heating the pellet to produce the composite matrix $(W_{1-x}M_xB_4)_z(Q)_n$, wherein heating the pellet comprises ramping the temperature from about 23° C. to a temperature less than 2000° C. over the course of less than 30 mins.

Described herein is a method a composite matrix of the formula $(WB_4)_z(Q)_n$, the method comprising:

a) blending together crystalline $WB_4$ with solid Q to form a mixture; wherein:

Q is one or more ceramics, wherein each of the one or more ceramics comprises at least two elements, and at least one of the two elements is B (boron), C (carbon), Si (silicon), N (nitrogen), or O (oxygen);

z is a volume percent from 0.1% to 99.9%;

n is a volume percent from 0.1% to 99.9%; and the sum of n and z is 100%;

c) pressing the mixture to generate a pellet; and c) heating the pellet in a vessel to produce the composite matrix $(WB_4)_z(Q)_n$.

Described herein is a method a composite matrix of the formula $(WB_4)_z(Q)_n$, the method comprising:

a) blending together crystalline $WB_4$ with solid Q to form a mixture; wherein:

Q is one or more ceramics, wherein each of the one or more ceramics comprises at least two elements, and at least one of the two elements is B (boron), C (carbon), Si (silicon), N (nitrogen), or O (oxygen);

z is a volume percent from 0.1% to 70%;

n is a volume percent from 30% to 99.9%; and the sum of n and z is 100%;

b) pressing the mixture to between 25 MPa to 200 MPa to generate a pellet; and c) heating the pellet to produce the composite matrix $(W_{1-x}M_xB_4)_z(Q)_n$, wherein heating the pellet comprises ramping the temperature from about 23° C. to a temperature less than 2000° C. over the course of less than 30 mins.

In some embodiments, the mixture is heated, melted or sintered in an electrical arc furnace, an induction furnace, or a hot press optionally equipped with a spark plasma sinter. In some embodiments, the mixture is heated, melted or sintered in an electrical arc furnace, an induction furnace, a hot press, or spark plasma sinter.

In some embodiments, the reaction is a solid state reaction. In some embodiments, the reaction requires the partial melting of at least one component in the mixture. In some embodiments, the reaction requires the complete melting of at least one component in the mixture.

In some embodiments, the methods described herein, e.g., for generating a composite matrix require sintering, heating, or melting a mixture of elements under an inert atmosphere or vacuum. In some embodiments, the inert or vacuum atmosphere is introduced after transferring the mixture into the reaction vessel and prior to any heating. In some embodiments, a vacuum is applied to the reaction vessel. In some embodiments, the vacuum is applied for at least 10 minutes, 20 minutes, 30 minutes, or more. In some embodiments, oxygen is removed from the reaction vessel. In some embodiments, vacuum is applied for a time sufficient to remove at least 99% of oxygen from the reaction vessel.

In some embodiments the inert atmosphere is an inert gas such as helium, argon or dinitrogen. In some embodiments, the reaction vessel is purged with an inert gas to generate the inert atmosphere. In some embodiments, the reaction vessel is subjected to at least one cycle of applying a vacuum and flushing the reaction vessel with an inert gas to remove oxygen from the reaction vessel. In some cases, the reaction vessel is subjected to 2, 3, 4, 5, 6, or more cycles of applying a vacuum and flushing the reaction vessel with an inert gas to remove oxygen from the reaction vessel. In some cases, this process is repeated until desired oxygen levels persist.

In some embodiments, a mixing time is about 5 minutes to about 6 hours. In some embodiments, the mixing time is about 5 minutes, about 10 minutes, about 15 minutes, about 20 minutes, about 30 minutes, about 45 minutes, about 1 hour, about 1.5 hour, about 2 hours, about 3 hours, about 4 hours, about 5 hours, or about 6 hours. In some embodiments, the mixing time is at least 5 minutes or more. In some embodiments, the mixing time is about 10 minutes or more. In some embodiments, the mixing time is about 20 minutes or more. In some embodiments, the mixing time is about 30 minutes or more. In some embodiments, the mixing time is about 45 minutes or more. In some embodiments, the mixing time is about 1 hour or more. In some embodiments, the mixing time is about 2 hours or more. In some embodiments, the mixing time is about 3 hours or more. In some embodiments, the mixing time is about 4 hours or more. In some embodiments, the mixing time is about 5 hours or more. In some embodiments, the mixing time is about 6 hours or more. In some embodiments, the mixing time is about 8 hours or more. In some embodiments, the mixing time is about 10 hours or more. In some embodiments, the mixing time is about 12 hours or more.

In some embodiments, the composite matrices described herein are heated to a maximum temperature. In some embodiments, the composite matrices described herein are heated to a maximum temperature and are subjected to a maximum pressure. In some embodiments, the heating is performed at a target ramp rate. In some embodiments, the composite matrices are heated, under pressure, from room temperature to a maximum temperature, and held at the maximum temperature for a period of time.

In some embodiments, the composite matrices are compressed using a maximum pressure of 300 MPa, 275 MPa, 250 MPa, 225 MPa, 200 MPa, 175 MPa, 160 MPa, 150 MPa, 140 MPa, 130 MPa, 120 MPa, 110 MPa, 100 MPa, 90 MPa, 80 MPa, 70 MPa, 60 MPa, 50 MPa, 40 MPa, 30 MPa, or 20 MPa. In some embodiments, the composite matrices are compressed using a maximum pressure of about 25 MPa to about 300 MPa. In some embodiments, the composite matrices are compressed using a maximum pressure of about 25 MPa to about 50 MPa, about 25 MPa to about 75 MPa, about 25 MPa to about 100 MPa, about 25 MPa to about 125 MPa, about 25 MPa to about 150 MPa, about 25 MPa to about 175 MPa, about 25 MPa to about 200 MPa, about 25 MPa to about 225 MPa, about 25 MPa to about 250 MPa, about 25 MPa to about 275 MPa, about 25 MPa to about 300 MPa, about 50 MPa to about 75 MPa, about 50 MPa to about 100 MPa, about 50 MPa to about 125 MPa, about 50 MPa to about 150 MPa, about 50 MPa to about 175 MPa, about 50 MPa to about 200 MPa, about 50 MPa to about 225 MPa, about 50 MPa to about 250 MPa, about 50 MPa to about 275

MPa, about 50 MPa to about 300 MPa, about 75 MPa to about 100 MPa, about 75 MPa to about 125 MPa, about 75 MPa to about 150 MPa, about 75 MPa to about 175 MPa, about 75 MPa to about 200 MPa, about 75 MPa to about 225 MPa, about 75 MPa to about 250 MPa, about 75 MPa to about 275 MPa, about 75 MPa to about 300 MPa, about 100 MPa to about 125 MPa, about 100 MPa to about 150 MPa, about 100 MPa to about 175 MPa, about 100 MPa to about 200 MPa, about 100 MPa to about 225 MPa, about 100 MPa to about 250 MPa, about 100 MPa to about 275 MPa, about 100 MPa to about 300 MPa, about 125 MPa to about 150 MPa, about 125 MPa to about 175 MPa, about 125 MPa to about 200 MPa, about 125 MPa to about 225 MPa, about 125 MPa to about 250 MPa, about 125 MPa to about 275 MPa, about 125 MPa to about 300 MPa, about 150 MPa to about 175 MPa, about 150 MPa to about 200 MPa, about 150 MPa to about 225 MPa, about 150 MPa to about 250 MPa, about 150 MPa to about 275 MPa, about 150 MPa to about 300 MPa, about 175 MPa to about 200 MPa, about 175 MPa to about 225 MPa, about 175 MPa to about 250 MPa, about 175 MPa to about 275 MPa, about 175 MPa to about 300 MPa, about 200 MPa to about 225 MPa, about 200 MPa to about 250 MPa, about 200 MPa to about 275 MPa, about 200 MPa to about 300 MPa, about 225 MPa to about 250 MPa, about 225 MPa to about 275 MPa, about 225 MPa to about 300 MPa, about 250 MPa to about 275 MPa, about 250 MPa to about 300 MPa, or about 275 MPa to about 300 MPa. In some embodiments, the composite matrices are compressed using a maximum pressure of about 25 MPa, about 50 MPa, about 75 MPa, about 100 MPa, about 125 MPa, about 150 MPa, about 175 MPa, about 200 MPa, about 225 MPa, about 250 MPa, about 275 MPa, or about 300 MPa. In some embodiments, the composite matrices are compressed using a maximum pressure of at least about 25 MPa, about 50 MPa, about 75 MPa, about 100 MPa, about 125 MPa, about 150 MPa, about 175 MPa, about 200 MPa, about 225 MPa, about 250 MPa, or about 275 MPa. In some embodiments, the composite matrices are compressed using a maximum pressure of at most about 50 MPa, about 75 MPa, about 100 MPa, about 125 MPa, about 150 MPa, about 175 MPa, about 200 MPa, about 225 MPa, about 250 MPa, about 275 MPa, or about 300 MPa.

In some embodiments, the composite matrices are heated from room temperature (23 ° C.) to a maximum temperature of about 4000° C., 3950° C., 3900° C., 3850° C., 3800° C., 3750° C., 3700° C., 3650° C., 3600° C., 3550° C., 3500° C., 3450° C., 3400° C., 3350° C., 3300° C., 3250° C., 3200° C., 3150° C., 3100° C., 3050° C., 3000° C., 2950° C., 2900° C., 2850° C., 2800° C., 2750° C., 2700° C., 2650° C., 2600° C., 2550° C., 2500° C., 2450° C., 2400° C., 2350° C., 2300° C., 2250° C., 2200° C., 2150° C., 2100° C., 2050° C., 2000° C., 1950° C., 1900° C., 1850° C., 1800° C., 1750° C., 1700° C., 1650° C., 1600° C., 1550° C., 1500° C., 1450° C., 1400° C., 1350° C., 1300° C., 1250° C., 1200° C., 1150° C., 1100° C., 1050° C., 1000° C. 950° C., 900° C., or 850° C. In some embodiments, the maximum temperature is between about 800° C. to about 2,000° C. In some embodiments, the maximum temperature is between about 800° C. to about 900° C., about 800° C. to about 1,000° C., about 800° C. to about 1,050° C., about 800° C. to about 1,100° C., about 800° C. to about 1,150° C., about 800° C. to about 1,200° C., about 800° C. to about 1,300° C., about 800° C. to about 1,400° C., about 800° C. to about 1,500° C., about 800° C. to about 1,800° C., about 800° C. to about 2,000° C., about 900° C. to about 1,000° C., about 900° C. to about 1,050° C., about 900° C. to about 1,100° C., about 900° C. to about 1,150° C., about 900° C. to about 1,200° C., about 900° C.

to about 1,300° C., about 900° C. to about 1,400° C., about 900° C. to about 1,500° C., about 900° C. to about 1,800° C., about 900° C. to about 2,000° C., about 1,000° C. to about 1,050° C., about 1,000° C. to about 1,100° C., about 1,000° C. to about 1,150° C., about 1,000° C. to about 1,200° C., about 1,000° C. to about 1,300° C., about 1,000° C. to about 1,400° C., about 1,000° C. to about 1,500° C., about 1,000° C. to about 1,800° C., about 1,000° C. to about 2,000° C., about 1,050° C. to about 1,100° C., about 1,050° C. to about 1,150° C., about 1,050° C. to about 1,200° C., about 1,050° C. to about 1,300° C., about 1,050° C. to about 1,400° C., about 1,050° C. to about 1,500° C., about 1,050° C. to about 1,800° C., about 1,050° C. to about 2,000° C., about 1,100° C. to about 1,150° C., about 1,100° C. to about 1,200° C., about 1,100° C. to about 1,300° C., about 1,100° C. to about 1,400° C., about 1,100° C. to about 1,500° C., about 1,100° C. to about 1,800° C., about 1,100° C. to about 2,000° C., about 1,150° C. to about 1,200° C., about 1,150° C. to about 1,300° C., about 1,150° C. to about 1,400° C., about 1,150° C. to about 1,500° C., about 1,150° C. to about 1,800° C., about 1,150° C. to about 2,000° C., about 1,200° C. to about 1,300° C., about 1,200° C. to about 1,400° C., about 1,200° C. to about 1,500° C., about 1,200° C. to about 1,800° C., about 1,200° C. to about 2,000° C., about 1,300° C. to about 1,400° C., about 1,300° C. to about 1,500° C., about 1,300° C. to about 1,800° C., about 1,300° C. to about 2,000° C., about 1,400° C. to about 1,500° C., about 1,400° C. to about 1,800° C., about 1,400° C. to about 2,000° C., about 1,500° C. to about 1,800° C., about 1,500° C. to about 2,000° C., or about 1,800° C. to about 2,000° C. In some embodiments, the maximum temperature is between about 800° C., about 900° C., about 1,000° C., about 1,050° C., about 1,100° C., about 1,150° C., about 1,200° C., about 1,300° C., about 1,400° C., about 1,500° C., about 1,800° C., or about 2,000° C. In some embodiments, the maximum temperature is between at least about 800° C., about 900° C., about 1,000° C., about 1,050° C., about 1,100° C., about 1,150° C., about 1,200° C., about 1,300° C., about 1,400° C., about 1,500° C., or about 1,800° C. In some embodiments, the maximum temperature is between at most about 900° C., about 1,000° C., about 1,050° C., about 1,100° C., about 1,150° C., about 1,200° C., about 1,300° C., about 1,400° C., about 1,500° C., about 1,800° C., or about 2,000° C.

In some embodiments, the ramp rate is about 10° C./min to about 400° C./min. In some embodiments, the ramp rate is about 10° C./min to about 25° C./min, about 10° C./min to about 50° C./min, about 10° C./min to about 75° C./min, about 10° C./min to about 100° C./min, about 10° C./min to about 125° C./min, about 10° C./min to about 150° C./min, about 10° C./min to about 175° C./min, about 10° C./min to about 200° C./min, about 10° C./min to about 250° C./min, about 10° C./min to about 300° C./min, about 10° C./min to about 400° C./min, about 25° C./min to about 50° C./min, about 25° C./min to about 75° C./min, about 25° C./min to about 100° C./min, about 25° C./min to about 125° C./min, about 25° C./min to about 150° C./min, about 25° C./min to about 175° C./min, about 25° C./min to about 200° C./min, about 25° C./min to about 250° C./min, about 25° C./min to about 300° C./min, about 25° C./min to about 400° C./min, about 50° C./min to about 75° C./min, about 50° C./min to about 100° C./min, about 50° C./min to about 125° C./min, about 50° C./min to about 150° C./min, about 50° C./min to about 175° C./min, about 50° C./min to about 200° C./min, about 50° C./min to about 250° C./min, about 50° C./min to about 300° C./min, about 50° C./min to about 400° C./min, about 75° C./min to about 100° C./min, about 75° C./min to about 125° C./min, about 75° C./min to about 150° C./min, about 75° C./min to about 175° C./min, about 75° C./min to about 200° C./min, about 75° C./min to about 250° C./min, about 75° C./min to about 300° C./min, about 75° C./min to about 400° C./min, about 100° C./min to about 125° C./min, about 100° C./min to about 150° C./min, about 100° C./min to about 175° C./min, about 100° C./min to about 200° C./min, about 100° C./min to about 250° C./min, about 100° C./min to about 300° C./min, about 100° C./min to about 400° C./min, about 125° C./min to about 150° C./min, about 125° C./min to about 175° C./min, about 125° C./min to about 200° C./min, about 125° C./min to about 250° C./min, about 125° C./min to about 300° C./min, about 125° C./min to about 400° C./min, about 150° C./min to about 175° C./min, about 150° C./min to about 200° C./min, about 150° C./min to about 250° C./min, about 150° C./min to about 300° C./min, about 150° C./min to about 400° C./min, about 175° C./min to about 200° C./min, about 175° C./min to about 250° C./min, about 175° C./min to about 300° C./min, about 175° C./min to about 400° C./min, about 200° C./min to about 250° C./min, about 200° C./min to about 300° C./min, about 200° C./min to about 400° C./min, about 250° C./min to about 300° C./min, about 250° C./min to about 400° C./min, or about 300° C./min to about 400° C./min. In some embodiments, the ramp rate is about 10° C./min, about 25° C./min, about 50° C./min, about 75° C./min, about 100° C./min, about 125° C./min, about 150° C./min, about 175° C./min, about 200° C./min, about 250° C./min, about 300° C./min, or about 400° C./min. In some embodiments, the ramp rate is at least about 10° C./min, about 25° C./min, about 50° C./min, about 75° C./min, about 100° C./min, about 125° C./min, about 150° C./min, about 175° C./min, about 200° C./min, about 250° C./min, or about 300° C./min. In some embodiments, the ramp rate is at most about 25° C./min, about 50° C./min, about 75° C./min, about 100° C./min, about 125° C./min, about 150° C./min, about 175° C./min, about 200° C./min, about 250° C./min, about 300° C./min, or about 400° C./min.

In some embodiments, the composite matrix is heated for a total time of about 1 min to about 60 mins. In some embodiments, the composite matrix is heated for a total time of about 1 min to about 3 mins, about 1 min to about 5 mins, about 1 min to about 6 mins, about 1 min to about 7 mins, about 1 min to about 8 mins, about 1 min to about 9 mins, about 1 min to about 10 mins, about 1 min to about 15 mins, about 1 min to about 20 mins, about 1 min to about 30 mins, about 1 min to about 60 mins, about 3 mins to about 5 mins, about 3 mins to about 6 mins, about 3 mins to about 7 mins, about 3 mins to about 8 mins, about 3 mins to about 9 mins, about 3 mins to about 10 mins, about 3 mins to about 15 mins, about 3 mins to about 20 mins, about 3 mins to about 30 mins, about 3 mins to about 60 mins, about 5 mins to about 6 mins, about 5 mins to about 7 mins, about 5 mins to about 8 mins, about 5 mins to about 9 mins, about 5 mins to about 10 mins, about 5 mins to about 15 mins, about 5 mins to about 20 mins, about 5 mins to about 30 mins, about 5 mins to about 60 mins, about 6 mins to about 7 mins, about 6 mins to about 8 mins, about 6 mins to about 9 mins, about 6 mins to about 10 mins, about 6 mins to about 15 mins, about 6 mins to about 20 mins, about 6 mins to about 30 mins, about 6 mins to about 60 mins, about 7 mins to about 8 mins, about 7 mins to about 9 mins, about 7 mins to about 10 mins, about 7 mins to about 15 mins, about 7 mins to about 20 mins, about 7 mins to about 30 mins, about 7 mins to about 60 mins, about 8 mins to about 9 mins, about 8 mins to about 10 mins, about 8 mins to about 15 mins, about 8 mins to about 20 mins, about 8 mins to about 30 mins, about 8 mins to about 60 mins, about 9 mins to about 10 mins, about 9 mins to about 15 mins, about 9 mins to about 20 mins, about 9 mins to about 30 mins, about 9 mins to about 60 mins, about 10 mins to about 15 mins, about 10 mins to about 20 mins, about 10 mins to about 30 mins, about 10 mins to about 60 mins, about 15 mins to about 20 mins, about 15 mins to about 30 mins, about 15 mins to about 60 mins, about 20 mins to about 30 mins, about 20 mins to about 60 mins, or about 30 mins to about 60 mins. In some embodiments, the composite matrix is heated for a total time of about 1 min, about 3 mins, about 5 mins, about 6 mins, about 7 mins, about 8 mins, about 9 mins, about 10 mins, about 15 mins, about 20 mins, about 30 mins, or about 60 mins. In some embodiments, the composite matrix is heated for a total time of at least about 1 min, about 3 mins, about 5 mins, about 6 mins, about 7 mins, about 8 mins, about 9 mins, about 10 mins, about 15 mins, about 20 mins, or about 30 mins. In some embodiments, the composite matrix is heated for a total time of at most about 3 mins, about 5 mins, about 6 mins, about 7 mins, about 8 mins, about 9 mins, about 10 mins, about 15 mins, about 20 mins, about 30 mins, or about 60 mins. In some embodiments, the composite matrix is heated for a total time of about 1 hour to about 48 hours. In some embodiments, the composite matrix is heated for a total time of about 1 hour to about 2 hours, about 1 hour to about 3 hours, about 1 hour to about 4 hours, about 1 hour to about 5 hours, about 1 hour to about 6 hours, about 1 hour to about 9 hours, about 1 hour to about 12 hours, about 1 hour to about 18 hours, about 1 hour to about 24 hours, about 1 hour to about 48 hours, about 2 hours to about 3 hours, about 2 hours to about 4 hours, about 2 hours to about 5 hours, about 2 hours to about 6 hours, about 2 hours to about 9 hours, about 2 hours to about 12 hours, about 2 hours to about 18 hours, about 2 hours to about 24 hours, about 2 hours to about 48 hours, about 3 hours to about 4 hours, about 3 hours to about 5 hours, about 3 hours to about 6 hours, about 3 hours to about 9 hours, about 3 hours to about 12 hours, about 3 hours to about 18 hours, about 3 hours to about 24 hours, about 3 hours to about 48 hours, about 4 hours to about 5 hours, about 4 hours to about 6 hours, about 4 hours to about 9 hours, about 4 hours to about 12 hours, about 4 hours to about 18 hours, about 4 hours to about 24 hours, about 4 hours to about 48 hours, about 5 hours to about 6 hours, about 5 hours to about 9 hours, about 5 hours to about 12 hours, about 5 hours to about 18 hours, about 5 hours to about 24 hours, about 5 hours to about 48 hours, about 6 hours to about 9 hours, about 6 hours to about 12 hours, about 6 hours to about 18 hours, about 6 hours to about 24 hours, about 6 hours to about 48 hours, about 9 hours to about 12 hours, about 9 hours to about 18 hours, about 9 hours to about 24 hours, about 9 hours to about 48 hours, about 12 hours to about 18 hours, about 12 hours to about 24 hours, about 12 hours to about 48 hours, about 18 hours to about 24 hours, about 18 hours to about 48 hours, or about 24 hours to about 48 hours. In some embodiments, the composite matrix is heated for a total time of about 1 hour, about 2 hours, about 3 hours, about 4 hours, about 5 hours, about 6 hours, about 9 hours, about 12 hours, about 18 hours, about 24 hours, or about 48 hours. In some embodiments, the composite matrix is heated for a total time of at least about 1 hour, about 2 hours, about 3 hours, about 4 hours, about 5 hours, about 6 hours, about 9 hours, about 12 hours, about 18 hours, or about 24 hours. In some embodiments, the composite matrix is heated for a total time of at most about 2 hours, about 3 hours, about 4 hours, about 5 hours, about 6 hours, about 9 hours, about 12 hours, about 18 hours, about 24 hours, or about 48 hours. In some embodiments, the composite matrix is heated for a total time of at least about 10 mins, 30 mins, 1 hour, 2 hours, about 3 hours, about 4 hours, about 5 hours, about 6 hours, about 9 hours, about 12 hours, about 18 hours, about 24 hours, or about 48 hours.

In some embodiments, the composite matrix is held at the maximum temperature for about 1 min to about 60 mins. In some embodiments, the composite matrix is held at the maximum temperature for about 1 min to about 3 mins, about 1 min to about 5 mins, about 1 min to about 6 mins, about 1 min to about 7 mins, about 1 min to about 8 mins, about 1 min to about 9 mins, about 1 min to about 10 mins, about 1 min to about 15 mins, about 1 min to about 20 mins, about 1 min to about 30 mins, about 1 min to about 60 mins, about 3 mins to about 5 mins, about 3 mins to about 6 mins, about 3 mins to about 7 mins, about 3 mins to about 8 mins, about 3 mins to about 9 mins, about 3 mins to about 10 mins, about 3 mins to about 15 mins, about 3 mins to about 20 mins, about 3 mins to about 30 mins, about 3 mins to about 60 mins, about 5 mins to about 6 mins, about 5 mins to about 7 mins, about 5 mins to about 8 mins, about 5 mins to about 9 mins, about 5 mins to about 10 mins, about 5 mins to about 15 mins, about 5 mins to about 20 mins, about 5 mins to about 30 mins, about 5 mins to about 60 mins, about 6 mins to about 7 mins, about 6 mins to about 8 mins, about 6 mins to about 9 mins, about 6 mins to about 10 mins, about 6 mins to about 15 mins, about 6 mins to about 20 mins, about 6 mins to about 30 mins, about 6 mins to about 60 mins, about 7 mins to about 8 mins, about 7 mins to about 9 mins, about 7 mins to about 10 mins, about 7 mins to about 15 mins, about 7 mins to about 20 mins, about 7 mins to about 30 mins, about 7 mins to about 60 mins, about 8 mins to about 9 mins, about 8 mins to about 10 mins, about 8 mins to about 15 mins, about 8 mins to about 20 mins, about 8 mins to about 30 mins, about 8 mins to about 60 mins, about 9 mins to about 10 mins, about 9 mins to about 15 mins, about 9 mins to about 20 mins, about 9 mins to about 30 mins, about 9 mins to about 60 mins, about 10 mins to about 15 mins, about 10 mins to about 20 mins, about 10 mins to about 30 mins, about 10 mins to about 60 mins, about 15 mins to about 20 mins, about 15 mins to about 30 mins, about 15 mins to about 60 mins, about 20 mins to about 30 mins, about 20 mins to about 60 mins, or about 30 mins to about 60 mins. In some embodiments, the composite matrix is held at the maximum temperature for about 1 min, about 3 mins, about 5 mins, about 6 mins, about 7 mins, about 8 mins, about 9 mins, about 10 mins, about 15 mins, about 20 mins, about 30 mins, or about 60 mins. In some embodiments, the composite matrix is held at the maximum temperature for at least about 1 min, about 3 mins, about 5 mins, about 6 mins, about 7 mins, about 8 mins, about 9 mins, about 10 mins, about 15 mins, about 20 mins, or about 30 mins. In some embodiments, the composite matrix is held at the maximum temperature for at most about 3 mins, about 5 mins, about 6 mins, about 7 mins, about 8 mins, about 9 mins, about 10 mins, about 15 mins, about 20 mins, about 30 mins, or about 60 mins. In some embodiments, the composite matrix is held at the maximum temperature for about 1 hour to about 48 hours. In some embodiments, the composite matrix is held at the maximum temperature for about 1 hour to about 2 hours, about 1 hour to about 3 hours, about 1 hour to about 4 hours, about 1 hour to about 5 hours, about 1 hour to about 6 hours, about 1 hour to about 9 hours, about 1 hour to about 12 hours, about 1 hour to about 18 hours, about 1 hour to about 24 hours, about 1 hour to about 48 hours, about 2 hours to about 3 hours, about 2 hours to about 4 hours, about 2 hours to about 5 hours, about 2 hours to about 6 hours, about 2 hours to about 9 hours, about 2 hours to about 12 hours, about 2 hours to about 18 hours, about 2 hours to about 24 hours, about 2 hours to about 48 hours, about 3 hours to about 4 hours, about 3 hours to about 5 hours, about 3 hours to about 6 hours, about 3 hours to about 9 hours, about 3 hours to about 12 hours, about 3 hours to about 18 hours, about 3 hours to about 24 hours, about 3 hours to about 48 hours, about 4 hours to about 5 hours, about 4 hours to about 6 hours, about 4 hours to about 9 hours, about 4 hours to about 12 hours, about 4 hours to about 18 hours, about 4 hours to about 24 hours, about 4 hours to about 48 hours, about 5 hours to about 6 hours, about 5 hours to about 9 hours, about 5 hours to about 12 hours, about 5 hours to about 18 hours, about 5 hours to about 24 hours, about 5 hours to about 48 hours, about 6 hours to about 9 hours, about 6 hours to about 12 hours, about 6 hours to about 18 hours, about 6 hours to about 24 hours, about 6 hours to about 48 hours, about 9 hours to about 12 hours, about 9 hours to about 18 hours, about 9 hours to about 24 hours, about 9 hours to about 48 hours, about 12 hours to about 18 hours, about 12 hours to about 24 hours, about 12 hours to about 48 hours, about 18 hours to about 24 hours, about 18 hours to about 48 hours, or about 24 hours to about 48 hours. In some embodiments, the composite matrix is held at the maximum temperature for about 1 hour, about 2 hours, about 3 hours, about 4 hours, about 5 hours, about 6 hours, about 9 hours, about 12 hours, about 18 hours, about 24 hours, or about 48 hours. In some embodiments, the composite matrix is held at the maximum temperature for at least about 1 hour, about 2 hours, about 3 hours, about 4 hours, about 5 hours, about 6 hours, about 9 hours, about 12 hours, about 18 hours, or about 24 hours. In some embodiments, the composite matrix is held at the maximum temperature for at most about 2 hours, about 3 hours, about 4 hours, about 5 hours, about 6 hours, about 9 hours, about 12 hours, about 18 hours, about 24 hours, or about 48 hours.

In some embodiments, sintering, heating, or melting is carried out using an electrical current. In some embodiments, heating is carried out by plasma spark sintering. The electrical current (I) used differs substantially depending on the scale of the synthesis. For example, in the lab scale samples described herein, heating is carried out with a electrical current of about 50 to 100 Amps. In some embodiments, heating is carried out with a current (I) of 50 Amps (A) or more. In some embodiments, heating is carried out with a I of 60 A or more. In some embodiments, heating is carried out with a I of 65 A or more. In some embodiments, heating is carried out with a I of 70 A or more. In some embodiments, heating is carried out with a I of 75 A or more. In some embodiments, heating is carried out with a I of 80 A or more. In some embodiments, heating is carried out with a I of 90 A or more. In some embodiments, heating is carried out with a I of 100 A or more. Synthesis on large industrial scales will require greatly increased current. In some embodiments, heating can be carried out with an electrical current of 10,000 to 50,000 Amps. In some embodiments, heating is carried out with a current of about 10,000 Amps to about 15,000 Amps, about 10,000 Amps to about 20,000 Amps, about 10,000 Amps to about 25,000 Amps, about 10,000 Amps to about 30,000 Amps, about 10,000 Amps to about 35,000 Amps, about 10,000 Amps to about 40,000 Amps, about 10,000 Amps to about 45,000 Amps, about 10,000 Amps to about 50,000 Amps, about 15,000 Amps to about 20,000 Amps, about 15,000 Amps to about 25,000 Amps, about 15,000 Amps to about 30,000 Amps, about 15,000 Amps to about 35,000 Amps, about 15,000 Amps to about 40,000 Amps, about 15,000 Amps to about 45,000 Amps, about 15,000 Amps to about 50,000 Amps, about 20,000 Amps to about 25,000 Amps, about 20,000 Amps to about 30,000 Amps, about 20,000 Amps to about 35,000 Amps, about 20,000 Amps to about 40,000 Amps, about 20,000 Amps to about 45,000 Amps, about 20,000 Amps to about 50,000 Amps, about 25,000 Amps to about 30,000 Amps, about 25,000 Amps to about 35,000 Amps, about 25,000 Amps to about 40,000 Amps, about 25,000 Amps to about 45,000 Amps, about 25,000 Amps to about 50,000 Amps, about 30,000 Amps to about 35,000 Amps, about 30,000 Amps to about 40,000 Amps, about 30,000 Amps to about 45,000 Amps, about 30,000 Amps to about 50,000 Amps, about 35,000 Amps to about 40,000 Amps, about 35,000 Amps to about 45,000 Amps, about 35,000 Amps to about 50,000 Amps, about 40,000 Amps to about 45,000 Amps, about 40,000 Amps to about 50,000 Amps, or about 45,000 Amps to about 50,000 Amps. In some embodiments, heating is carried out with a current of about 10,000 Amps, about 15,000 Amps, about 20,000 Amps, about 25,000 Amps, about 30,000 Amps, about 35,000 Amps, about 40,000 Amps, about 45,000 Amps, or about 50,000 Amps. In some embodiments, heating is carried out with a current of at least about 10,000 Amps, about 15,000 Amps, about 20,000 Amps, about 25,000 Amps, about 30,000 Amps, about 35,000 Amps, about 40,000 Amps, or about 45,000 Amps. In some embodiments, heating is carried out with a current of at most about 15,000 Amps, about 20,000 Amps, about 25,000 Amps, about 30,000 Amps, about 35,000 Amps, about 40,000 Amps, about 45,000 Amps, or about 50,000 Amps. In some embodiments, heating is carried out with a current (I) of 5,000 Amps (A) or more. In some embodiments, heating is carried out with a current (I) of 10,000 Amps (A) or more. In some embodiments, heating is carried out with a current (I) of 20,000 Amps (A) or more. In some embodiments, heating is carried out with a current (I) of 30,000 Amps (A) or more. In some embodiments, heating is carried out with a current (I) of 40,000 Amps (A) or more. In some embodiments, heating is carried out with a current (I) of 50,000 Amps (A) or more. Medium scale, pilot level synthesis may require an electrical current of 100 to 10,000 Amps. In some embodiments, heating is carried out with a current of about 100 Amps to about 10,000 Amps. In some embodiments, heating is carried out with a current of about 100 Amps to about 500 Amps, about 100 Amps to about 1,000 Amps, about 100 Amps to about 2,000 Amps, about 100 Amps to about 3,000 Amps, about 100 Amps to about 4,000 Amps, about 100 Amps to about 5,000 Amps, about 100 Amps to about 6,000 Amps, about 100 Amps to about 7,000 Amps, about 100 Amps to about 8,000 Amps, about 100 Amps to about 9,000 Amps, about 100 Amps to about 10,000 Amps, about 500 Amps to about 1,000 Amps, about 500 Amps to about 2,000 Amps, about 500 Amps to about 3,000 Amps, about 500 Amps to about 4,000 Amps, about 500 Amps to about 5,000 Amps, about 500 Amps to about 6,000 Amps, about 500 Amps to about 7,000 Amps, about 500 Amps to about 8,000 Amps, about 500 Amps to about 9,000 Amps, about 500 Amps to about 10,000 Amps, about 1,000 Amps to about 2,000 Amps, about 1,000 Amps to about 3,000 Amps, about 1,000 Amps to about 4,000 Amps, about 1,000 Amps to about 5,000 Amps, about 1,000 Amps to about 6,000 Amps, about 1,000 Amps to about 7,000 Amps, about 1,000 Amps to about 8,000 Amps, about 1,000 Amps to about 9,000 Amps, about 1,000 Amps to about 10,000 Amps, about 2,000 Amps to about 3,000 Amps, about 2,000 Amps to about 4,000 Amps, about 2,000 Amps to about 5,000 Amps, about 2,000 Amps to about 6,000 Amps, about 2,000 Amps to about 7,000 Amps, about 2,000 Amps to about 8,000 Amps, about 2,000 Amps to about 9,000 Amps, about 2,000 Amps to about 10,000 Amps, about 3,000 Amps to about 4,000 Amps, about 3,000 Amps to about 5,000 Amps, about 3,000 Amps to about 6,000 Amps, about 3,000 Amps to about 7,000 Amps, about 3,000 Amps to about 8,000 Amps, about 3,000 Amps to about 9,000 Amps, about 3,000 Amps to about 10,000 Amps, about 4,000 Amps to about 5,000 Amps, about 4,000 Amps to about 6,000 Amps, about 4,000 Amps to about 7,000 Amps, about 4,000 Amps to about 8,000 Amps, about 4,000 Amps to about 9,000 Amps, about 4,000 Amps to about 10,000 Amps, about 5,000 Amps to about 6,000 Amps, about 5,000 Amps to about 7,000 Amps, about 5,000 Amps to about 8,000 Amps, about 5,000 Amps to about 9,000 Amps, about 5,000 Amps to about 10,000 Amps, about 6,000 Amps to about 7,000 Amps, about 6,000 Amps to about 8,000 Amps, about 6,000 Amps to about 9,000 Amps, about 6,000 Amps to about 10,000 Amps, about 7,000 Amps to about 8,000 Amps, about 7,000 Amps to about 9,000 Amps, about 7,000 Amps to about 10,000 Amps, about 8,000 Amps to about 9,000 Amps, about 8,000 Amps to about 10,000 Amps, or about 9,000 Amps to about 10,000 Amps. In some embodiments, heating is carried out with a current of about 100 Amps, about 500 Amps, about 1,000 Amps, about 2,000 Amps, about 3,000 Amps, about 4,000 Amps, about 5,000 Amps, about 6,000 Amps, about 7,000 Amps, about 8,000 Amps, about 9,000 Amps, or about 10,000 Amps. In some embodiments, heating is carried out with a current of at least about 100 Amps, about 500 Amps, about 1,000 Amps, about 2,000 Amps, about 3,000 Amps, about 4,000 Amps, about 5,000 Amps, about 6,000 Amps, about 7,000 Amps, about 8,000 Amps, or about 9,000 Amps. In some embodiments, heating is carried out with a current of at most about 500 Amps, about 1,000 Amps, about 2,000 Amps, about 3,000 Amps, about 4,000 Amps, about 5,000 Amps, about 6,000 Amps, about 7,000 Amps, about 8,000 Amps, about 9,000 Amps, or about 10,000 Amps.

In some embodiments, the arc furnace electrode is made of graphite or tungsten metal. In some embodiments, the reaction vessel is water cooled.

In some embodiments, arc melting is performed in an inert gas atmosphere. In some embodiments, arc melting is performed in an argon atmosphere. In some embodiments, arc melting is performed in a helium atmosphere. In some embodiments, arc melting is performed in a dinitrogen atmosphere.

In some embodiments, arc melting is performed for 0.01-10 mins. In some embodiments, arc melting is performed for 0.01-8 mins. In some embodiments, arc melting is performed for 0.01-6 mins. In some embodiments, arc melting is performed for 0.01-5 mins. In some embodiments, arc melting is performed for 0.01-4 mins. In some embodiments, arc melting is performed for 0.5-3 mins. In some embodiments, arc melting is performed for 0.8-2.5 mins. In some embodiments, arc melting is performed for 1-2 mins.

In some embodiments, sintering is carried out at room temperature. In some cases, sintering is carried out at a temperature range of between about 23° C. and about 27° C. In some cases, sintering is carried out at a temperature of about 24° C., about 25° C., or about 26° C.

In some embodiments, a sintering, heating, or melting described herein involves an elevated temperature and an elevated pressure, e.g., hot pressing. Hot pressing is a process involving a simultaneous application of pressure and high temperature, which can accelerate the rate of densification of a material (e.g., a composite matrix described herein). In some embodiments, a temperature from 1000° C.

to 2200° C. and a pressure of up to 36,000 psi are used during hot pressing. In some embodiments, heating is achieved by plasma spark sintering.

In other embodiments, a sintering step described herein involves an elevated pressure and room temperature, e.g., cold pressing. In such embodiments, pressure of up to 36,000 psi is used.

In some embodiment, a sintering, heating, or melting described herein is carried out in a furnace. In some embodiments the furnace is an induction furnace. In some embodiments, the induction furnace is heated by electromagnetic induction. In some embodiments, the electromagnetic radiation used for electromagnetic induction has the frequency and wavelength of radio waves. In some embodiments, the electromagnetic radiation used for electromagnetic induction has the frequency from about 3 Hz to about 300 GHz and a wavelength from 1 mm to 10,000 km. In some embodiments, the frequency is from about 3 Hz to about 30 Hz. In some embodiments, the frequency is from about 30 Hz to about 300 Hz. In some embodiments, the frequency is from about 300 Hz to about 3000 Hz. In some embodiments, the frequency is from about 3 kHz to about 30 kHz. In some embodiments, the frequency is from about 30 kHz to about 300 kHz. In some embodiments, the frequency is from about 300 kHz to about 3000 kHz. In some embodiments, the frequency is from about 3 MHz to about 30 MHz. In some embodiments, the frequency is from about 30 MHz to about 300 MHz. In some embodiments, the frequency is from about 300 MHz to about 3000 MHz. In some embodiments, the frequency is from about 3 GHz to about 30 GHz. In some embodiments, the frequency is from about 30 GHz to about 300 GHz.

In some embodiments, the reaction vessel is lined with carbon graphite which is inductively heated by electromagnetic radiation with a frequency of 10-50 kHz. In some embodiments, the frequency is from about 50 Hz to about 400 kHz. In some embodiments, the frequency is from about 60 Hz to about 400 kHz. In some embodiments, the frequency is from about 100 Hz to about 400 kHz. In some embodiments, the frequency is from about 1 kHz to about 400 kHz. In some embodiments, the frequency is from about 10 kHz to about 300 kHz.

In some embodiments, the frequency is from about 50 kHz to about 200 kHz. In some embodiments, the frequency is from about 100 kHz to about 200 kHz. In some embodiments, the frequency is from about 1 kHz to about 50 kHz. In some embodiments, the frequency is from about 50 kHz to about 100 kHz.

In some embodiments, heating or melting described herein is carried out in a conventional furnace. In some embodiments, a conventional furnace heats the crucible or sample through the use of metal coils or combustion.

In some embodiments, the raw mixtures react with oxygen and carbon upon heating. Heating the mixture by electrical arc furnace, induction furnace, conventional furnace, hot pressing or plasma sintering requires that the majority of the raw mixture not come in contact with oxygen or carbon. In some embodiments, the reaction mixture (compressed or otherwise) is optionally shielded from the reaction chamber by an insulating material. In some embodiments, the reaction mixture is optionally shielded from the reaction chamber by an electrically insulating material. In some embodiments, at most about 95%, 90%, 85%, 80%, 70%, 60%, 50%, 40%, 30%, or less of the surface of the mixture is optionally shielded from the reaction chamber by the electrically insulating material. In some embodiments, the insulating material comprises hexagonal boron nitride (h-BN). In some embodiments, the insulating material does not contain carbon. In some embodiments, the compressed raw mixture is shielded from the arc furnace electrode by the electrically insulating material, optionally comprising hexagonal boron nitride.

In some embodiments, the compressed raw mixture is heated by an electric arc furnace. In some embodiments, the arc furnace electrode comprises graphite or tungsten metal. In some embodiments, the reaction vessel is optionally coated with an electrically insulating material. In some embodiments, at most about 95%, 90%, 85%, 80%, 70%, 60%, 50%, 40%, 30%, or less of the surface of the reaction vessel is optionally coated with the electrically insulating material. In some embodiments, the insulating material comprises hexagonal boron nitride (h-BN). In some embodiments, the insulating material does not contain carbon. In some embodiments, the compressed raw mixture is shielded from the arc furnace electrode by the electrically insulating material, optionally comprising hexagonal boron nitride.

In some embodiments, the composite matrix is composed of grains or crystallites that are less than 1000 micrometer in size. In some embodiments, the composite matrix is composed of grains or crystallites that are less than 100 micrometer in size. In some embodiments, the composite matrix is composed of grains or crystallites that are less than 50 micrometer in size. In some embodiments, the composite matrix is composed of grains or crystallites that are less than 10 micrometer in size. In some embodiments, the composite matrix is composed of grains or crystallites that are less than 1 micrometer in size.

In some embodiments, the compressed raw mixture is heated by an induction furnace. In some embodiments, the induction furnace is heated by electromagnetic induction. In some embodiments, the electromagnetic radiation used for electromagnetic induction has the frequency of radio waves. In some embodiments, the mixture is heated by hot pressing. In some embodiments, the mixture is heated by plasma spark sintering. In some embodiments, the reaction vessel is water cooled. In some embodiments, the reaction vessel is graphite lined. In some embodiments, graphite is heated within the reaction vessel. In some embodiments, the compressed raw mixture is shielded from the graphite lined reaction vessel by an electrically insulating material, optionally comprising hexagonal boron nitride.

In some embodiments, the compressed raw mixture is heated by an electric arc furnace. In some embodiments, the arc furnace electrode is made of graphite or tungsten metal. In some embodiments, the compressed raw mixture is partially shielded from the arc furnace electrode by an electrically insulating material, optionally comprising hexagonal boron nitride.

In some embodiments, the compressed raw mixture is heated by an induction furnace. In some embodiments, the induction furnace is heated by electromagnetic induction. In some embodiments, the electromagnetic radiation used for electromagnetic induction has the frequency of radio waves. In some embodiments, the mixture is heated by hot pressing. In some embodiments, the mixture is heated by plasma spark sintering. In some embodiments, the reaction vessel is water cooled. In some embodiments, the reaction vessel is graphite lined. In some embodiments, the radiofrequency induction is tuned to carbon, and the graphite is heated within the reaction vessel. In some embodiments, the compressed raw mixture is shielded from the graphite lined reaction vessel by an electrically insulating material, optionally comprising hexagonal boron nitride.

In some embodiments, the compressed raw mixture is melted by an electric arc furnace or plasma arc furnace. In some embodiments, the arc furnace electrode is made of graphite or tungsten metal. In some embodiments, in reaction vessel is water cooled. In some embodiments, the cooling rate of the reaction vessel is controlled. In some embodiments, the reaction vessel is allowed to cool to ambient temperature.

In some embodiments, the reaction vessel is purged with an inert gas to generate the inert atmosphere. In some embodiments, the inert gas comprises argon, nitrogen, or helium. In some embodiments, the reaction vessel is subjected to at least one cycle of applying a vacuum and flushing the reaction vessel with an inert gas to remove oxygen from the reaction vessel.

In certain embodiments, described herein are methods of making a composite matrix comprising tungsten tetraboride with a reduced or non-detectable amount of metal side products (or by-products) (e.g., less than 20%, 15%, 10%, 5%, 4%, 3%, 2%, 1%, 0.5% or less of the composite is metal side products).

In some embodiments, the reaction chamber is separated from the reaction mixture by a liner. In some embodiments, the liner is an h-BN liner. In some embodiments, the liner is a metal liner. In some embodiments, the liner is comprised of one or more transition elements. In some embodiments, the metal liner comprises a group 4, group 5, group 6, or group 7 transition metal. In some embodiments, the metal liner comprises one or more of the following elements: Ti, Zr, Hf, V, Nb, Ta, Cr, Mo, W, Mn, Tc, and Re. In some embodiments, the metal liner comprises Nb, Ta, Mo, or W. In some embodiments, the metal liner comprises Nb. In some embodiments, the metal liner comprises Ta. In some embodiments, the metal liner comprises Mo. In some embodiments, the metal liner comprises W.

In some embodiments, the liner has a thickness of about 0.05 mm. In some embodiments, the liner has a thickness of about 0.10 mm. In some embodiments, the liner has a thickness of about 0.15 mm. In some embodiments, the liner has a thickness of about 0.20 mm. In some embodiments, the liner has a thickness of about 0.25 mm. In some embodiments, the liner has a thickness of about 0.30 mm. In some embodiments, the liner has a thickness of about 0.05 mm. In some embodiments, the liner has a thickness of about 0.35 mm. In some embodiments, the liner has a thickness of about 0.40 mm. In some embodiments, the liner has a thickness of about 0.05 mm. In some embodiments, the liner has a thickness of about 0.45 mm. In some embodiments, the liner has a thickness of about 0.50 mm. In some embodiments, the liner has a thickness of about 0.75 mm. In some embodiments, the liner has a thickness of about 1.0 mm. In some embodiments, the liner has a thickness of about 5.0 mm. In some embodiments, the liner has a thickness of about 10.0 mm.

In some embodiments, the liner has a thickness of greater than or about 0.05 mm. In some embodiments, the liner has a thickness of greater than or about 0.10 mm. In some embodiments, the liner has a thickness of greater than or about 0.15 mm. In some embodiments, the liner has a thickness of greater than or about 0.20 mm. In some embodiments, the liner has a thickness of greater than or about 0.25 mm. In some embodiments, the liner has a thickness of greater than or about 0.30 mm. In some embodiments, the liner has a thickness of greater than or about 0.05 mm. In some embodiments, the liner has a thickness of greater than or about 0.35 mm. In some embodiments, the liner has a thickness of greater than or about 0.40 mm. In some embodiments, the liner has a thickness of greater than or about 0.05 mm. In some embodiments, the liner has a thickness of greater than or about 0.45 mm. In some embodiments, the liner has a thickness of greater than or about 0.50 mm. In some embodiments, the liner has a thickness of greater than or about 0.75 mm. In some embodiments, the liner has a thickness of greater than or about 1.0 mm. In some embodiments, the liner has a thickness of greater than or about 5.0 mm. In some embodiments, the liner has a thickness of greater than or about 10.0 mm.

Applications of Composite Matrices

Wear and tear are part of the normal use of tools and machines. There are different types of wear mechanisms, including, for example, abrasion wear, adhesion wear, attrition wear, diffusion wear, fatigue wear, edge chipping (or premature wear), and oxidation wear (or corrosive wear). Abrasion wear occurs when the hard particle or debris, such as chips, passes over or abrades the surface of a cutting tool. Adhesion wear or attrition wear occurs when debris removes microscopic fragments from a tool. Diffusion wear occurs when atoms in a crystal lattice move from a region of high concentration to a region of low concentration and the move weakens the surface structure of a tool. Fatigue wear occurs at a microscopic level when two surfaces slide in contact with each other under high pressure, generating surface cracks. Edge chipping or premature wear occurs as small breaking away of materials from the surface of a tool. Oxidation wear or corrosive wear occurs as a result of a chemical reaction between the surface of a tool and oxygen. In some embodiments, a composite matrix described herein is used to make, modify, or combine with a tool, abrasive material, or nozzle.

Described herein is a tool comprising a surface or body for cutting or abrading, wherein the surface or body comprises a composite matrix of $(W_{1-x}M_xB_4)_z(Q)_n$, or $(WB_4)_z(Q)_n$. In some embodiments, the tool is a drill bit or saw blade. In some embodiments, the surface of the drill bit or saw blade is combined with the composite matrix. In some embodiments, the drill bit or saw blade further comprises an AgO binder. In some embodiments, the drill bit or saw blade further comprises steel, Co (cobalt), WC, or WC composites. Described herein is a method of applying a composite matrix of claims described herein to a tool, wherein the method comprises affixing the composite matrix to the tool. In some embodiments, the method comprises affixing the composite matrix to the tool by laser welding or arc welding. In some embodiments, the arc welding is stick welding or shielded metal arc welding. In some embodiments, the tool is a drill bit or saw blade. In some embodiments, the drill bit or saw and composite matrix are joined with an AgO binder. In some embodiments, the method comprises affixing the composite matrix to the tool by sintering or brazing silver metal.

In some embodiments, a tool or abrasive material comprises a cutting tool. In some embodiments, a tool or abrasive material comprises a tool or a component of a tool for cutting, drilling, etching, engraving, grinding, carving, or polishing. In some embodiments, a tool or abrasive material comprises a metal bond abrasive tool, for example, such as a metal bond abrasive wheel or grinding wheel. In some embodiments, a tool or abrasive material comprises drilling tools. In some embodiments, a tool or abrasive material comprises drill bits, inserts or dies. In some embodiments, a tool or abrasive material comprises tools or components used in downhole tooling. In some embodiments, a tool or abrasive material comprises an etching tool. In some embodiments, a tool or abrasive material comprises an engraving tool. In some embodiments, a tool or abrasive material comprises a grinding tool. In some embodiments, a tool or abrasive material comprises a carving tool. In some embodiments, a tool or abrasive material comprises a polishing tool.

As 3D printing has become more commonplace, the filament materials, which are deposited and ultimately constitutes the 3D printed construct, have advanced by incorporating new materials. Carbon fiber, fiberglass, and even ceramic filaments have been blended into the raw filament materials. Reinforcing the plastics such as polylactic acid (PLA) and acrylonitrile butadiene styrene (ABS) with these materials has shown improved physical strength of the constructs. However, these materials are incredibly abrasive to the printer nozzles, which are traditionally made from brass. Switching to steel or even stainless steel helps to prolong the nozzle life, but there is a push towards even harder materials yet. In some embodiments, a nozzles comprises a composite matrix of $(W_{1-x}M_xB_4)_z(Q)_n$ or $(WB_4)_z(Q)_n$. In some embodiments, the body of the nozzle is a composite matrix described herein. In some embodiments, a composite matrix described herein is coated onto a surface of a nozzle, wherein the coated surface is in contact with a semisolid, solution, suspension, or liquid being extruded from the nozzle. In some embodiments, the nozzle is for extruding semisolids, solutions, suspensions, or liquids, wherein the nozzle is lined with a composite matrix described herein. In some embodiments, the nozzle is a laser printing nozzle, sand blasting nozzle, of water jet nozzle.

Figure 3:
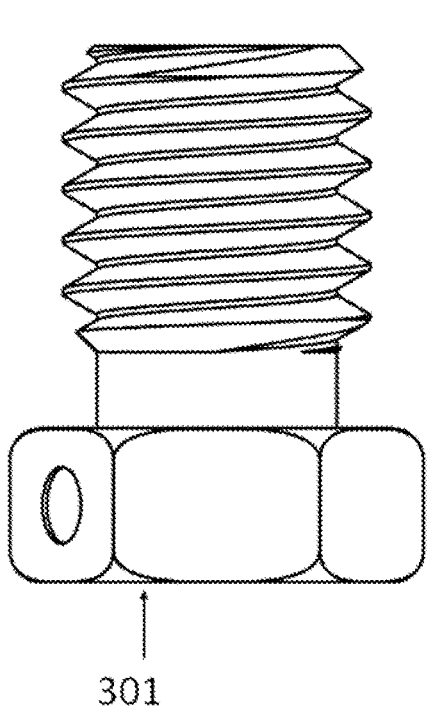
FIG. 3 shows a 3-D printing nozzle assembly comprising a composite matrix of $(W_{1-x}M_xB_4)_z(Q)_n$ or $(WB_4)_z(Q)_n$
Figure 3:
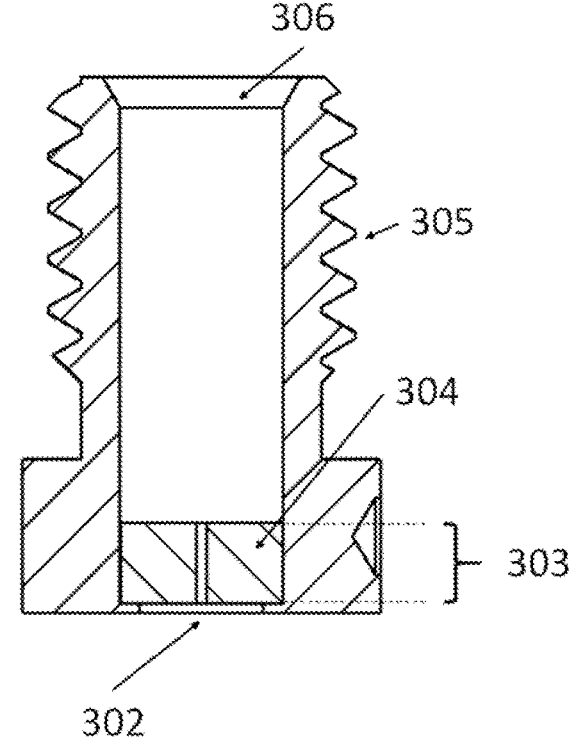

FIG. 3 represents a 3-D printing nozzle assembly comprising a composite matrix of $(W_{1-x}M_xB_4)_z(Q)_n$ or $(WB_4)_z(Q)_n$. In some embodiments, the nozzle body 301 is a metal. In some embodiments, the nozzle body is a metal such as brass, steel, hardened steel, or stainless steel. In some embodiments, the nozzle body 301 is a composite matrix of $(W_{1-x}M_xB_4)_z(Q)_n$ or $(WB_4)_z(Q)_n$. A threaded section 305 allows attachment and detachment of the nozzle to the 3-D printer. The nozzle outlet 302 diameter will vary in width. The outlet comprises a layer of composite matrix of $(W_{1-x}M_xB_4)_z(Q)_n$ or $(WB_4)_z(Q)_n$ 304 with outlet orifice or cylindrical bore. In some embodiments, the outlet is fused to the nozzle body. In some embodiments, the outlet is affixed to the nozzle body with one or more screws. The thickness of the outlet (302) will vary with many factors such as application, filament composition, speed of extrusion, volume of filament, the composite matrix, and expected lifetime of the nozzle. The inlet orifice 306 diameter may also be varied to achieve a desired extrusion volume and speed. The body of the nozzle may be attached to the 3-D printer via a threaded screw depicted as 305.

Figure 4:
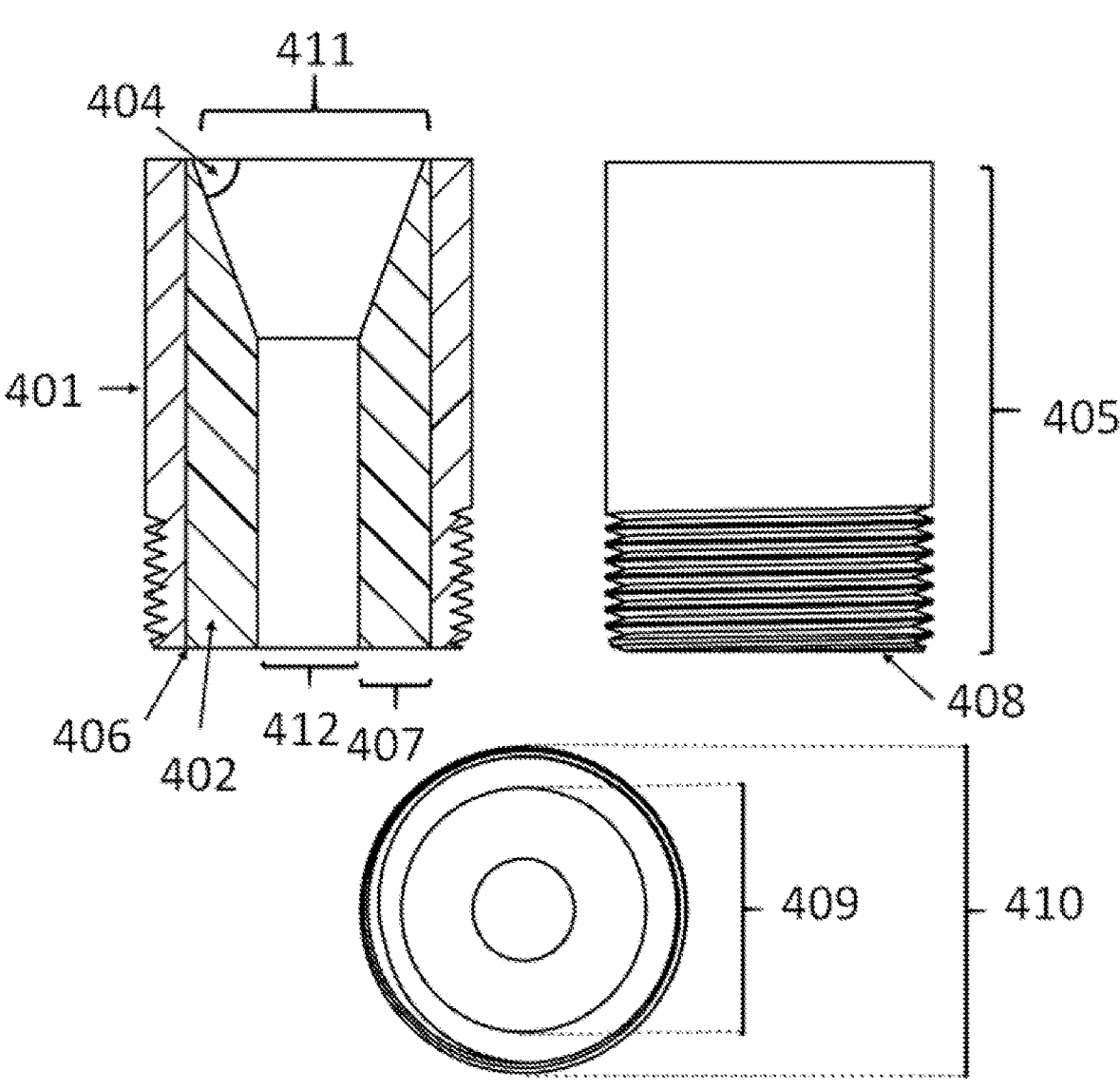
FIG. 4 shows a sand blasting nozzle assembly comprising a composite matrix of $(W_{1-x}M_xB_4)_z(Q)_n$ or $(WB_4)_z(Q)_n$

FIG. 4 represents a sand blasting nozzle assembly 401 comprising a composite matrix of $(W_{1-x}M_xB_4)_z(Q)_n$ or $(WB_4)_z(Q)_n$. In some embodiments, the nozzle comprises a sleeve or housing 403, and an insert comprising a composite matrix of $(W_{1-x}M_xB_4)_z(Q)_n$ or $(WB_4)_z(Q)_n$ 402. In some embodiments, the housing or sleeve 403 is a metal such as brass, steel, hardened steel, stainless steel, or plastic. In some embodiments, the assembly is formed by shrink fitting or freeze fitting the insert into the sleeve. The sleeve is heated to promote thermal expansion, and the insert is cooled for thermal contraction. The expanded sleeve and contracted insert are mechanically joined and pressed into place. Equilibration of the sleeve and insert permanently joins the two together (at 406). In some embodiments, the insert and sleeve are soldered together to form the assembly 406. In some embodiments, the sandblast nozzles are affixed via a set screw 408 to a larger housing that mixes the pressurized air with the syphoned media. The sandblast nozzles may have a conical chamfer 404 on the outlet edge to direct/promote the spray pattern desired. The angle and diameter of the outlet orifice 404 of the chamfer may vary. In some embodiments, the diameter of the outlet orifice 411 is greater than the diameter of the inlet orifice 412. In some embodiments, the diameter of the outlet orifice is equal to the diameter of the inlet orifice. Additional variations in the assembly include the diameter of the inner and outer walls, or thickness, of the insert 407, the length of the assembly 405, the threading of the screw 408, and the diameter of the inner and outer walls of the sleeve 409 and 410 (or thickness).

Figure 5:
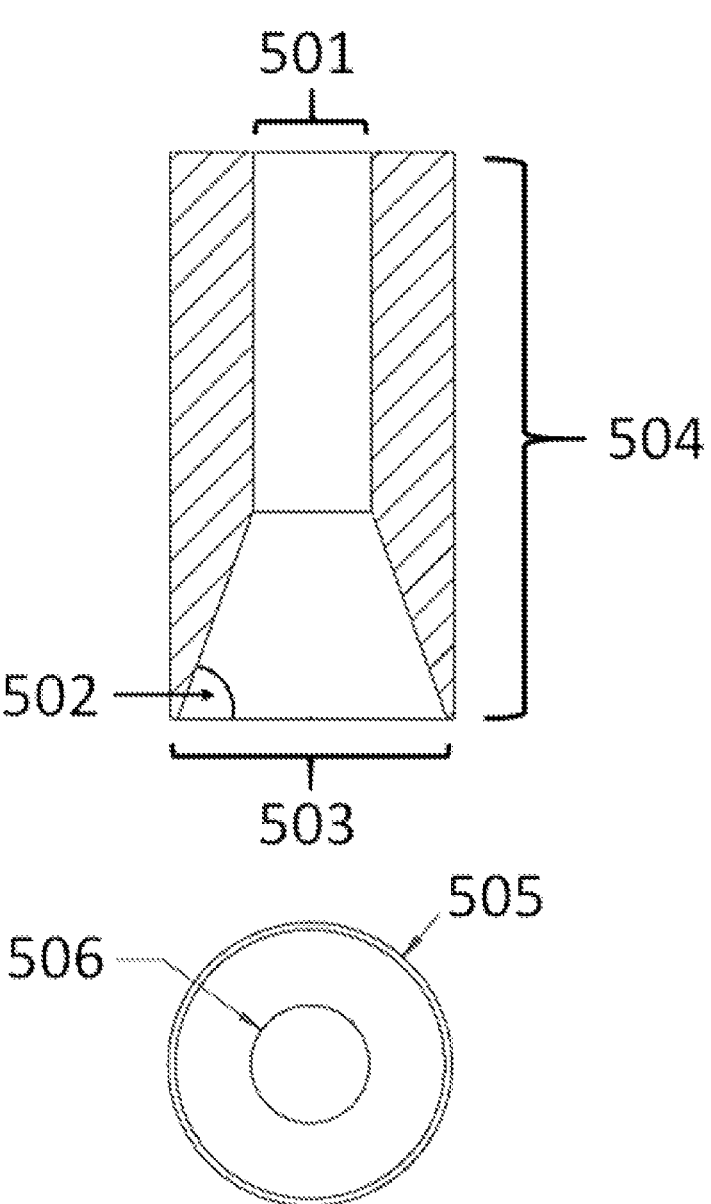
FIG. 5 shows a sand blasting nozzle comprising a composite matrix of $(W_{1-x}M_xB_4)_z(Q)_n$ or $(WB_4)_z(Q)_n$.

FIG. 5 represents a sand blasting nozzle 505 comprising a composite matrix of $(W_{1-x}M_xB_4)_z(Q)_n$ or $(WB_4)_z(Q)_n$. In some embodiments, the composite matrix of $(W_{1-x}M_xB_4)_z$ $(Q)_n$ or $(WB_4)_z(Q)$, forms the body of the nozzle, in contrast to the sand blasting nozzle of FIG. 4 depicting an assembly comprising a sleeve and insert. In some embodiments, the diameter of the outlet orifice 5C is greater than the diameter of the inlet orifice 501. In some embodiments, the diameter of the outlet orifice is equal to the diameter of the inlet orifice. In some embodiments, the diameter of the outlet orifice is less than the diameter of the inlet orifice. Variations in the nozzle include the diameter of the inlet orifice 501, the chamfer angle 502, the outlet orifice 503, and the length of the body 504.

Water jet nozzles will share features shown in FIG. 4. In some embodiments, water jet nozzles have a higher aspect ratio to diameter when compared to sand blast nozzles. In some embodiments, the outlet orifice of the 3 dimensional printer nozzles will vary. In some embodiments, the outlet orifice is about 0.5 mm to about 1.6 mm. In some embodiments, the outlet orifice is about 0.5 mm to about 0.6 mm, about 0.5 mm to about 0.7 mm, about 0.5 mm to about 0.8 mm, about 0.5 mm to about 0.9 mm, about 0.5 mm to about 1 mm, about 0.5 mm to about 1.1 mm, about 0.5 mm to about 1.2 mm, about 0.5 mm to about 1.3 mm, about 0.5 mm to about 1.4 mm, about 0.5 mm to about 1.5 mm, about 0.5 mm to about 1.6 mm, about 0.6 mm to about 0.7 mm, about 0.6 mm to about 0.8 mm, about 0.6 mm to about 0.9 mm, about 0.6 mm to about 1 mm, about 0.6 mm to about 1.1 mm, about 0.6 mm to about 1.2 mm, about 0.6 mm to about 1.3 mm, about 0.6 mm to about 1.4 mm, about 0.6 mm to about 1.5 mm, about 0.6 mm to about 1.6 mm, about 0.7 mm to about 0.8 mm, about 0.7 mm to about 0.9 mm, about 0.7 mm to about 1 mm, about 0.7 mm to about 1.1 mm, about 0.7 mm to about 1.2 mm, about 0.7 mm to about 1.3 mm, about 0.7 mm to about 1.4 mm, about 0.7 mm to about 1.5 mm, about 0.7 mm to about 1.6 mm, about 0.8 mm to about 0.9 mm, about 0.8 mm to about 1 mm, about 0.8 mm to about 1.1 mm, about 0.8 mm to about 1.2 mm, about 0.8 mm to about 1.3 mm, about 0.8 mm to about 1.4 mm, about 0.8 mm to about 1.5 mm, about 0.8 mm to about 1.6 mm, about 0.9 mm to about 1 mm, about 0.9 mm to about 1.1 mm, about 0.9 mm to about 1.2 mm, about 0.9 mm to about 1.3 mm, about 0.9 mm to about 1.4 mm, about 0.9 mm to about 1.5 mm, about 0.9 mm to about 1.6 mm, about 1 mm to about 1.1 mm, about 1 mm to about 1.2 mm, about 1 mm to about 1.3 mm, about 1 mm to about 1.4 mm, about 1 mm to about 1.5 mm, about 1 mm to about 1.6 mm, about 1.1 mm to about 1.2 mm, about 1.1 mm to about 1.3 mm, about 1.1 mm to about 1.4 mm, about 1.1 mm to about 1.5 mm, about 1.1 mm to about 1.6 mm, about 1.2 mm to about 1.3 mm, about 1.2 mm to about 1.4 mm, about 1.2 mm to about 1.5 mm, about 1.2 mm to about 1.6 mm, about 1.3 mm to about 1.4 mm, about 1.3 mm to about 1.5 mm, about 1.3 mm to about 1.6 mm, about 1.4 mm to about 1.5 mm, about 1.4 mm to about 1.6 mm, or about 1.5 mm to about 1.6 mm. In some embodiments, the outlet orifice is about 0.5 mm, about 0.6 mm, about 0.7 mm, about 0.8 mm, about 0.9 mm, about 1 mm, about 1.1 mm, about 1.2 mm, about 1.3 mm, about 1.4 mm, about 1.5 mm, or about 1.6 mm. In some embodiments, the outlet orifice is at least about 0.5 mm, about 0.6 mm, about 0.7 mm, about 0.8 mm, about 0.9 mm, about 1 mm, about 1.1 mm, about 1.2 mm, about 1.3 mm, about 1.4 mm, or about 1.5 mm. In some embodiments, the outlet orifice is at most about 0.6 mm, about 0.7 mm, about 0.8 mm, about 0.9 mm, about 1 mm, about 1.1 mm, about 1.2 mm, about 1.3 mm, about 1.4 mm, about 1.5 mm, or about 1.6 mm.

In some embodiments, the outlet orifice of the sand blast and waterjet nozzles will vary. In some embodiments, the outlet orifice is about 0.1 mm to about 2 mm. In some embodiments, the outlet orifice is about 0.1 mm to about 0.5 mm, about 0.1 mm to about 0.6 mm, about 0.1 mm to about 0.7 mm, about 0.1 mm to about 0.8 mm, about 0.1 mm to about 0.9 mm, about 0.1 mm to about 1 mm, about 0.1 mm to about 1.2 mm, about 0.1 mm to about 1.4 mm, about 0.1 mm to about 1.6 mm, about 0.1 mm to about 1.8 mm, about 0.1 mm to about 2 mm, about 0.5 mm to about 0.6 mm, about 0.5 mm to about 0.7 mm, about 0.5 mm to about 0.8 mm, about 0.5 mm to about 0.9 mm, about 0.5 mm to about 1 mm, about 0.5 mm to about 1.2 mm, about 0.5 mm to about 1.4 mm, about 0.5 mm to about 1.6 mm, about 0.5 mm to about 1.8 mm, about 0.5 mm to about 2 mm, about 0.6 mm to about 0.7 mm, about 0.6 mm to about 0.8 mm, about 0.6 mm to about 0.9 mm, about 0.6 mm to about 1 mm, about 0.6 mm to about 1.2 mm, about 0.6 mm to about 1.4 mm, about 0.6 mm to about 1.6 mm, about 0.6 mm to about 1.8 mm, about 0.6 mm to about 2 mm, about 0.7 mm to about 0.8 mm, about 0.7 mm to about 0.9 mm, about 0.7 mm to about 1 mm, about 0.7 mm to about 1.2 mm, about 0.7 mm to about 1.4 mm, about 0.7 mm to about 1.6 mm, about 0.7 mm to about 1.8 mm, about 0.7 mm to about 2 mm, about 0.8 mm to about 0.9 mm, about 0.8 mm to about 1 mm, about 0.8 mm to about 1.2 mm, about 0.8 mm to about 1.4 mm, about 0.8 mm to about 1.6 mm, about 0.8 mm to about 1.8 mm, about 0.8 mm to about 2 mm, about 0.9 mm to about 1 mm, about 0.9 mm to about 1.2 mm, about 0.9 mm to about 1.4 mm, about 0.9 mm to about 1.6 mm, about 0.9 mm to about 1.8 mm, about 0.9 mm to about 2 mm, about 1 mm to about 1.2 mm, about 1 mm to about 1.4 mm, about 1 mm to about 1.6 mm, about 1 mm to about 1.8 mm, about 1 mm to about 2 mm, about 1.2 mm to about 1.4 mm, about 1.2 mm to about 1.6 mm, about 1.2 mm to about 1.8 mm, about 1.2 mm to about 2 mm, about 1.4 mm to about 1.6 mm, about 1.4 mm to about 1.8 mm, about 1.4 mm to about 2 mm, about 1.6 mm to about 1.8 mm, about 1.6 mm to about 2 mm, or about 1.8 mm to about 2 mm. In some embodiments, the outlet orifice is about 0.1 mm, about 0.5 mm, about 0.6 mm, about 0.7 mm, about 0.8 mm, about 0.9 mm, about 1 mm, about 1.2 mm, about 1.4 mm, about 1.6 mm, about 1.8 mm, or about 2 mm. In some embodiments, the outlet orifice is at least about 0.1 mm, about 0.5 mm, about 0.6 mm, about 0.7 mm, about 0.8 mm, about 0.9 mm, about 1 mm, about 1.2 mm, about 1.4 mm, about 1.6 mm, or about 1.8 mm. In some embodiments, the outlet orifice is at most about 0.5 mm, about 0.6 mm, about 0.7 mm, about 0.8 mm, about 0.9 mm, about 1 mm, about 1.2 mm, about 1.4 mm, about 1.6 mm, about 1.8 mm, or about 2 mm.

Manufacturing Applications

Described herein are tools and nozzles, wherein the tools or nozzles comprise a surface or body comprising a composite matrix of $(W_{1-x}M_xB_4)_z(Q)_n$ or $(WB_4)_z(Q)_n$. In some embodiments, the tools and nozzles are manufactured by turning, milling, grinding, drilling, Electrical Discharge Manufacturing (EDM), Electrochemical Machining (ECM), water jet cutting, plasma cutting, or laser machining. In some embodiments, the tools and nozzles are manufactured EDM. In some embodiments, the surface used in turning, milling, grinding, drilling machining is diamond coated with a super hard material such as diamond. the In some embodiments, EDM comprises spark machining, spark eroding, die sinking, wire burning, wire erosion, and laser ablation.

EDM is a primary technique used in the machining of extremely hard metals or other hard materials that are difficult to machine through traditional techniques such as turning, milling, grinding, and drilling. EDM is incompatible with ceramics with low electrical conductivity, including useful super hard ceramics such as SiC and $B_4C$. However, ceramic composites of $(W_{1-x}M_xB_4)_z(Q)_n$ or $(WB_4)_z(Q)_n$ are compatible with EDM. This is unexpected, as one of ordinary skill would not expect a composite of nonconductive ceramics with the tungsten tetraboride ceramic to be conductive enough to be compatible with EDM. The described composites compatibility with EDM is an important improvement in the field. One competing material with comparable properties to the claimed $(W_{1-x}M_xB_4)_z(Q)_n$ and $(WB_4)_z(Q)_n$ composites is cubic boronitirde. While of comparable hardness and toughness, pure cubic boronitride is not compatible with EDM and therefore can be more difficult to machine or costly to manufacture. However, introducing $WB_4$ to form composite matrices of $(WB_4)_z(BN)_n$ can overcome such limitations.

Described herein are tools, nozzles, and machined parts comprising composites of $(W_{1-x}M_xB_4)_z(Q)_n$ or $(WB_4)_z(Q)_n$ which are self-lubricating. In some embodiments, the tools, nozzles, and machine parts are lubricated with an oxide layer that forms on the surface of the composite matrix, for example, $B_2O_3$ which has lubricating properties. In some embodiments, the oxide layer increases the wear resistance of composite matrix. In some embodiments, the oxide layer reduces the need for external lubricants. In some embodiments, the oxide layer reduces stress on the tools, nozzles, or machine parts. In some embodiments, the oxide layer extends the useful lifetime of the tools, nozzles, or machine parts. In some embodiments, the oxide layer is capable of continuous regeneration.

Certain Terminologies

Unless defined otherwise, all technical and scientific terms used herein have the same meaning as is commonly understood by one of skill in the art to which the claimed subject matter belongs. It is to be understood that the detailed description are exemplary and explanatory only and are not restrictive of any subject matter claimed. In this application, the use of the singular includes the plural unless specifically stated otherwise. It must be noted that, as used in the specification, the singular forms "a," "an" and "the" include plural referents unless the context clearly dictates otherwise. In this application, the use of "or" means "and/or" unless stated otherwise. Furthermore, use of the term "including" as well as other forms, such as "include", "includes," and "included," is not limiting.

Although various features of the disclosure may be described in the context of a single embodiment, the features may also be provided separately or in any suitable combination. Conversely, although the disclosure may be described herein in the context of separate embodiments for clarity, the disclosure may also be implemented in a single embodiment.

Reference in the specification to "some embodiments", "an embodiment", "one embodiment" "another embodiment" or "other embodiments" means that a particular feature, structure, or characteristic described in connection with the embodiments is included in at least some embodiments, but not necessarily all embodiments, of the disclosure.

As used herein, ranges and amounts can be expressed as "about" a particular value or range. About also includes the exact amount. Hence "about 5 GPa" means "about 5 GPa" and also "5 GPa." Generally, the term "about" includes an amount that would be expected to be within experimental error, e.g., ±5%, ±10% or ±15%. In some embodiments, "about" includes ±5%. In some embodiments, "about" includes ±10%. In some embodiments, "about" includes ±15%. In some embodiments, when refereeing to X-ray powder diffraction peaks at 2 theta, the term "about" includes±0.3 Angstroms.

The term "partially" is meant to describe an amount that is less that is less than 95%. The term "completely" is meant to describe an amount that is equal to or more than 95%.

The term "thermodynamically stable" or "stable" describes a state of matter that that is in chemical equilibrium with its environment at 23° C. and at 1 atmosphere of pressure. Stable states described herein do not consume or release energy at 23° C. and 1 atm.

The term "composite matrix" and "composite" can be used interchangeably, and refers to a collection of atoms wherein one component is crystalline $WB_4$ or $W_{1-x}M_xB_4$ with variables M and x described above, and a second component is one or more ceramics Q as described above. The at least one component of crystalline $WB_4$ or $W_{1-x}M_xB_4$ exhibits X-ray powder diffraction peaks as disclosed herein. In some embodiments, the composite matrix comprises crystalline $WB_4$ or $W_{1-x}M_xB_4$. Crystalline $WB_4$ or $W_{1-x}M_xB_4$ may optionally include excess boron leftover from the formation of the crystalline $WB_4$ or $W_{1-x}M_xB_4$. In some embodiments, the composite matrix comprises crystalline $WB_4$ or $W_{1-x}M_xB_4$, and one or more ceramics Q. In some embodiments, the composite matrix comprises crystalline $WB_4$ or $W_{1-x}M_xB_4$, one or more ceramics Q, and grain boundaries between crystalline $WB_4$ or $W_{1-x}M_xB_4$ and Q.

The term "grain boundaries" is meant to describe the material at the interface between crystalline $WB_4$ or $W_{1-x}M_xB_4$ and Q. In some embodiments, grain boundaries bind the composite together and provide a layer between the $WB_4$ or $W_{1-x}M_xB_4$ and Q so as to reduce reactivity between the two components. The grain boundaries comprise the byproducts of a chemical reaction between $WB_4$ or $W_{1-x}M_xB_4$ and Q, and optionally $WB_4$, $W_{1-x}M_xB_4$, Q, or starting materials leftover from the synthesis of Q, $WB_4$, or $W_{1-x}M_xB_4$ such as boron. Grain boundaries may comprise, for example, lower metal borides such as $WB_2$, WB, MB, or $MB_2$.

The section headings used herein are for organizational purposes only and are not to be construed as limiting the subject matter described.

EXAMPLES

These examples are provided for illustrative purposes only and not to limit the scope of the claims provided herein.

Example 1

X-ray Diffraction

Powder XRD was carried out on a Bruker D8 Discover Powder X-ray Diffractometer (Bruker Corporation, Germany) utilizing $Cu_{K\alpha}$ X-ray radiation ($\lambda$=1.5418 Å). The following scan parameters were used: 5-100° 2θ range, time per step of 0.3 sec, step size of 0.0353° with a scan speed of 0.1055°/sec. In order to determine the phases present in the powder X-ray diffraction data, the Joint Committee on Powder Diffraction Standards (JCPDS) database was utilized. The composition and purity of the samples were determined on an FEI Nova 230 high resolution scanning electron microscope (FEI Company, U.S.A.) with an Ultra-Dry EDS detector (Thermo Scientific, U.S.A.). Rietveld refinement utilizing Maud software was carried out to determine the cell parameters.

Table 2 shows X-ray powder diffraction data collected from the crystalline $WB_4$ synthesized by the methods disclosed herein. Table 2 contains the location of each diffraction peak in terms of Miller indices (h,k,l), distance (Angstroms), and 2 theta (degrees). The diffraction data was collected at 293 K with an X-ray diffractometer utilizing a Copper radiation source ($\lambda$=1.5418 Å).

TABLE 2

| No. | h | k | l | d[A] | 2 Theta[deg] | I[%] |
|-----|---|---|---|------|--------------|------|
| 1 | 1 | 0 | 0 | 4.51000 | 19.668 | 4.0 |
| 2 | 1 | 0 | 1 | 3.67000 | 24.232 | 100.0 |
| 3 | 0 | 0 | 2 | 3.17000 | 28.127 | 30.0 |
| 4 | 1 | 1 | 0 | 2.59800 | 34.495 | 65.0 |
| 5 | 2 | 0 | 0 | 2.25000 | 40.041 | 2.0 |
| 6 | 2 | 0 | 1 | 2.12500 | 42.507 | 25.0 |
| 7 | 1 | 1 | 2 | 2.01000 | 45.068 | 80.0 |
| 8 | 1 | 0 | 3 | 1.91100 | 47.543 | 20.0 |
| 9 | 2 | 0 | 2 | 1.83600 | 49.613 | 2.0 |
| 10 | 2 | 1 | 0 | 1.70000 | 53.888 | 2.0 |
| 11 | 2 | 1 | 1 | 1.64400 | 55.881 | 25.0 |
| 12 | 0 | 0 | 4 | 1.58400 | 58.195 | 10.0 |

TABLE 2-continued

| No. | h | k | l | d[A] | 2 Theta[deg] | I[%] |
|-----|---|---|---|------|--------------|------|
| 13 | 2 | 0 | 3 | 1.54000 | 60.026 | 10.0 |
| 14 | 3 | 0 | 0 | 1.50100 | 61.753 | 20.0 |
| 15 | 3 | 0 | 2 | 1.35600 | 69.231 | 20.0 |
| 16 | 1 | 1 | 4 | 1.35300 | 69.407 | 20.0 |
| 17 | 2 | 1 | 3 | 1.32500 | 71.092 | 10.0 |
| 18 | 2 | 2 | 0 | 1.30000 | 72.675 | 8.0 |
| 19 | 3 | 1 | 1 | 1.22500 | 77.926 | 10.0 |
| 20 | 1 | 0 | 5 | 1.22000 | 78.306 | 4.0 |
| 21 | 2 | 2 | 2 | 1.20200 | 79.710 | 20.0 |
| 22 | 2 | 1 | 4 | 1.16100 | 83.132 | 2.0 |
| 23 | 4 | 0 | 0 | 1.12500 | 86.426 | 2.0 |
| 24 | 4 | 0 | 1 | 1.10900 | 87.989 | 4.0 |

TABLE 2-continued

| No. | h | k | l | d[A] | 2 Theta[deg] | I[%] |
|-----|---|---|---|------|--------------|------|
| 25 | 2 | 0 | 5 | 1.10500 | 88.390 | 4.0 |
| 26 | 3 | 0 | 4 | 1.09000 | 89.934 | 20.0 |
| 27 | 3 | 1 | 3 | 1.07500 | 91.542 | 6.0 |
| 28 | 4 | 0 | 2 | 1.06100 | 93.106 | 2.0 |
| 29 | 0 | 0 | 6 | 1.05700 | 93.565 | 2.0 |
| 30 | 3 | 2 | 0 | 1.03400 | 96.313 | 2.0 |
| 31 | 3 | 2 | 1 | 1.02000 | 98.085 | 6.0 |
| 32 | 2 | 1 | 5 | 1.01700 | 98.475 | 6.0 |
| 33 | 2 | 2 | 4 | 1.00300 | 100.349 | 6.0 |
| 34 | 4 | 0 | 3 | 0.99300 | 101.743 | 2.0 |
| 35 | 4 | 1 | 0 | 0.98300 | 103.187 | 8.0 |
| 36 | 1 | 1 | 6 | 0.97900 | 103.779 | 10.0 |
| 37 | 2 | 0 | 6 | 0.95600 | 107.366 | 2.0 |
| 38 | 4 | 1 | 2 | 0.93900 | 110.238 | 16.0 |
| 39 | 3 | 2 | 3 | 0.92800 | 112.211 | 6.0 |

Data collected at ambient temperature (293 K), radiation source $Cu_{K\alpha}$ ($\lambda$ = 1.5418 Å)

Example 2

Synthesis and Properties of Composite Matrices

Crystalline $W_{0.95}Cr_{0.05}B_4$ and the ceramic were mixed until a uniform mixture is achieved. Mixing is performed via tumbling or low-speed milling. The mixture was compacted using a 80MPa force at to generate a pellet. The pellet was placed in a graphite die with a h-BN coating. Plasma Spark Sintering (SPS) was used to heat the sample. The samples were pressured to 50-100MPa heated to between 1300-1500° C. at a ramp rate of 200° C./min. The maximum temperature and maximum pressure was held for 1 to 5 mins. The samples were cooled to room temperature to afford the composites of Table 3.

TABLE 3

| Compounds and Composites | Vickers Hardness* (MPa) | Palmquist Toughness (MPa m$^{1/2}$) | Density (g/cm$^3$) |
|---|---|---|---|
| $(W_{0.95}Cr_{0.05}B_4)_{90\%}(TiB_2)_{10\%}$ | 24.5-25.6 | 2.8 | 6.75 |
| $(W_{0.95}Cr_{0.05}B_4)_{85\%}(TiB_2)_{15\%}$ | 23.3-24.1 | 3.5 | 6.35 |
| $(W_{0.95}Cr_{0.05}B_4)_{90\%}(SiC)_{10\%}$ | 22.8-23.2 | 4.4 | 6.3 |
| $(W_{0.95}Cr_{0.05}B_4)_{85\%}(SiC)_{15\%}$ | 19.7-21.5 | 4.6 | 6.1 |
| $(W_{0.95}Cr_{0.05}B_4)_{90\%}(B_4C)_{10\%}$ | 23.2-24.1 | — | 6.3 |
| $(W_{0.95}Cr_{0.05}B_4)_{85\%}(B_4C)_{15\%}$ | 21.5-22.4 | — | 5.9 |

*1 kg or 9.8 N Force load, average of 10 measurements

Hardness measurements were done on polished samples using a load-cell type multi-Vickers hardness tester (Leco, U.S.A.) with a pyramidal diamond indenter tip. Under each applied load: 0.49, 0.98, 1.96, 2.94 and 4.9 N, 10 indents were made in randomly chosen spots on the sample surface. The lengths of the diagonals of the indents were measured using a high-resolution optical microscope, Zeiss Axiotech 100HD (Carl Zeiss Vision GmbH, Germany) with a 500× magnification. Vickers hardness values ($H_v$, in GPa) were calculated using the following formula and the values of all 10 indents per load were averaged:

$$H_v = \frac{1854.4F}{d^2}$$

where d is the arithmetic average length of the diagonals of each indent in microns and F is the applied load in Newtons (N).

Fracture Toughness was determined using the Palmqvist method utilizing a Vickers microindentor with measurements of the crack length to determine the $K_{1C}$ of the material, such as seen in ASTM C1421-18, ASTM STP366305, and ASTM STP366285. The crack length of the indentation must fall within the Palmqvist regime to qualify for this determination methodology for this composite material.

Density ($\rho$) measurements were performed utilizing a density determination kit (Mettler-Toledo, U.S.A.) by measuring the weights of the samples in air and in an auxiliary liquid (ethanol); the density was calculated using the following formula:

$$\rho = \frac{A}{A-B}(\rho_0 - \rho_L) + \rho_L$$

where A is the weight of the sample in air, B is the weight of the sample in the auxiliary liquid (ethanol), $\rho_0$ is the density of auxiliary liquid (ethanol—0.789 g/cm$^3$), and $\rho_L$ is the density of air (0.0012 g/cm$^3$).

Figure 2:
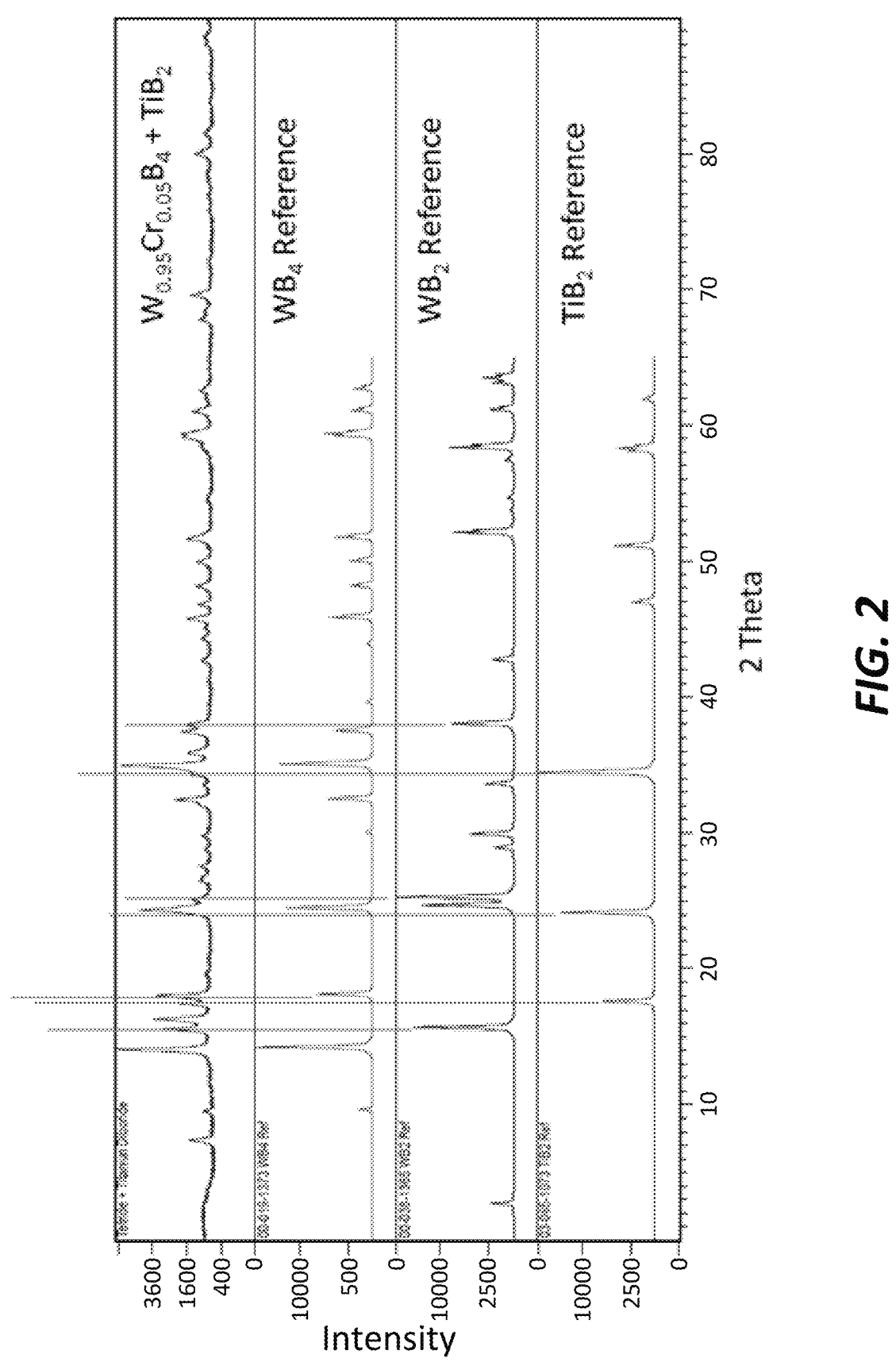
FIG. 2 shows X-ray powder diffractograms of a composite of $W_{0.95}Cr_{0.05}B_4$ and $TiB_2$, wherein the $TiB_2$ is 10% by volume.

Composites $(W_{0.95}Cr_{0.05}B_4)_{90\%}(TiB_2)_{10\%}$ and $(W_{0.95}Cr_{0.05}B_4)_{90\%}(B_4C)_{10}\%$ were analyzed by X-ray Powder Diffraction. FIG. 1 shows a comparison of diffractograms $W_{0.95}Cr_{0.05}B_4)_{90\%}(B_4C)_{10\%}$, $WB_4$, $WB_2$, and $B_4C$. FIG. 2 shows a comparison of diffractograms $W_{0.95}Cr_{0.05}B_4)_{90\%}(TiB_2)_{10\%}$, $WB_4$, $WB_2$, and $TiB_2$. Note that the diffraction patterns of $W_{0.95}Cr_{0.05}B_4$ and $WB_4$ are near identical. Both figures show the presence of $W_{0.95}Cr_{0.05}B_4$, $WB_2$ (grain boundaries), and the ceramic in each of the composite matrices.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

ADDITIONAL EMBODIMENTS

Embodiment 1. A composite matrix of the formula $(W_{1-x}M_xB_4)_z(Q)_n$, wherein:

M is one or more of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), ruthenium (Ru), hafnium (Hf), tantalum (Ta), rhenium (Re), osmium (Os), iridium (Ir), lithium (Li), yttrium (Y) and aluminum (Al);

x is from 0.001 to 0.999;

Q is one or more ceramics, wherein each of the one or more ceramics comprises at least two elements, and at least one of the two elements is B (boron), C (carbon), Si (silicon), N (nitrogen), or O (oxygen);

z is a volume percent from 0.1% to 99.9%;

n is a volume percent from 0.1% to 99.9%;

the sum of n and z is 100%; and wherein Q is not WC.

Embodiment 2. The composite matrix of embodiment 1, wherein $W_{1-x}M_xB_4$ is a crystalline solid characterized by at least one X-ray diffraction pattern reflection at 2 theta=24.2±0.3.

Embodiment 3. The composite matrix of embodiment 2, wherein the crystalline solid is further characterized by at least one X-ray diffraction pattern reflection at 2 theta=34.5±0.3 or 45.1±0.3.

Embodiment 4. The composite matrix of embodiment 2 or 3, wherein the crystalline solid is further characterized by at least one X-ray diffraction pattern reflection at 2 theta=47.5±0.3, 61.8±0.3, 69.2±0.3, 69.4±0.3, 79.7±0.3, 89.9±0.3, or 110.2±0.3.

Embodiment 5. The composite matrix of any one of embodiments 2 to 4, wherein the crystalline solid is further characterized by at least five X-ray diffraction pattern reflections at 2 theta=28.1±0.3, 34.5±0.3 , 42.5±0.3, 45.1±0.3, 47.5±0.3, 55.9±0.3, 61.8±0.3, 69.2±0.3, 69.4±0.3, 79.7±0.3, 89.9±0.3, or 110.2±0.3.

Embodiment 6. The composite matrix of any one of embodiments 1 to 5, wherein xis 0.001 to 0.6.

Embodiment 7. The composite matrix of embodiment 6, wherein xis 0.001 to 0.4.

Embodiment 8. The composite matrix of any one of embodiments 1 to 7, wherein M is one or more of Cr, Ta, Mo, or Mn.

Embodiment 9. The composite matrix of any one of embodiments 1 to 8, wherein M is Cr; Mn; Mo; Ta and Cr; or Ta and Mo.

Embodiment 10. The composite matrix of embodiment 9, wherein M is Cr, and xis at least 0.001 and less than 0.4.

Embodiment 11. The composite matrix of embodiment 10, wherein x is at least 0.01 and less than 0.3.

Embodiment 12. The composite matrix of embodiment 11, wherein x is at least 0.01 and less than 0.10.

Embodiment 13. The composite matrix of embodiment 12, wherein x is about 0.05.

Embodiment 14. The composite matrix of embodiment 9, wherein M is Mo, and x is at least 0.001 and less than 0.4.

Embodiment 15. The composite matrix of embodiment 14, wherein x is at least 0.001 and less than 0.2.

Embodiment 16. The composite matrix of embodiment 15, wherein x is at least 0.001 and less than 0.05.

Embodiment 17. The composite matrix of embodiment 16, wherein x is about 0.025.

Embodiment 18. The composite matrix of embodiment 9, wherein M is Mn, and x is at least 0.001 and less than 0.4.

Embodiment 19. The composite matrix of embodiment 18, wherein x is at least 0.001 and less than 0.2.

Embodiment 20. The composite matrix of embodiment 19, wherein x is at least 0.001 and less than 0.06.

Embodiment 21. The composite matrix of embodiment 20, wherein x is about 0.03.

Embodiment 22. The composite matrix of embodiment 9, wherein M is Cr and Ta, and x is at least 0.001 and less than 0.4.

Embodiment 23. The composite matrix of embodiment 22, wherein x is at least 0.001 and less than 0.3.

Embodiment 24. The composite matrix of embodiment 23, wherein x is at least 0.03 and less than 0.2.

Embodiment 25. The composite matrix of embodiment 24, wherein x is about 0.07.

Embodiment 26. The composite matrix of embodiment 25, wherein $W_{1-x}M_xB_4$ is $W_{0.93}Ta_{0.02}Cr_{0.05}B_4$.

Embodiment 27. The composite matrix of embodiment 9, wherein M is Ta and Mo, and x is at least 0.01 and less than 0.4.

Embodiment 28. The composite matrix of embodiment 27, wherein x is at least 0.001 and less than 0.3.

Embodiment 29. The composite matrix of embodiment 28, wherein x is at least 0.03 and less than 0.2.

Embodiment 30. The composite matrix of embodiment 29, wherein x is about 0.06.

Embodiment 31. The composite matrix of embodiment 30, wherein $W_{1-x}M_xB_4$ is $W_{0.94}Ta_{0.02}Mo_{0.04}B_4$.

Embodiment 32. The composite matrix of any one of embodiment 1 to 31, wherein the one or more ceramics comprises at least B, C, Si, or N.

Embodiment 33. The composite matrix of embodiment 32, wherein the one or more ceramics comprises at least B, C, or Si.

Embodiment 34. The composite matrix of any one of embodiment 1 to 31, wherein the one or more ceramics comprises at least O.

Embodiment 35. The composite matrix of embodiment 33, wherein the one or more ceramics comprises at least B.

Embodiment 36. The composite matrix of embodiment 33, wherein the one or more ceramics comprises at least C.

Embodiment 37. The composite matrix of embodiment 33, wherein the one or more ceramics comprises at least N.

Embodiment 38. The composite matrix of embodiment 33, wherein the one or more ceramics comprises at least Si.

Embodiment 39. The composite matrix of any one of embodiment 1 to 38, wherein the one or more ceramics comprises one or more metal selected from Ti, Zr, Hf, V, Nb, Ta, Cr, Mo, W, Mn, Re, Fe, and Ru.

Embodiment 40. The composite matrix of embodiment 39, wherein the one or more ceramics comprises one or more metal selected from Cr, Mo, W, Mn, Re, Fe, and Ru.

Embodiment 41. The composite matrix of embodiment 40, wherein the one or more ceramics comprises one or more metal selected from Ti, Zr, Hf, V, Nb, and Ta.

Embodiment 42. The composite matrix of any one of embodiment 1 to 31, wherein Q is one or more ceramics selected from $TiB_2$, $TaB_2$, $FeB_4$, $RuB_2$, $Ru_2B_3$, $ReB_2$, $B_4C$, $B_4Si$, cubic-BN, BCN, $BC_2N$, $B_2O_3$, $B_6O$, TiC, ZrC, VC, NbC, $NbC_2$, TaC, $Cr_3C_2$, MoC, $MoC_2$, SiC, TiN, ZrN, TiSi, $TiSi_2$, $Ti_5Si_3$, SiAlON, $Si_3N_4$, $TiO_2$, $ZrO_2$, $Al_2O_3$, and $SiO_2$.

Embodiment 43. The composite matrix of embodiment 42, wherein Q is one or more ceramics selected from $TiB_2$, $TaB_2$, $FeB_4$, $RuB_2$, $Ru_2B_3$, $ReB_2$, $B_4C$, $B_4Si$, cubic-BN, BCN, $BC_2B$, $B_2O_3$, and $B_6O$.

Embodiment 44. The composite matrix of embodiment 42, wherein Q is one or more ceramics selected from $B_4C$, BCN, $BC_2B$, TiC, ZrC, VC, NbC, $NbC_2$, TaC, MoC, $MoC_2$, and SiC.

Embodiment 45. The composite matrix of embodiment 42, wherein Q is one or more ceramics selected from cubic-BN, BCN, $BC_2B$, TiN, ZrN, SiAlON, and $Si_3N_4$.

Embodiment 46. The composite matrix of embodiment 42, wherein Q is one or more ceramics selected from $B_2O_3$, $B_6O$, $TiO_2$, $ZrO_2$, $Al_2O_3$, and $SiO_2$.

Embodiment 47. The composite matrix of embodiment 42, wherein Q is one or more ceramics selected from SiC, TiSi, $TiSi_2$, $Ti_5Si_3$, SiAlON, $Si_3N_4$, and $SiO_2$.

Embodiment 48. The composite matrix of embodiment 42, wherein Q is one or more ceramics selected from $TiB_2$, SiC, or $B_4C$.

Embodiment 49. The composite matrix of embodiment 1, wherein the M is Cr; x is 0.05; and Q is a ceramic selected from $TiB_2$, SiC, or $B_4C$, and n is 5-20%.

Embodiment 50. The composite matrix of any one of embodiments 1 to 49, wherein n is from 1% to 50%.

Embodiment 51. The composite matrix of embodiment 50, wherein n is from 5% to 40%.

Embodiment 52. The composite matrix of embodiment 51, wherein n is from 10% to 30%.

Embodiment 53. The composite matrix of embodiment 52, wherein n is from 10% to 20%.

Embodiment 54. The composite matrix of embodiment 53, wherein n is from 10% to 15%.

Embodiment 55. The composite matrix of any one of embodiment 1 to 54, wherein the Vicker's Hardness of the composite is from 18-30 GPa measured at 9.8 N (1 kg force load). Embodiment 56. The composite matrix of any one of embodiments 1 to 55, wherein the Palmquist Toughness of the composite is from 1-10 $MPam^{1/2}$.

Embodiment 57. The composite matrix of embodiment 56, wherein the Palmquist Toughness of the composite is from 2-8.

Embodiment 58. The composite matrix of embodiment any one of embodiments 1 to 57, wherein the density is from 3-8 $g/cm^3$.

Embodiment 59. The composite matrix of embodiment 58, wherein the density is from 5-7 $g/cm^3$.

Embodiment 60. A composite matrix of the formula $(WB_4)_z(Q)_n$, wherein:

Q is one or more ceramics, wherein each of the one or more ceramics comprises at least two elements, and at least one of the two elements is B (boron), C (carbon), Si (silicon), N (nitrogen), or O (oxygen); 1 z is a volume percent from 0.1% to 99.9%;

n is a volume percent from 0.1% to 99.9%;

the sum of n and z is 100%; and wherein Q is not WC.

Embodiment 61. The composite matrix of embodiment 60, wherein n is from 5% to 40%.

Embodiment 62. The composite matrix of embodiment 62, wherein n is from 10% to 30%.

Embodiment 63. The composite matrix of embodiment 63, wherein n is from 10% to 20%.

Embodiment 64. The composite matrix of embodiment 64, wherein n is from 10% to 15%.

Embodiment 65. The composite matrix of any one of embodiment 60 to 64, wherein the Vicker's Hardness of the composite is from 18-30 GPa measured at 9.8 N (1 kg force load).

Embodiment 66. The composite matrix of any one of embodiments 60 to 65, wherein the Palmquist Toughness of the composite is from 1-10 $MPam^{1/2}$.

Embodiment 67. The composite matrix of embodiment 66, wherein the Palmquist Toughness of the composite is from 2-6 $MPam^{1/2}$.

Embodiment 68. The composite matrix of embodiment any one of embodiments 60 to 67, wherein the density is from 4-8 $g/cm^3$.

Embodiment 69. The composite matrix of embodiment 68, wherein the density is from 5-7 $g/cm^3$.

Embodiment 70. A method of preparing a composite matrix of the formula $(W_{1-x}M_xB_4)_z(Q)_n$, the method comprising:

a) blending together crystalline $W_{1-x}M_xB_4$ with solid Q to form a mixture; wherein:

M is one or more of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), ruthenium (Ru), hafnium (Hf), tantalum (Ta), rhenium (Re), osmium (Os), iridium (Ir), lithium (Li), yttrium (Y) and aluminum (Al);

x is from 0.001 to 0.999;

Q is one or more ceramics, wherein each of the one or more ceramics comprises at least two elements, and at least one of the two elements is B (boron), C (carbon), Si (silicon), N (nitrogen), or O (oxygen);

z is a volume percent from 0.1% to 99.9%;

n is a volume percent from 0.1% to 99.9%;

the sum of n and z is 100%; and wherein Q is not WC b) pressing the mixture to generate a pellet; and c) heating the pellet to produce the composite matrix $(W_{1-x}M_xB_4)_z(Q)_n$.

Embodiment 71. The method embodiment 70, wherein $W_{1-x}M_xB_4$ is a crystalline solid characterized by at least one X-ray diffraction pattern reflection at 2 theta=24.2±0.3.

Embodiment 72. The method of embodiment 71, wherein the crystalline solid is further characterized by at least one X-ray diffraction pattern reflection at 2 theta=34.5±0.3 or 45.1±0.3.

Embodiment 73. The method of embodiment 71 or 72, wherein the crystalline solid is further characterized by at least one X-ray diffraction pattern reflection at 2 theta=47.5±0.3, 61.8±0.3, 69.2±0.3, 69.4±0.3, 79.7±0.3, 89.9±0.3, or 110.2±0.3.

Embodiment 74. The method of any one of embodiments 71 to 73, wherein the crystalline solid is further characterized by at least five X-ray diffraction pattern reflections at 2 theta=28.1±0.3, 34.5±0.3 , 42.5±0.3, 45.1±0.3, 47.5±0.3, 55.9±0.3, 61.8±0.3, 69.2±0.3, 69.4±0.3, 79.7±0.3, 89.9±0.3, or 110.2±0.3.

Embodiment 75. The method of any one of embodiments 70 to 74, wherein M is one or more of Cr, Ta, Mo, or Mn.

Embodiment 76. The method of embodiment 75, wherein M is Cr; Mn; Mo; Ta and Cr; or Ta and Mo.

Embodiment 77. The method of embodiment 76, wherein M is Cr, and x is at least 0.001 and less than 0.4.

Embodiment 78. The method of embodiment 77, wherein x is at least 0.01 and less than 0.3.

Embodiment 79. The method of embodiment 78, wherein x is at least 0.01 and less than 0.1.

Embodiment 80. The method of embodiment 79, wherein x is about 0.05.

Embodiment 81. The method of embodiment 76, wherein M is Mo, and x is at least 0.001 and less than 0.4.

Embodiment 82. The method of embodiment 81, wherein x is at least 0.001 and less than 0.2.

Embodiment 83. The method of embodiment 82, wherein x is at least 0.001 and less than 0.05.

Embodiment 84. The method of embodiment 83, wherein x is about 0.025.

Embodiment 85. The method of embodiment 76, wherein M is Mn, and x is at least 0.001 and less than 0.4.

Embodiment 86. The method of embodiment 85, wherein x is at least 0.001 and less than 0.2.

Embodiment 87. The method of embodiment 86, wherein x is at least 0.001 and less than 0.06.

Embodiment 88. The method of embodiment 87, wherein x is about 0.03.

Embodiment 89. The method of embodiment 76, wherein M is Cr and Ta, and x is at least 0.001 and less than 0.4.

Embodiment 90. The method of embodiment 89, wherein x is at least 0.001 and less than 0.3.

Embodiment 91. The method of embodiment 90, wherein x is at least 0.03 and less than 0.2.

Embodiment 92. The method of embodiment 91, wherein x is about 0.07.

Embodiment 93. The method of embodiment 92, wherein $W_{1-x}M_xB_4$ is $W_{0.93}Ta_{0.02}Cr_{0.05}B_4$.

Embodiment 94. The method of embodiment 76, wherein M is Ta and Mo, and x is at least 0.01 and less than 0.4.

Embodiment 95. The method of embodiment 94, wherein x is at least 0.001 and less than 0.3.

Embodiment 96. The method of embodiment 95, wherein x is at least 0.03 and less than 0.2.

Embodiment 97. The method of embodiment 96, wherein x is about 0.06.

Embodiment 98. The method of embodiment 97, wherein $W_{1-x}M_xB_4$ is $W_{0.94}Ta_{0.02}Mo_{0.04}B_4$.

Embodiment 99. A method of preparing a composite matrix of the formula $(WB_4)_z(Q)_n$, the method comprising:

a) blending together crystalline $WB_4$ with solid Q to form a mixture; wherein:

Q is one or more ceramics, wherein each of the one or more ceramics comprises at least two elements, and at least one of the two elements is B (boron), C (carbon), Si (silicon), N (nitrogen), or O (oxygen);

z is a volume percent from 0.1% to 99.9%;

n is a volume percent from 0.1% to 99.9%;

the sum of n and z is 100%; and wherein Q is not WC b) pressing the mixture to generate a pellet; and c) heating the pellet in a vessel to produce the composite matrix $(WB_4)_z(Q)_n$.

Embodiment 100. The method of embodiment 99, wherein the one or more ceramics comprises at least B, C, Si, or N.

Embodiment 101. The method of embodiment 100, wherein the one or more ceramics comprises at least B, C, or Si.

Embodiment 102. The method of embodiment 99, wherein the one or more ceramics comprises at least 0.

Embodiment 103. The method of embodiment 100, wherein the one or more ceramics comprises at least B.

Embodiment 104. The method of embodiment 100, wherein the one or more ceramics comprises at least C.

Embodiment 105. The method of embodiment 100, wherein the one or more ceramics comprises at least N.

Embodiment 106. The method of embodiment 100, wherein the one or more ceramics comprises at least Si.

Embodiment 107. The method of any one of embodiments 99 to 106, wherein the one or more ceramics comprises one or more metal selected from Ti, Zr, Hf, V, Nb, Ta, Cr, Mo, W, Mn, Re, Fe, and Ru.

Embodiment 108. The method of embodiment 107, wherein the one or more ceramics comprises one or more metal selected from Cr, Mo, W, Mn, Re, Fe, and Ru.

Embodiment 109. The method of embodiment 108, wherein the one or more ceramics comprises one or more metal selected from Ti, Zr, Hf, V, Nb, and Ta.

Embodiment 110. The method of embodiment 99, wherein Q is one or more ceramics selected from $TiB_2$, $TaB_2$, $FeB_4$, $RuB_2$, $Ru_2B_3$, $ReB_2$, $B_4C$, $B_4Si$, cubic-BN, BCN, $BC_2B$, $B_2O_3$, $B_6O$, TiC, ZrC, VC, NbC, $NbC_2$, TaC, $Cr_3C_2$, MoC, $MoC_2$, SiC, TiN, ZrN, TiSi, $TiSi_2$, $Ti_5Si_3$, SiAlON, $Si_3N_4$, $TiO_2$, $ZrO_2$, $Al_2O_3$, and $SiO_2$.

Embodiment 111. The method of embodiment 110, wherein Q is one or more ceramics selected from $TiB_2$, $TaB_2$, $FeB_4$, $RuB_2$, $Ru_2B_3$, $ReB_2$, $B_4C$, $B_4Si$, cubic-BN, BCN, $BC_2B$, $B_2O_3$, and $B_6O$.

Embodiment 112. The method of embodiment 110, wherein Q is one or more ceramics selected from $B_4C$, BCN, $BC_2B$, TiC, ZrC, VC, NbC, $NbC_2$, TaC, MoC, $MoC_2$, and SiC.

Embodiment 113. The method of embodiment 110, wherein Q is one or more ceramics selected from cubic-BN, BCN, $BC_2B$, TiN, ZrN, SiAlON, and $Si_3N_4$.

Embodiment 114. The method of embodiment 110, wherein Q is one or more ceramics selected from $B_2O_3$, $B_6O$, $TiO_2$, $ZrO_2$, $Al_2O_3$, and $SiO_2$.

Embodiment 115. The method of embodiment 110, wherein Q is one or more ceramics selected from SiC, TiSi, $TiSi_2$, $Ti_5Si_3$, SiAlON, $Si_3N_4$, and $SiO_2$.

Embodiment 116. The method of embodiment 110, wherein Q is one or more ceramics selected from $TiB_2$, SiC, or $B_4C$.

Embodiment 117. The method of any one of embodiments 99 to 116, wherein n is from 1% to 50%.

Embodiment 118. The method of embodiment 117, wherein n is from 5% to 40%.

Embodiment 119. The method of embodiment 118, wherein n is from 10% to 30%.

Embodiment 120. The method of embodiment 119, wherein n is from 10% to 20%.

Embodiment 121. The method of embodiment 120, wherein n is from 10% to 15%.

Embodiment 122. The method of any one of embodiments 99 to 121, wherein the Vicker's Hardness of the composite is from 18-30 GPa measured at 9.8 N (1 kg force load).

Embodiment 123. The method of any one of embodiments 99 to 122, wherein the Palmquist Toughness of the composite is from 1.0-15.0 $MPam^{1/2}$.

Embodiment 124. The method of embodiment 123, wherein the Palmquist Toughness of the composite is from 2.0-8.0.

Embodiment 125. The method of embodiment any one of embodiments 99 to 124, wherein the density is from 3-8 $g/cm^3$.

Embodiment 126. The method of embodiment 125, wherein the density is from 5-7 $g/cm^3$.

Embodiment 127. The method of any one of embodiments 99 to 126, wherein oxygen is removed from the reaction vessel to generate the inert atmosphere.

Embodiment 128. The method of any one of embodiments 99 to 127, wherein the mixture is heated to a temperature between about 1050° C. and about 2200° C.

Embodiment 129. The method of any one of embodiments 99 to 128, wherein the mixture is heated at a ramp rate of between 100-200° C.

Embodiment 130. The method of any one of embodiments 99 to 129, wherein the mixture is held at the maximum temperature for about 1-5 mins.

Embodiment 131. The method of any one of embodiments 99 to 130, wherein the mixture is heated by an plasma spark sintering.

Embodiment 132. The method of any one of embodiments 99 to 130, wherein the mixture is heated by an induction furnace.

Embodiment 133. The method of embodiment 132, wherein the induction furnace is heated by electromagnetic induction.

Embodiment 134. The method of embodiment 132, wherein the electromagnetic radiation used for electromagnetic induction has the frequency and wavelength of radio waves.

Embodiment 135. The method of any one of embodiments 99 to 130, wherein the mixture is heated by hot pressing.

Embodiment 136. The method of any one of embodiments 99 to 130, wherein the mixture is heated by a conventional furnace.

Embodiment 137. The method of any one of embodiments 99 to 130, wherein the mixture is heated by fused deposition modeling.

Embodiment 138. A tool comprising a surface or body for cutting or abrading, wherein the surface or body comprises a composite matrix of embodiments 1 to 98.

Embodiment 139. The tool of embodiment 138, wherein the tool is a drill bit or saw blade. 140. The tool of embodiment 138 or 139, wherein the surface of the drill bit or saw blade is combined with the composite matrix.

Embodiment 141. The tool of any one of embodiments 138 to 140, wherein further comprising an AgO binder.

Embodiment 142. The tool of any one of embodiments 138 to 141, wherein the drill bit or saw blade further comprises steel, Co (cobalt), WC, or WC composites.

Embodiment 143. A method of applying a composite matrix of any one of embodiments 1 to 98 to a tool, wherein the method comprises affixing the composite matrix to the tool by laser welding or arc welding.

Embodiment 144. The method of embodiment 143, wherein the arc welding is stick welding or shielded metal arc welding .

Embodiment 145. The method of embodiment 143 or 144 wherein the tool is a drill bit or saw blade.

Embodiment 146. The method of any one of embodiments 143 to 145, wherein the drill bit and composite matrix are joined with an AgO binder.

Embodiment 147. A method of manufacturing a tool comprising a composite matrix of any one of embodiments 1 to 98, wherein the tool is manufactured by turning, milling, grinding, drilling, Electrical Discharge Manufacturing (EDM), Electrochemical Machining (ECM), water jet cutting, plasma cutting, or laser machining.

Embodiment 148. The method of embodiment 147, wherein the tool is manufactured by Electrical Discharge Manufacturing (EDM), Electrochemical Machining (ECM), water jet cutting, plasma cutting, or laser machining.

Embodiment 149. The method of embodiment 148, wherein the tool is manufactured by Electrical Discharge Manufacturing (EDM).

Embodiment 150. A nozzle for extruding semisolids, solutions, suspensions, or liquids, wherein the nozzle comprises a composite matrix of any one of embodiments 1 to 98 or any composite matrix disclosed herein.

Embodiment 151. The nozzle of embodiment 150, wherein the nozzle is a 3-D printing nozzle, laser printing nozzle, sand blasting nozzle, of water jet nozzle.

Embodiment 152. The nozzle of embodiment 151, wherein the nozzle is a 3-D printing nozzle.

Embodiment 153. The nozzle of embodiment 152, wherein the nozzle comprises a body and an outlet.

Embodiment 154. The nozzle of embodiment 153, wherein the body comprises the composite matrix.

Embodiment 155. The nozzle of embodiment 153 or 154, wherein the body comprises a threaded screw.

Embodiment 156. The nozzle of any one of embodiments 153 to 155 wherein the outlet comprises a layer of the composite matrix and an outlet orifice.

Embodiment 157. The nozzle of embodiment 156, wherein the outlet orifice diameter is between about 0.1 mm and 2.0 mm.

Embodiment 158. The nozzle of embodiment 156, wherein the outlet orifice diameter is between about 0.5 mm and 1.5 mm.

Embodiment 159. The nozzle of embodiment 156, wherein the outlet orifice diameter is at least about 0.1 mm.

Embodiment 160. The nozzle of embodiment 156, wherein the outlet orifice diameter is at least about 0.5 mm.

Embodiment 161. The nozzle of embodiment 150, wherein the nozzle is a sand blasting nozzle or water jet nozzle.

Embodiment 162. The nozzle of embodiment 161, wherein the nozzle comprises a body with an inlet orifice and an outlet orifice, wherein the body is the composite matrix.

Embodiment 163. The nozzle of embodiment 161, wherein the nozzle comprises a sleeve and an insert with an inlet orifice and an outlet orifice.

Embodiment 164. The nozzle of embodiment 163, wherein the sleeve comprises an expandable metal.

Embodiment 165. The nozzle of embodiment 163 or 164, wherein the insert comprises the composite matrix.

Embodiment 166. The nozzle of any one of embodiments, wherein the outlet orifice diameter is between about 0.5 mm and 1.5 mm.

Embodiment 167. The nozzle of embodiment 163, wherein the outlet orifice diameter is between about 0.6 mm and 1.3 mm.

Embodiment 168. The nozzle of embodiment 163, wherein the outlet orifice diameter is at least about 0.5 mm.

Embodiment 169. A tool, nozzle, or machine part comprising a composite matrix of any one of embodiments 1 to 89 or any composite matrix disclosed herein, wherein a lubricating layer of $B_2O_3$ forms on the surface of the composite matrix in the presence of moisture.

Embodiment 170. The tool, nozzle, or machine part of embodiment 169, wherein the lubricating layer of $B_2O_3$ regenerates.

Embodiment 171. The tool, nozzle, or machine part of embodiment 170, wherein the lubricating layer of $B_2O_3$ increases the lifetime of the tool, nozzle, or machine part.

Embodiment 172. A method of using a nozzle comprising the composite matrix of any one of embodiments 1 to 89 or any composite matrix disclosed herein, comprising: exposing the nozzle comprising the composite matrix to moisture, thereby forming a lubricating layer of $B_2O_3$ on the surface of the composite matrix; and extruding a semisolid, solution, suspension, or liquid through the nozzle.

Embodiment 173. The method of embodiment 172, wherein the nozzle is a 3-D printing nozzle, laser printing nozzle, sand blasting nozzle, of water jet nozzle.

What is claimed is:

1. A composite matrix of a formula $(W_{1-x}M_xB_4)_z(Q)_n$, wherein:

the composite matrix comprises a first component comprising crystalline $W_{1-x}M_xB_4$ and a second component comprising one or more ceramics Q;

the first component and the second component are uniformly dispersed within the composite matrix;

M is one or more of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), ruthenium (Ru), hafnium (Hf), tantalum (Ta), rhenium (Re), osmium (Os), iridium (Ir), lithium (Li), yttrium (Y) and aluminum (Al);

x is from 0 to 0.999, wherein if x is 0 then M is absent;

each of the one or more ceramics comprises at least two elements, and at least one of the two elements is B (boron), C (carbon), Si (silicon), N (nitrogen), or O (oxygen);

z is a volume percent from 0.1% to 99.9%;

n is a volume percent from 0.1% to 99.9%;

a sum of n and z is 100%;

Q is not tungsten carbide (WC); and

Palmquist Toughness of the composite matrix is from 1-10 $MPam^{1/2}$.

2. The composite matrix of claim 1, wherein $W_{1-x}M_xB_4$ is a crystalline solid characterized by at least one X-ray diffraction pattern reflection at 2 theta=24.2±0.3.

3. The composite matrix of claim 1, wherein x is 0.001 to 0.6.

4. The composite matrix of claim 1, wherein M is one or more of Cr, Ta, Mo, or Mn.

5. The composite matrix of claim 1, wherein M is Cr; Mn; Mo; Ta and Cr; or Ta and Mo.

6. The composite matrix of claim 1, wherein the one or more ceramics comprises at least B, C, Si, or N.

7. The composite matrix of claim 1, wherein Q is one or more ceramics selected from $TiB_2$, SiC, AlC, TiC, and $B_4C$.

8. The composite matrix of claim 1, wherein n is from 1% to 50%.

9. The composite matrix of claim 1, wherein Vicker's Hardness of the composite matrix is from 18-30 GPa measured at 9.8 N (1 kg force load).

10. The composite matrix of claim 1, wherein the composite matrix has a density from 3-8 $g/cm^3$.

11. The composite matrix of claim 1, wherein n is from 5% to 40%.

12. A method of preparing a composite matrix of claim 1, the method comprising:

a) blending together crystalline $W_{1-x}M_xB_4$ or $WB_4$ with solid Q to form a mixture; wherein:

M is one or more of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), ruthenium (Ru), hafnium (Hf), tantalum (Ta), rhenium (Re), osmium (Os), iridium (Ir), lithium (Li), yttrium (Y) and aluminum (Al);

x is from 0.001 to 0.999;

Q is one or more ceramics, wherein each of the one or more ceramics comprises at least two elements, and at least one of the two elements is B (boron), C (carbon), Si (silicon), N (nitrogen), or O (oxygen);

z is a volume percent from 0.1% to 99.9%;

n is a volume percent from 0.1% to 99.9%;

the sum of n and z is 100%; and wherein Q is not WC, pressing the mixture to generate a pellet, heating the pellet to produce the composite matrix, and Palmquist Toughness of the composite matrix is from 1-10 $MPam^{1/2}$.

13. The method of claim 12, wherein the mixture is heated to a temperature between about 1050° C. and about 2200° C., wherein the mixture is heated at a ramp rate of between 100-200° C. per minute.

14. The method of claim 12, wherein the mixture is heated by a plasma spark sintering, induction furnace, electromagnetic induction, hot pressing, conventional furnace, or fused deposition modeling.

15. A tool comprising a surface or body for cutting or abrading, wherein the surface or body comprises a composite matrix of claim 1.

16. A method of applying a composite matrix of claim 1, wherein the method comprises affixing the composite matrix to a tool by laser welding or arc welding.

17. A method of manufacturing a tool comprising a composite matrix of claim 1, wherein the tool is manufactured by turning, milling, grinding, drilling, Electrical Discharge Manufacturing (EDM), Electrochemical Machining (ECM), water jet cutting, plasma cutting, or laser machining.

18. A tool, nozzle, or machine part comprising a composite matrix of claim 1, wherein a lubricating layer of $B_2O_3$ forms on a surface of the composite matrix in presence of moisture.

19. A method of using a nozzle comprising the composite matrix of claim 1, comprising:

exposing the nozzle comprising the composite matrix to moisture, thereby forming a lubricating layer of $B_2O_3$ on a surface of the composite matrix; and extruding a semisolid, solution, suspension, or liquid through the nozzle.

\* \* \* \* \*